US012592198B2

(12) United States Patent
Kim et al.

(10) Patent No.: US 12,592,198 B2
(45) Date of Patent: Mar. 31, 2026

(54) PIXEL CIRCUIT AND DISPLAY DEVICE INCLUDING THE SAME

(71) Applicant: LG Display Co., Ltd., Seoul (KR)

(72) Inventors: Ju Han Kim, Paju-si (KR); Jin Seong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/984,699

(22) Filed: Dec. 17, 2024

(65) Prior Publication Data

US 2025/0273148 A1 Aug. 28, 2025

(30) Foreign Application Priority Data

Feb. 26, 2024 (KR) ........................ 10-2024-0027339

(51) Int. Cl.
*G09G 5/00* (2006.01)
*G09G 3/00* (2006.01)
*G09G 3/3233* (2016.01)

(52) U.S. Cl.
CPC ........... *G09G 3/3233* (2013.01); *G09G 3/006* (2013.01); *G09G 2300/0819* (2013.01); *G09G 2300/0852* (2013.01); *G09G 2310/08* (2013.01); *G09G 2320/045* (2013.01); *G09G 2330/12* (2013.01)

(58) Field of Classification Search
CPC ................. G09G 3/3233; G09G 3/006; G09G 2300/0819; G09G 2300/0852; G09G 2310/08; G09G 2320/045; G09G 2330/12
USPC .......................................................... 345/211
See application file for complete search history.

(56) References Cited

U.S. PATENT DOCUMENTS

| | | | | |
|---|---|---|---|---|
| 9,424,770 | B2 | 8/2016 | Kim et al. | |
| 11,694,637 | B2 | 7/2023 | Yoo et al. | |
| 11,715,428 | B2 | 8/2023 | Heo et al. | |
| 2014/0152642 | A1 | 6/2014 | Kim et al. | |
| 2018/0350286 | A1* | 12/2018 | Lee | G09G 3/3233 |
| 2023/0008470 | A1 | 1/2023 | Yoo et al. | |
| 2024/0395197 | A1* | 11/2024 | Han | G09G 3/2007 |
| 2025/0124868 | A1* | 4/2025 | Long | H10D 86/441 |

FOREIGN PATENT DOCUMENTS

| | | |
|---|---|---|
| KR | 10-2005052 B1 | 7/2019 |
| KR | 10-2023-0010155 A | 1/2023 |

OTHER PUBLICATIONS

European Patent Office, Extended European Search Report, European Patent Application No. 24222820.3, Mar. 26, 2025, 10 pages.

* cited by examiner

*Primary Examiner* — Jennifer T Nguyen
(74) *Attorney, Agent, or Firm* — Fenwick & West LLP

(57) ABSTRACT

A pixel circuit and a display device including the same are disclosed. More particularly, a pixel circuit and a display device including the same that are capable of sensing for external compensation when driving a display using a first driving element that drives a light emitting element and a second driving element that is connected to the first driving element and includes a same material and structure as the first driving element.

20 Claims, 28 Drawing Sheets

PIXEL CIRCUIT AND DISPLAY DEVICE INCLUDING THE SAME

CROSS-REFERENCE TO RELATED APPLICATION

This application claims priority to and the benefit of Republic of Korea Patent Application No. 10-2024-0027339, filed Feb. 26, 2024, which is hereby incorporated by reference in its entirety.

BACKGROUND

Technical Field

The present embodiments relates to a pixel circuit and a display device including the same.

Description of the Related Art

An organic light emitting display device includes a self-luminous organic light emitting diode (hereinafter, referred to as "OLED"), and since the organic light emitting display device has not only a quick response speed, an excellent luminous efficiency, an excellent luminance, and an excellent viewing angle, but also an excellent contrast ratio and an excellent color gamut, it can express black gradation in complete black.

Such an organic light emitting display device includes a pixel circuit for operating an OLED. Here, the pixel circuit may include a driving element for driving the OLED. Here, the driving element may be a thin film transistor (TFT).

Meanwhile, an electrical characteristic deviation may exist between pixel circuits of the organic light emitting display device. Here, the electrical characteristic of the pixel circuit may include a threshold voltage of the driving element.

The electrical characteristic deviation between the pixel circuits may become greater as the driving time of the pixel circuits is increasing.

External compensation techniques may be applied to organic light-emitting display devices to compensate for threshold voltage deviations of the driving elements between pixel circuits, i.e., deviations in the electrical characteristics of the driving elements. Here, an external compensation technology refers to a technology that compensates the pixel data of an input image by using a compensation value corresponding to the deviation of the electrical characteristic of the driving element sensed for each pixel circuit.

In general, an organic light-emitting display device may perform the sensing of the pixel circuits for external compensation in a power-on sequence in which power is applied or in a power-off sequence in which power is cut off. In other words, since the organic light-emitting display device senses the pixel circuits when they are not displaying the input images, the organic light-emitting display device may not compensate for deviations in the electrical characteristics between the pixel circuits in real time by means of the external compensation when displaying the input images.

SUMMARY

The present disclosure provides a pixel circuit capable of sensing for external compensation when driving the display of the pixel circuit, and a display device including the same.

Objects of the present disclosure are not limited to the above-described objects, and other unmentioned objects will be clearly understood by those skilled in the art from the following description.

In one embodiment, a pixel circuit comprises: a first driving element including a first-first electrode that is configured to be selectively connected to a driving power line that supplies a pixel driving voltage, a first gate electrode connected to a first node, and a second-first electrode connected to a second node to which a data voltage is applied; a light-emitting element including an anode electrode that is configured to be selectively connected to the second node and a cathode electrode connected to a cathode power line, the light-emitting element emitting light responsive to a driving current from the first driving element; a second driving element including a first-second electrode connected to the driving power line, a second gate electrode connected to the first gate electrode of the first driving element at the first node, and a second-second electrode connected to a third node; and a switch element connected to a sensing line of an external compensation circuit and the second-second electrode at the third node, the switch element configured to electrically connect the third node and the sensing line such that a sensing voltage at the third node is applied to the external compensation circuit via the sensing line responsive to a gate-on voltage of a gate signal for sensing that is applied to the switch element.

In one embodiment, a pixel circuit comprises: a first driving element including a first-first electrode that is connected to a driving power line that applies a pixel driving voltage to the first-first electrode, a first gate electrode connected to a first node to which a reference voltage or a data voltage is selectively applied to the first gate electrode, and a second-first electrode connected to a second node; a light-emitting element including an anode electrode connected to the second node and a cathode electrode connected to a cathode power line, the light-emitting element configured to emit light responsive to a driving current from the first driving element; a second driving element including a first-second electrode connected to the driving power line that applies the pixel driving voltage to the first-second electrode, a second gate electrode connected to the first gate electrode of the first driving element at the first node, and a second-second electrode connected to a third node; and a switch element connected to a sensing line of an external compensation circuit and the second-second electrode at the third node, the switch element configured to electrically connect the third node and the sensing line such that a sensing voltage at the third node is applied to the external compensation circuit via the sensing line in response to a gate-on voltage of a gate signal for sensing that is applied to the switch element.

In one embodiment, a pixel circuit comprises: a first driving element including a first electrode that is electrically connected to a driving power line that applies a pixel driving voltage to the first electrode, a first gate electrode connected to a first node, and a second electrode connected to a second node; a light-emitting element including an anode electrode that is electrically connected to the second node and a cathode electrode connected to a cathode power line, the light-emitting element configured to emit light responsive to a driving current from the first driving element; a second driving element including a first electrode that is electrically connected to the driving power line, a second gate electrode that is connected to the first gate electrode of the first driving element at the first node, and a second electrode that is connected to a third node; and a switch element connected to the second electrode of the second driving element at the third node and a sensing line of an external compensation circuit, the switch element configured to electrically connect the third node and the sensing line such that a sensing voltage at the third node that includes at least a threshold voltage of the second driving element is applied to the external compensation circuit via the sensing line while the switch element is turned on, wherein a data voltage that is applied to the first gate electrode of the first driving element and the second gate electrode of the second driving element is compensated based on the sensing voltage that includes at least the threshold voltage of the second driving element.

As described above, according to one embodiment, a second driving element formed of the same material and structure as the material and structure of the first driving element for driving the light-emitting element is added to the pixel circuit, and the threshold voltage of the second driving element, which operates similarly to the first driving element when driving the display of the pixel circuit, is sensed in the external compensation circuit, thus allowing the sensing for external compensation when driving the display of the pixel circuit.

Various useful advantages and effects of the embodiments are not limited to the above-described contents and will be more easily understood from descriptions of the specific embodiments.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
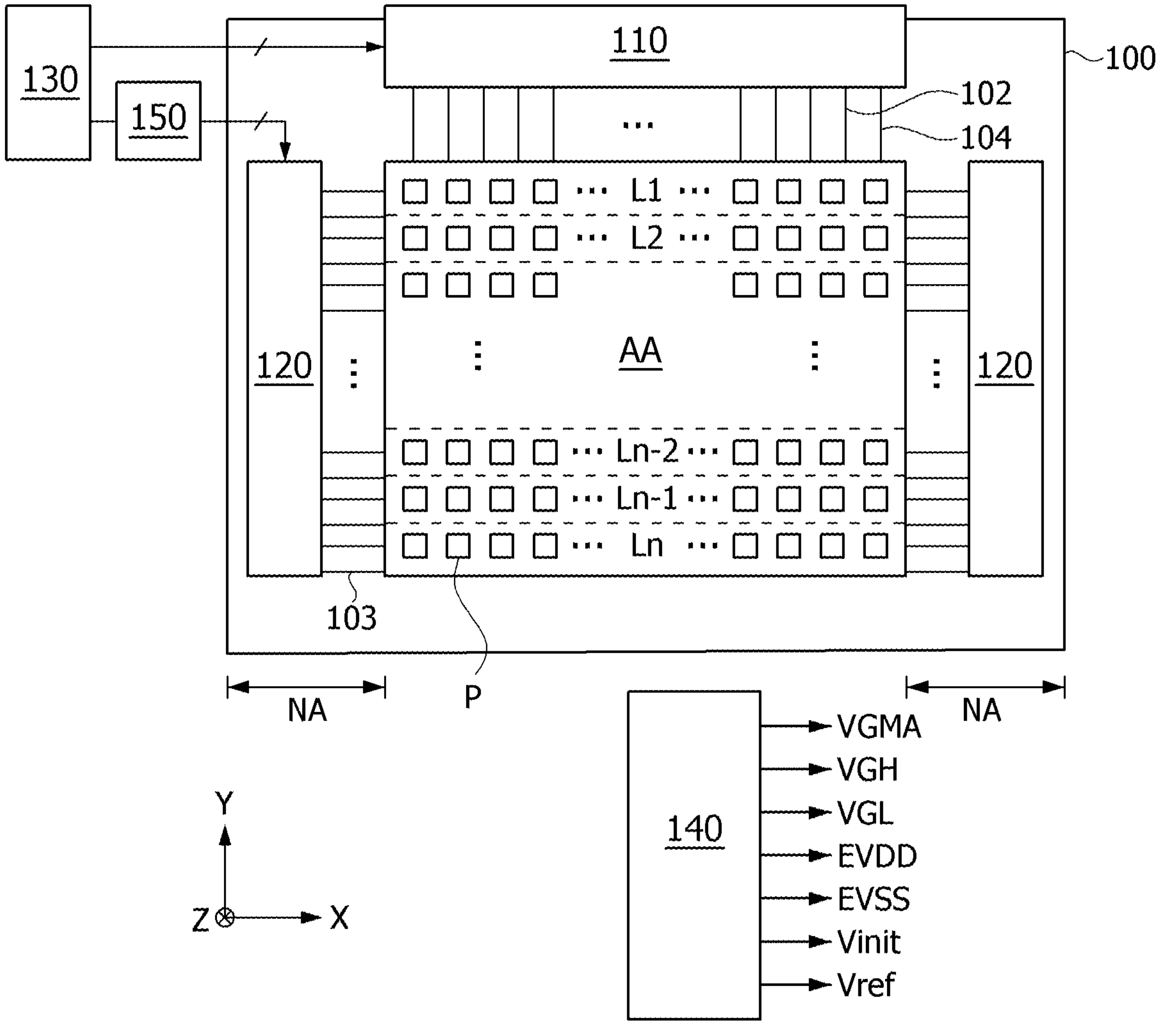
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

Shapes, sizes, ratios, angles, numbers, and the like disclosed in the drawings for describing the embodiments of the present disclosure are exemplary, and the present disclosure is not limited to the illustrated items. Like reference numerals refer to like elements throughout. In addition, in describing the present disclosure, if it is determined that the detailed description of the related known technology may unnecessarily obscure the subject matter of the present disclosure, the detailed description thereof will be omitted.

The terms such as "comprising," "including," and "having" used herein are generally intended to allow other components to be added unless the terms are used with the term "only." Any references to singular may include plural unless expressly stated otherwise.

Components are interpreted to include an ordinary error range even if not expressly stated.

For the description of a positional relationship, for example, when the positional relationship and the interconnected relationship between two parts is described as "on," "above," "below," "next to," "connect or couple", "crossing or intersecting", and the like, one or more other parts may be interposed therebetween unless the term "immediately" or "directly" is used in the expression.

The terms "first," "second," and the like may be used to distinguish components from each other, but the functions or structures of the components are not limited by ordinal numbers or component names in front of the components. Because the claims are written around essential components, the ordinal numbers preceding the component names in the claims may not match the ordinal numbers preceding the component names in the embodiments.

The following embodiments can be partially or entirely bonded to or combined with each other and can be linked and operated in technically various ways. The embodiments can be carried out independently of or in association with each other.

In a display device of the present disclosure, a display panel driving circuit, a pixel circuit, a level shifter, and the like may include transistors. The transistors may be implemented by oxide transistors including oxide semiconductor, low temperature poly silicon (LTPS) transistors including LTPS, and the like. Here, the transistor may be a thin film transistor (TFT).

A transistor is a three-terminal element including a gate, a source and a drain. The source is a terminal that supplies a carrier to the transistor. In the transistor, the carrier begins to flow from the source. A drain is a terminal through which the carrier flows out of the transistor. The flow of the carrier in the transistor flows from the source to the drain. In the case of an N-channel transistor, since the carrier is an electron, the source voltage has a voltage lower than the drain voltage so that electrons may flow from the source to the drain. In the N-channel transistor, the direction of current flows from the drain to the source. In the case of a P-channel transistor, since the carrier is a hole, the source voltage is higher than the drain voltage so that the hole may flow from the source to the drain. In the P-channel transistor, current flows from the source to the drain because the hole flows from the source to the drain. It should be noted that the source and drain of the transistor are not fixed. For example, the source and drain may be changed according to the applied voltage. Therefore, the invention is not limited due to the source and drain of the transistor. In the following description, a drain and a source of a transistor is called a first electrode and a second electrode.

The scan signal swings between a gate-on voltage and a gate-off voltage. The gate-off voltage may be interpreted as a first voltage, and the gate-on voltage may be interpreted as a second voltage. The transistor is turned on in response to the gate-on voltage, while the transistor is turned off in response to the gate-off voltage. In the case of an N-channel transistor, the gate-on voltage may be a gate high voltage (VGH), and the gate-off voltage may be a gate low voltage (VGL). In the case of a P-channel transistor, the gate-on voltage may be the gate low voltage (VGL), and the gate-off voltage may be the gate high voltage (VGH).

Hereinafter, various embodiments of the present disclosure will be described in detail with reference to the accompanying drawings.

FIG. 1 is a block diagram illustrating a display device according to one embodiment of the present disclosure.

Referring to FIG. 1, a display device of the present disclosure may be an organic light-emitting display device. Such a display device includes a display panel 100, a display panel driving circuit for writing pixel data to pixel circuits P of the display panel 100, and a power supply circuit 140 for generating power required to drive the pixel circuits P and the display panel driving circuit.

The display panel 100 may be a panel having a rectangular structure with a length in the X-axis direction, a width in the Y-axis direction, and a thickness in the Z-axis direction.

A display area AA of the display panel 100 includes a pixel array for displaying images thereon. The pixel array includes a plurality of data lines 102, a plurality of gate lines 103 that intersect with the plurality of data lines 102, a plurality of sensing lines 104, and the pixel circuits P arranged in a matrix form. The display panel 100 may further include power lines commonly connected to the pixel circuits P. The power lines are connected to the pixel circuits P to supply the pixel circuits P with the constant voltages needed to drive the pixel circuits P.

The pixel circuit P may be divided into two or more sub-pixel circuits for color implementation. For example, three pixel circuits, which are arranged sequentially along the X-axis direction, may be divided into a red sub-pixel circuit, a green sub-pixel circuit, and a blue sub-pixel circuit.

In addition, four pixels, which are arranged sequentially along the X-axis direction, may be divided into a red sub-pixel circuit, a green sub-pixel circuit, a blue sub-pixel circuit, and a white sub-pixel circuit.

Each of the pixel circuits is connected to the data lines 102 and the gate lines 103. The pixel circuit is also connected to the sensing lines 104 and the power lines.

The pixel array includes a plurality of pixel lines L1 to Ln. Each of the pixel lines L1 to Ln includes one line of pixel circuits P arranged along the line direction (X-axis direction) in the pixel array of the display panel 100. The pixel circuits P arranged on a one-pixel line share the gate lines 103. The pixel circuits P arranged in a column direction (Y-axis direction) along the direction of the data lines share the same data lines 102 and the same sensing lines 104. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be implemented as a flexible display panel.

The power circuit 140 generates a direct current (DC) voltage (or constant voltage) required to drive the pixel array of the display panel 100 and the display panel driving circuit by using a DC-DC converter. The DC-DC converter may include a charge pump, a regulator, a buck converter, a boost converter, and the like. The power circuit 140 may generate constant voltages, such as a gamma reference voltage VGMA, a gate-on voltage VGH, a gate-off voltage VGL, a pixel driving voltage EVDD, a cathode voltage EVSS, an initialization voltage Vinit, and a reference voltage Vref, by adjusting levels of the DC input voltage that is applied from a host system (not illustrated). The gamma reference voltage VGMA is supplied to the data driving circuit 110. The gate-on voltage VGH and the gate-off voltage VGL are supplied to a level shifter 150 and a gate driving circuit 120. The constant voltages, such as the pixel driving voltage EVDD, the cathode voltage EVSS, the initialization voltage Vinit, and the reference voltage Vref, are supplied to the pixel circuits P through power lines. Here, the power lines are commonly connected to the pixel circuits P.

Meanwhile, the pixel driving voltage EVDD may be output from a main power of a host system (not illustrated), and may be supplied to the display panel 100. In this case, the power circuit 140 does not need to output the pixel driving voltage ELVDD.

The display panel driving circuit writes pixel data of an input image in the pixel circuits of the display panel 100 under the control of a timing controller 130.

The display panel driving circuit includes a data driving circuit 110 and a gate driving circuit 120.

Further, the display panel driving circuit may further include a touch sensor driving circuit (not illustrated) for driving touch sensors. The data driving circuit 110 and the touch sensor driving circuit (not illustrated) may be integrated into one drive integrated circuit (IC). In a mobile device or a wearable device, the timing controller 130, the power circuit 140, the level shifter 160, the data driving circuit 110, and the touch sensor driving circuit (not illustrated) may be integrated into one drive IC.

The data driving circuit 110 receives the pixel data of the input image that is received from the timing controller 130 as a digital signal, and outputs a data voltage. The data driving circuit 110 converts the pixel data of the input image into a gamma compensation voltage for each frame period by using a digital to analog converter (DAC), and outputs the data voltage Vdata. The gamma reference voltage VGMA is divided into a gamma compensation voltage for each gradation through a voltage divider circuit. The gamma compensation voltage for each gradation is provided to the DAC of the data driving circuit 110. The data voltage Vdata is output on each of channels of the data driving circuit 110 through an output buffer.

Meanwhile, the sensing driving of the pixel circuits P, which has been conventionally performed separately from the display driving of the pixel circuits P for external compensation, may be included in the display driving of the pixel circuits P in the present disclosure. Accordingly, in the present disclosure, the data driving circuit 110 may not need to output a data voltage for sensing when the sensing driving is performed during the display driving of the pixel circuit P.

The data driving circuit 110 transmits the electrical characteristics of the pixel circuits P transmitted through the sensing line 104 to the timing controller 130 during the display driving of the pixel circuits P. Here, the electrical characteristic of the pixel circuit P may be an analog value, and the data driving circuit 110 may convert the electrical characteristic of the pixel circuit P into a digital value, and may transmit the digital value to the timing controller 130. For this, the data driving circuit 110 may include an analog to digital converter (ADC) that converts an analog value into a digital value.

The data driving circuit 110 may transmit the electrical characteristics of each of the pixel circuits P included in the display panel 100 to the timing controller 130 through the above method.

The data driving circuit 110 may be integrated into a source driver integrated circuit (SDIC). The source driver IC may be connected to a bonding pad of the display panel 100 in a tape automated bonding (TAB) method or a chip on glass (COG) method. Further, the source driver IC may be implemented in a chip on film (COF) method.

The gate driving circuit 120 may be disposed in a non-display area NA where an image is not displayed in the display panel 100. Here, the non-display area NA may be a bezel area.

For example, the gate driving circuit 120 may be disposed in both bezel areas of the display panel 100 with the display area AA of the display panel interposed therebetween, and may supply gate signals on both sides of the gate lines 103 in a double feeding method. The gate driving circuit 120 may be disposed on either side of both bezel areas of the display panel 100, and may supply the gate signals to the gate lines 103 in a single feeding method.

Figure 2:
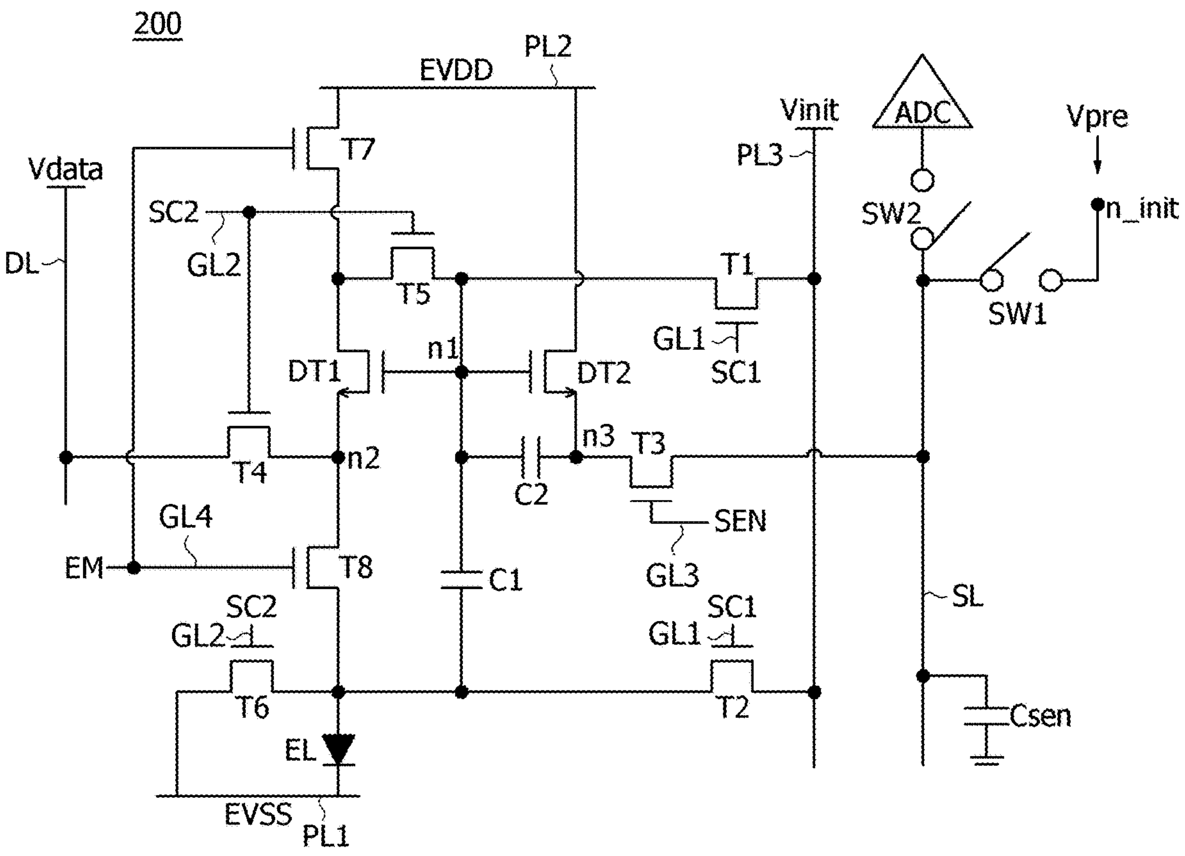
FIG. 2 is a circuit diagram exemplarily illustrating a pixel circuit according to a first embodiment of the present disclosure.

The gate driving circuit 120 may include a plurality of gate drivers that output pulses of gate signals. When the pixel circuit P is configured as shown in FIG. 2, the gate driving circuit 120 may include a first gate driver for outputting a first gate signal SC1, a second gate driver for outputting a second gate signal SC2, a third gate driver for outputting a gate signal SEN for sensing, and a fourth gate driver for outputting a gate signal EM for emission. In FIG. 2, the second gate signal SC2 may be referred to as a gate signal for writing data.

Figure 8:
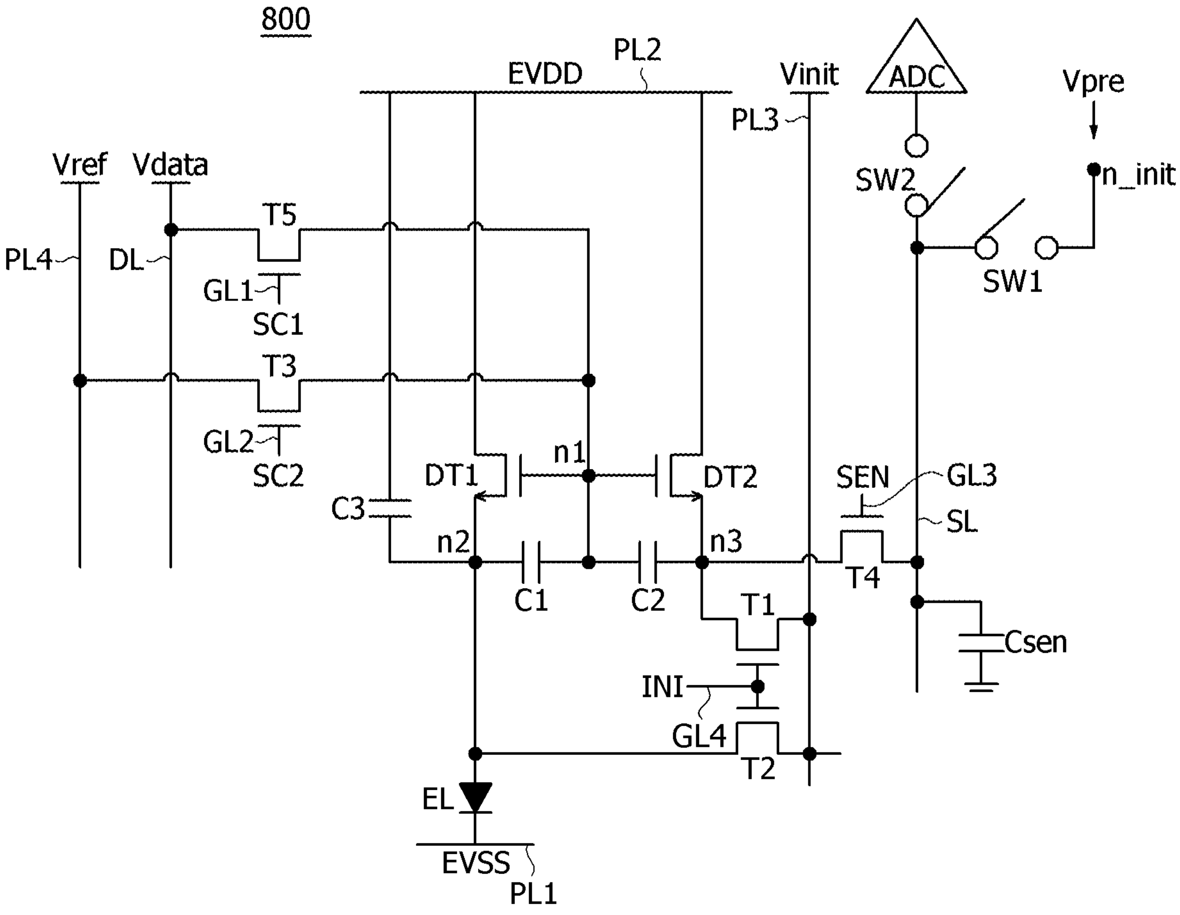
FIG. 8 is a circuit diagram exemplarily illustrating a pixel circuit according to a second embodiment of the present disclosure.
Figure 15:
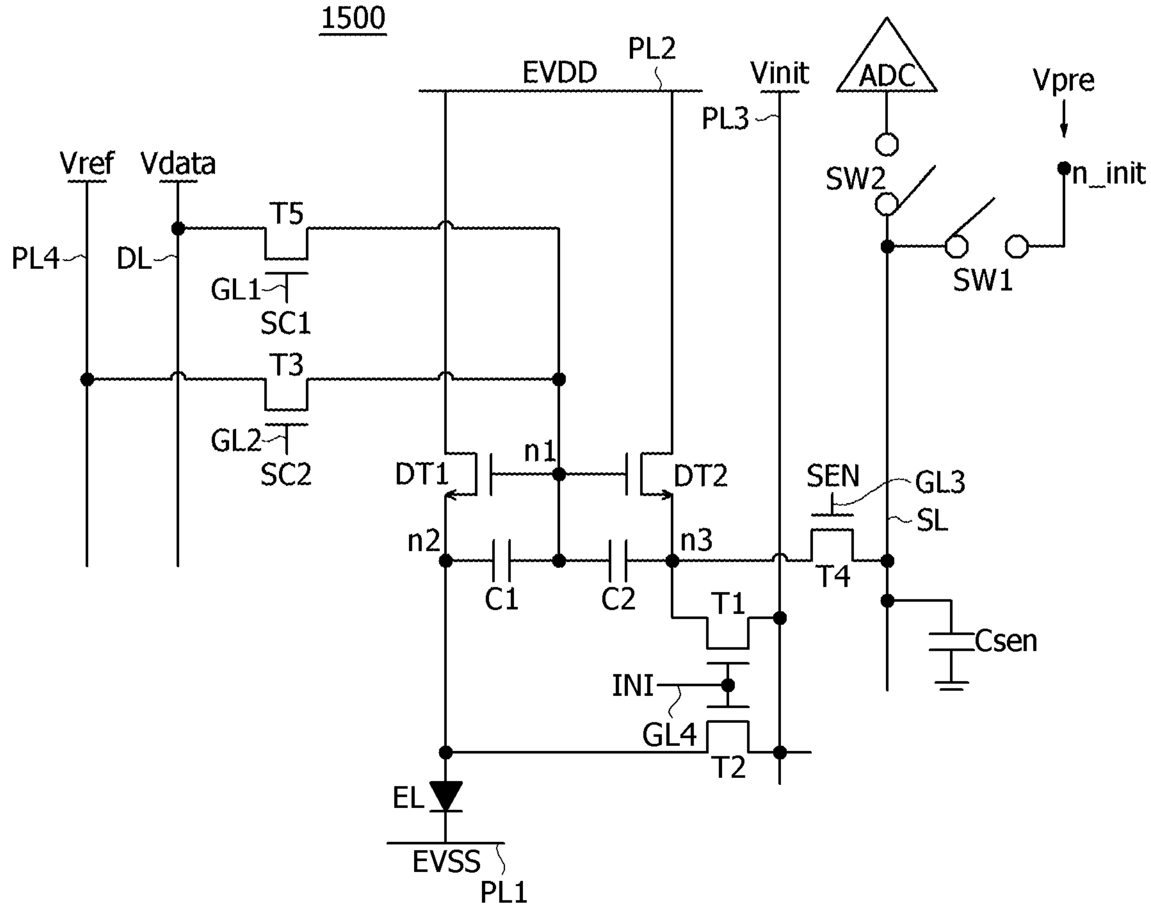
FIG. 15 is a circuit diagram exemplarily illustrating a pixel circuit according to a third embodiment of the present disclosure.

When the pixel circuit P is configured as shown in FIG. 8 and FIG. 15, the gate driving circuit 120 may include a first gate driver for outputting a first gate signal SC1, a second gate driver for outputting a second gate signal SC2, a third gate driver for outputting a gate signal SEN for sensing, and a fourth gate driver for outputting an initialization gate signal INI. In FIG. 8 and FIG. 15, the first gate signal SC1 may be referred to as a gate signal for writing data.

Figure 22:
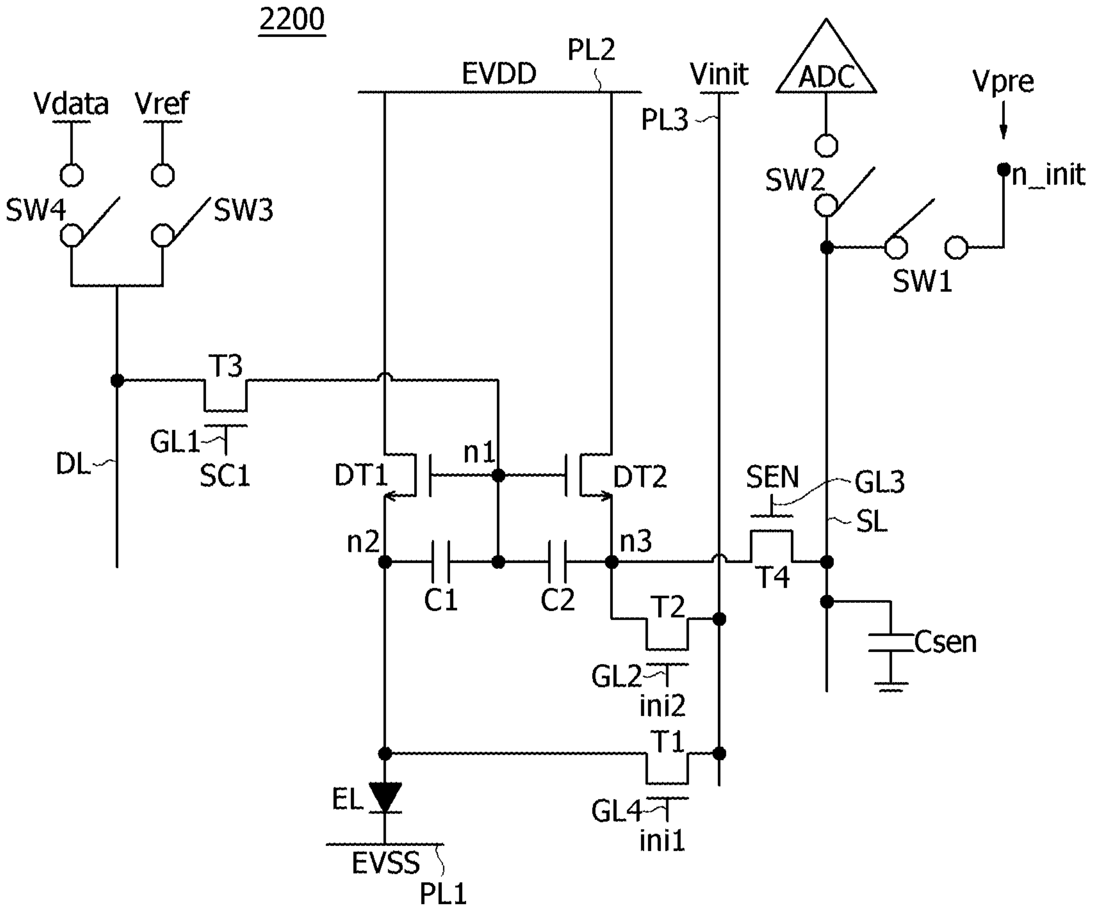
FIG. 22 is a circuit diagram exemplarily illustrating a pixel circuit according to the fourth embodiment of the present disclosure.

When the pixel circuit P is configured as shown in FIG. 22, the gate driving circuit 120 may include a first gate driver for outputting a first gate signal SC1, a second gate driver for outputting a gate signal SEN for sensing, a third gate driver for outputting a first initialization gate signal ini1, and a fourth gate driver for outputting a second initialization gate signal ini2 for second initialization. In FIG. 22, the first gate signal SC1 may be referred to as a gate signal for initialization and data writing.

Here, some of the plurality of gate drivers may be implemented as shift register circuits and the remainder may be implemented as edge trigger circuits.

A shift register circuit may output a gate signal to only one pixel line, and an edge trigger circuit may output a gate signal in common to two or more pixel lines.

Thus, a gate driver implemented as the shift register circuit may be connected to the odd and even pixel lines, one for each.

And the gate driver, implemented as the edge-triggered circuit, may be connected in common to two or more pixel lines.

The timing controller 130 receives video data and a timing signal synchronized with the video data from a host system (not illustrated). The video data received by the timing controller 130 is a digital signal. The timing controller 130 may convert the video data to suit a data format that is used in the data driving circuit 110, and may transmit the converted video data to the data driving circuit 110. Here, the timing signal may include a vertical synchronization signal, a horizontal synchronization signal, a clock signal, and a data enable signal. Since a vertical period and a horizontal period can be known through a method for counting the data enable signal, the vertical synchronization signal and the horizontal synchronization signal may be omitted. The data enable signal has a cycle of one horizontal period (1H).

The timing controller 130 may generate a data timing control signal for controlling an operation timing of the data driving circuit 110, a gate timing control signal for controlling an operation timing of the gate driving circuit 120, and the like based on the timing signal received from the host system (not illustrated).

The gate timing control signal generated from the timing controller 130 may be input to the gate driving units of the gate driving circuit 120 through the level shifter 150. The level shifter 150 may receive the input gate timing control signal, and may generate and provide a start pulse and a shift clock to the gate driving circuit 120.

In one embodiment of the present disclosure, the timing controller 130 receives electrical characteristics of each of the pixel circuits P, which is converted to digital values, from the data driving circuit 110. The timing controller 130 may then change the pixel data using a compensation value to reduce the deviation of the electrical characteristics of the pixel circuits P, and transmit the changed pixel data to the data driving circuit 110.

As described above, the display device including the display panel 100, the display panel driving circuit, the power supply circuit 140, and the level shifter 150 may sense the electrical characteristics of the pixel circuit P when driving the display of the pixel circuit P.

The pixel circuit P in such a display device may include the following configuration.

FIG. 2 is a circuit diagram exemplarily illustrating a pixel circuit according to a first embodiment of the present disclosure.

Referring to FIG. 2, the pixel circuit 200 may include a light-emitting element EL, a first driving element DT1 that drives the light-emitting element EL, a second driving element DT2 that may be electrically connected to a sensing line SL of an external compensation circuit, a first capacitor C1, a second capacitor C2, and a plurality of switch elements T1 to T8. Here, the first driving element DT1, the second driving element DT2, and the plurality of switch elements T1 to T8 may be N-channel transistors. And the N-channel transistors may be implemented as oxide TFTs.

The first driving element DT1 and the second driving element DT2 may be formed of the same material and the same structure.

For example, the first driving element DT1 and the second driving element DT2 may be formed of an oxide semiconductor material. In addition, the first driving element DT1 and the second driving element DT2 may be formed to have the same gate length and width, channel depth, and the like. Thus, the first driving element DT1 and the second driving element DT2 are substantially identical.

The pixel circuit 200 according to the first embodiment is connected to a data line DL to which a data voltage Vdata is applied, and to gate lines GL1 to GLA to which gate signals SC1, SC2, EM, and SEN are applied. The pixel circuit 200 is connected to the sensing line SL to which a sensing reference voltage Vpre is applied when the display is driven.

Here, an initialization switch element SW1 and a sampling switch element SW2 may be connected to the sensing line SL. The initialization switch element SW1 may selectively connect the initialization voltage node n_init and the sensing line SL, and the sampling switch element SW2 may selectively connect the analog-to-digital converter ADC and the sensing line SL. The initialization switch element SW1 and the sampling switch element SW2 may be included in the data driving circuit 110 along with the analog-to-digital converter ADC.

When driving the display of the pixel circuit 200, a sensing voltage including the electrical characteristics of the pixel circuit 200 may be applied to the sensing line SL.

In other words, a sensing voltage including a threshold voltage of the second driving element DT2 included in the pixel circuit 200 may be applied to the sensing line SL.

Meanwhile, the pixel circuit 200 may include a cathode power line PL1 for supplying a cathode voltage EVSS, a driving power line PL2 for supplying a pixel driving voltage EVDD, and an initialization power line PL3 for supplying an initialization voltage Vinit. On the display panel 100, the power lines PL1, PL2, and PL3 may be connected in common to all of the pixels.

In the first embodiment, the pixel driving voltage EVDD is set to a voltage which is greater than a maximum voltage (White) of the data voltage Vdata and which allows the first and second driving elements DT1 and DT2 to operate in a saturation region. The initialization voltage Vinit may be set to a voltage greater than the maximum voltage of the data voltage Vdata and less than the pixel driving voltage EVDD.

A gate-on voltage VGH may be set to a voltage greater than the pixel driving voltage EVDD, and a gate-off voltages VGL may be set to a voltage less than the cathode voltage EVSS.

In addition, the sensing reference voltage Vpre may be set to a voltage greater than the cathode voltage EVSS and less than the maximum voltage of the data voltage Vdata.

For example, when the maximum voltage (White) of the data voltage Vdata is 6 V and the minimum voltage (Black) is 1 V, the pixel driving voltage EVDD may be set to 16 V. The initialization voltage Vinit may be set to 10 V and the cathode voltage EVSS may be set to 3 V.

The gate-on voltage VGH may be set to 18 V, and the gate-off voltage VGL may be set to −6 V. In addition, the sensing reference voltage Vpre may be set to 4 V.

In other words, the magnitudes of the voltages applied to the pixel circuit 200 according to the first embodiment may be: the gate-on voltage VGH>the pixel driving voltage EVDD>the initialization voltage Vinit>the maximum voltage (White)>the sensing reference voltage Vpre>the cathode voltage EVSS>the minimum voltage (Black)>the gate off voltage VGL.

The gate signals SC1, SC2, EM, and SEN each include pulses that swing between the gate-on voltage VGH and the gate-off voltage VGL. The gate signals SC1, SC2, EM, and SEN include a first gate signal SC1, a second gate signal SC2, a gate signal EM for emission, and a gate signal SEN for sensing. Here, the second gate signal SC2 may also be referred to as a gate signal for writing data.

Figure 3:
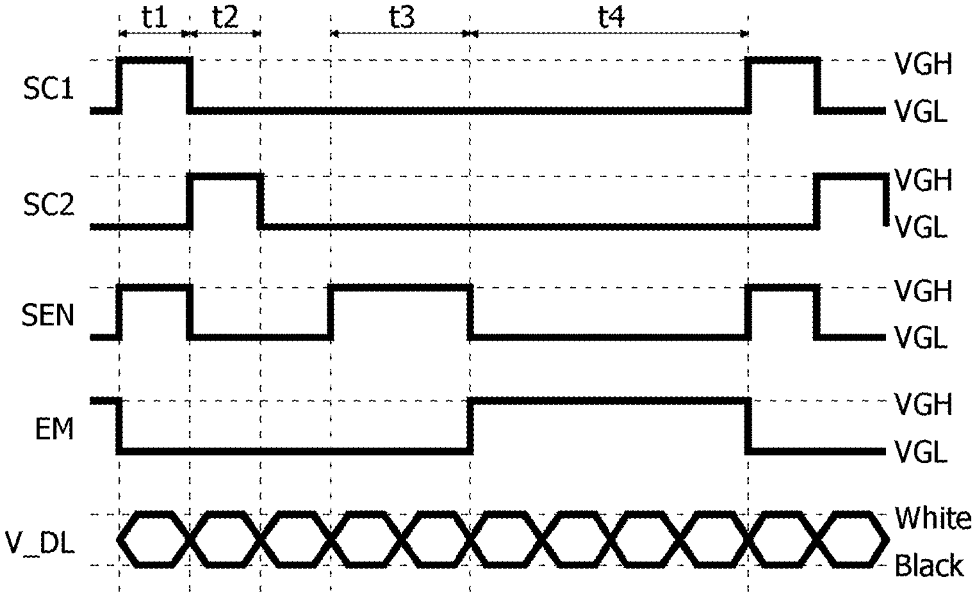
FIG. 3 is a waveform diagram illustrating the waveform of signals applied in driving a display of a pixel circuit according to the first embodiment of the present disclosure.

The pixel circuit 200 is driven in the following order: an initialization period t1, a sampling period t2, a pixel sensing period t3, and an emission period t4. The initialization period t1, the sampling period t2, the pixel sensing period t3, and the emission period t4 may be determined by waveforms of the gate signals SC1, SC2, EM, and SEN as shown in FIG. 3.

Specifically, in the initialization period t1, the voltage of the first gate signal SC1 and the gate signal SEN for sensing is the gate-on voltage. In the initialization period t1, the voltage of the second gate signal SC2 and the gate signal EM for emission is the gate-off voltage VGL.

In the sampling period t2, the voltage of the second gate signal SC2 is the gate-on voltage VGH. In the sampling period t2, the voltage of the first gate signal SC1, the gate signal SEN for sensing, and the gate signal EM for emission is the gate-off voltage VGL.

In the pixel sensing period t3, the voltage of the gate signal SEN for sensing is the gate-on voltage VGH. In the pixel sensing period t3, the voltage of the first gate signal SC1, the second gate signal SC2, and the gate signal EM for emission is the gate-off voltage VGL.

In the emission period t4, the voltage of the gate signal EM for sensing is the gate-on voltage VGH. In the emission period t4, the voltage of the first gate signal SC1, the second gate signal SC2, and the gate signal SEN for sensing is the gate-off voltage VGL.

Meanwhile, the first driving element DT1 of the pixel circuit 200 generates a driving current according to a gate-source voltage Vgs for driving the light-emitting element EL. This first driving element DT1 includes a first-first electrode selectively connected to a driving power line PL2 for supplying the pixel driving voltage EVDD, a first gate electrode connected to a first node n1, and a second-first electrode connected to a second node n2 to which the data voltage is applied.

The second driving element DT2 of the pixel circuit 200 includes a first-two electrode (e.g., a drain electrode) connected to the driving power line PL2, a second gate electrode connected to the first node n1, and a second-second electrode (e.g., a source electrode) connected to a third node n3.

The second driving element DT2 may receive the same level of stress as the stress received by the first driving element DT1 when driving the display of the pixel circuit 200. In other words, the first driving element DT1 and the second driving element DT2 may be deteriorated to the same degree when driving the display of the pixel circuit 200. Thus, the sensed deterioration of the second driving element DT2 is a proxy for the deterioration of the first driving element DT1.

Here, the stress may be positive bias temperature stress (PBTS), negative bias temperature stress (NBTS), or the like.

The light-emitting element EL may be implemented as an OLED. The light-emitting element EL includes an anode electrode and a cathode electrode to emit light by a driving current from the first driving element DT1.

An anode electrode of the light-emitting element EL is selectively connected to the second node n2 due to the eighth switch element T8, and a cathode electrode thereof is connected to the cathode power line PL1 to which the cathode voltage EVSS is applied. Here, the second node n2 may be selectively connected to the anode electrode of the light-emitting element EL by turning on and turning off an eighth switch element T8.

The first capacitor C1 is connected to the first node n1 and the anode electrode of the light-emitting element EL to store a threshold voltage Vth1 of the first driving element DT1 sampled during the sampling period t2 and to maintain a gate-source voltage Vgs1 of the first driving element DT1 during the emission period t4.

The second capacitor C2 is connected to the first node n1 and the third node n3 to store a threshold voltage Vth2 of the second driving element DT2 sampled during the sampling period t2. That is, the second capacitor C2 is connected to the first gate electrode of the first driving element DT1 and the second gate electrode of the second driving element DT2 at the first node n1 and the second-second electrode of the second driving element DT2 and the third switch element T3 at the third node n3.

Meanwhile, the switch elements T1 to T8 of the pixel circuit 200 include a first switch element T1 and a second switch element T2 that are turned on in response to the gate-on voltage VGH of the first gate signal SC1, a third switch element T3 that is turned on in response to the gate-on voltage VGH of the gate signal SEN for sensing, and a fourth switch element T4, a fifth switch element T5, and a sixth switch element T6 that are turned on in response to the gate-on voltage VGH of the second gate signal SC2, and a seventh switch element T7 and the eighth switch element T8 that are turned on in response to the gate-on voltage VGH of the gate signal EM for emission.

The first switch element T1 is connected between an initialization power line PL3 and the first node n1.

Specifically, a first electrode of the first switch element T1 is connected to the initialization power line PL3, and a second electrode thereof is connected to the first node n1. And a gate electrode thereof is connected to the first gate line GL1 so that the first gate signal SC1 is applied to the gate electrode.

This first switch element T1 is turned on in response to the gate-on voltage VGH of the first gate signal SC1. When the first switch element T1 is turned on, the initialization power line PL3 and the first node n1 are electrically connected so that the initialization voltage Vinit is applied to the first node n1, i.e., to the first gate electrode of the first driving element DT1 and the second gate electrode of the second driving element DT2.

Here, the first switch element T1 is turned on only during the initialization period t1 because the voltage of the first gate signal SC1 during the initialization period t1 is the gate-on voltage VGH. Therefore, in the initialization period t1, the initialization voltage Vinit is applied to the first gate electrode of the first driving element DT1 and the second gate electrode of the second driving element DT2.

The second switch element T2 is connected between the initialization power line PL3 and the anode electrode of the light emitting element EL.

Specifically, a first electrode of the second switch element T2 is connected to the initialization power line PL3, and a second electrode thereof is connected to the anode electrode of the light-emitting element EL. And a gate electrode thereof is connected to the first gate line GL1 so that the first gate signal SC1 is applied to the gate electrode.

This second switch element T2 is turned on in response to the gate-on voltage VGH of the first gate signal SC1. When the second switch element T2 is turned on, the initialization power line PL3 and the anode electrode of the light-emitting element EL are electrically connected, and the initialization voltage Vinit is applied to the anode electrode of the light-emitting element EL.

Here, the second switch element T2 is turned on only during the initialization period t1 because the voltage of the first gate signal SC1 during the initialization period t1 is the gate-on voltage VGH.

Therefore, the initialization voltage Vinit is applied during the initialization period t1, and the initialization voltage Vinit is applied to the anode electrode of the light-emitting element EL.

The third switch element T3 is connected between the sensing line SL and the third node n3.

Specifically, a first electrode of the third switch element T3 is connected to the sensing line SL, and a second electrode thereof is connected to the third node n3. And a gate applied to the gate electrode.

This third switch element T3 is turned on in response to the gate-on voltage VGH of the gate signal SEN for sensing.

Here, the third switch element T3 is turned on during the initialization period t1 and then turned off during the sampling period t2 because the voltage of the gate signal SEN for sensing is the gate-on voltage VGH during the initialization period t1 and the pixel sensing period t3. And then it is turned on again during the pixel sensing period t3.

During the initialization period t1, the initialization switch element SW1 may also be turned on along with the third switch element T3.

When the third switch element T3 and the initialization switch element SW1 are turned on, the sensing reference voltage Vpre may be applied to the third node n3.

During the pixel sensing period t3, the sampling switch element SW2 may also be turned on along with the third switch element T3.

When the third switch element T3 is turned on, the sensing voltage formed at the third node n3 is transferred to the sensing line SL, so that a capacitor Csen for sensing connected to the sensing line SL may be charged with the sensing voltage. And when the sampling switch element SW2 is turned on, the sensing voltage charged in the capacitor Csen for sensing may be passed to the analog-to-digital converter ADC. Here, the sensing voltage may include a threshold voltage Vth2 of the second driving element DT2.

The third switch element T3 described above is an element for transferring the sensing voltage of the second driving element DT2, i.e., the sensing voltage of the pixel circuit 200, to the sensing line SL during the pixel sensing period t3, and thus the third switch element T3 may be referred to as a switch element for sensing.

The fourth switch element T4 is connected between the data line DL, which supplies the data voltage Vdata, and the second node n2.

Specifically, a first electrode of the fourth switch element T4 is connected to the data line DL, and a second electrode thereof is connected to the second-first electrode of the first driving element DT1 at the second node n2. And a gate electrode thereof is connected to the second gate line GL2 so that the second gate signal SC2 is applied to the gate electrode.

The fourth switch element T4 is turned on in response to the gate-on voltage VGH of the second gate signal SC2.

Here, the fourth switch element T4 is turned on only during the sampling period t2 because the voltage of the second gate signal SC2 is the gate-on voltage VGH in the sampling period t2.

In other words, during the sampling period t2, the fourth switch element T4 electrically connects the data line DL and the second node n2.

The fifth switch element T5 is connected between the first-first electrode of the first drive element DT1 and the first node n1.

Specifically, a first electrode of the fifth switch element T5 is connected to the first-first electrode of the first drive element DT1, and a second electrode thereof is connected to the first gate electrode and the second gate electrode at the first node n1. And a gate electrode thereof is connected to the second gate line GL2 so that the second gate signal SC2 is applied to the gate electrode.

The fifth switch element T5 is turned on in response to the gate-on voltage VGH of the second gate signal SC2 to electrically connect the first-first electrode and the first gate electrode of the first driving element DT1.

Here, the fifth switch element T5 is turned on only during the sampling period t2 because the voltage of the second gate signal SC2 is the gate-on voltage VGH in the sampling period t2.

In other words, in the sampling period t2, the fifth switch element T5 electrically connects the first-first electrode of the first driving element DT1 and the first node.

Since the fourth switch element T4 and the fifth switch element T5 as described above are switch elements for writing the data voltage Vdata to the pixel circuit 200 in the sampling period t2, the fourth switch element T4 may be referred to as a switch element for writing the first data, and the fifth switch element T5 may be referred to as a switch element for writing the second data.

The sixth switch element T6 is connected between the cathode power line PL1 and the anode electrode of the light emitting element EL.

Specifically, a first electrode of the sixth switch element T6 is connected to the cathode power line PL1, and a second electrode thereof is connected to the anode electrode of the light-emitting element EL. And a gate electrode thereof is connected to the second gate line GL2 so that the second gate signal SC2 is applied to the gate electrode.

The sixth switch element T6 is turned on in response to the gate-on voltage VGH of the second gate signal SC2.

Here, the sixth switch element T6 is turned on only during the sampling period t2 because the voltage of the second gate signal SC2 is the gate-on voltage VGH in the sampling period t2.

In other words, in the sampling period t2, the sixth switch element T6 electrically connects the cathode power line PL1 and the anode electrode of the light-emitting element EL.

The seventh switch element T7 is connected between the driving power line PL2 and the first-first electrode of the first driving element DT1.

Specifically, a first electrode of the seventh switch element T7 is connected to the driving power line PL2, and a second electrode thereof is connected to the first-first electrode of the first driving element DT1. And a gate electrode thereof is connected to a fourth gate line GLA so that the gate signal EM for emission is applied to the gate electrode.

The eighth switch element T8 is connected between the second node n2 and the anode electrode of the light-emitting element EL.

Specifically, a first electrode of the eighth switch element T8 is connected to the second node n2, and a second electrode thereof is connected to the anode electrode of the light-emitting element EL. And a gate electrode thereof is connected to a fourth gate line GL4 so that the gate signal EM for emission is applied to the gate electrode.

These seventh switch element T7 and eighth switch element T8 are turned on in response to the gate-on voltage VGH of the gate signal EM for emission.

Here, the seventh switch element T7 and the eighth switch element T8 are turned on only during the emission period t4 because the voltage of the gate signal EM for emission in the emission period t4 is the gate-on voltage VGH.

When the seventh switch element T7 and the eighth switch element T8 are turned on during the emission period t4, a current path between the driving power line PL2 and the cathode power line PL1 may be formed. The current path may allow the driving current to flow to the light-emitting element EL.

Hereinafter, the operation of the pixel circuit 200 according to the first embodiment will be described in stages corresponding to the display driving period of the pixel circuit 200.

Figure 4:
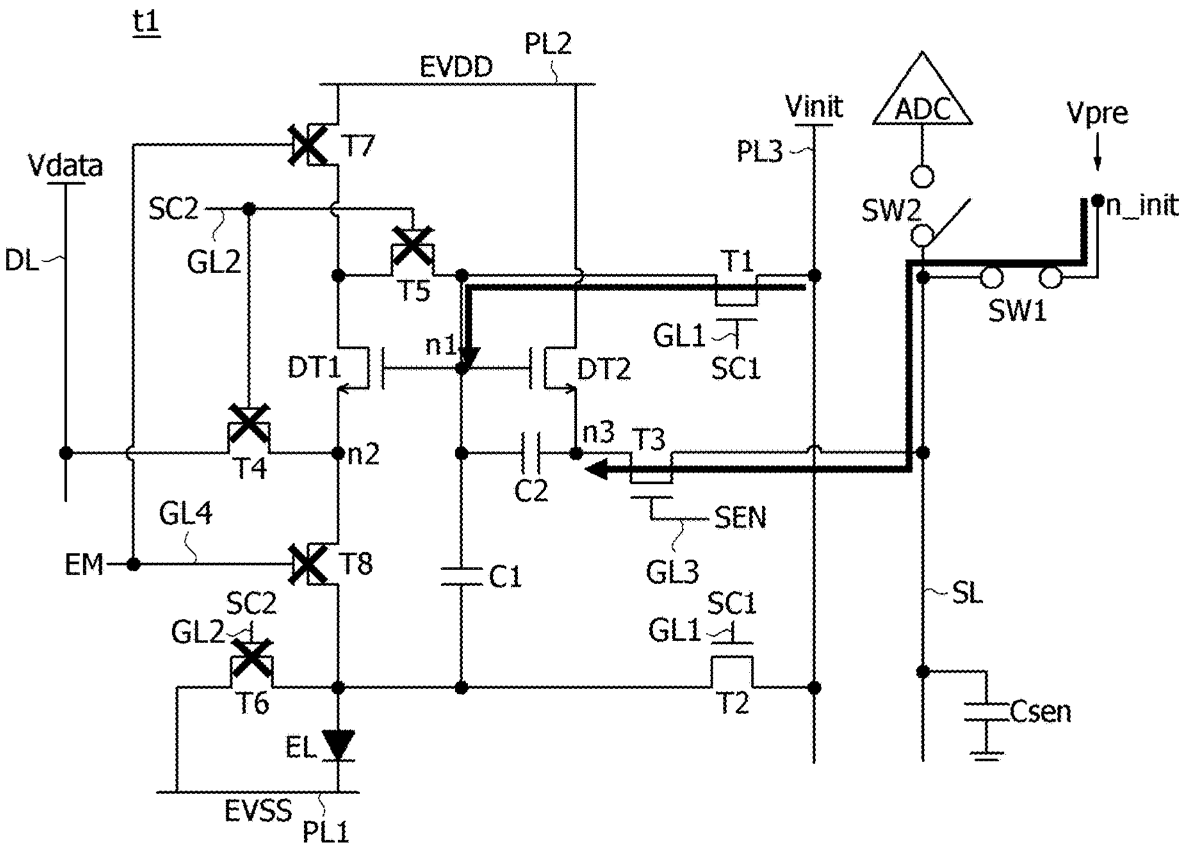
FIG. 4 is a diagram illustrating an operation during an initialization period of a display driving period of a pixel circuit according to the first embodiment of the present disclosure.
Figure 5:
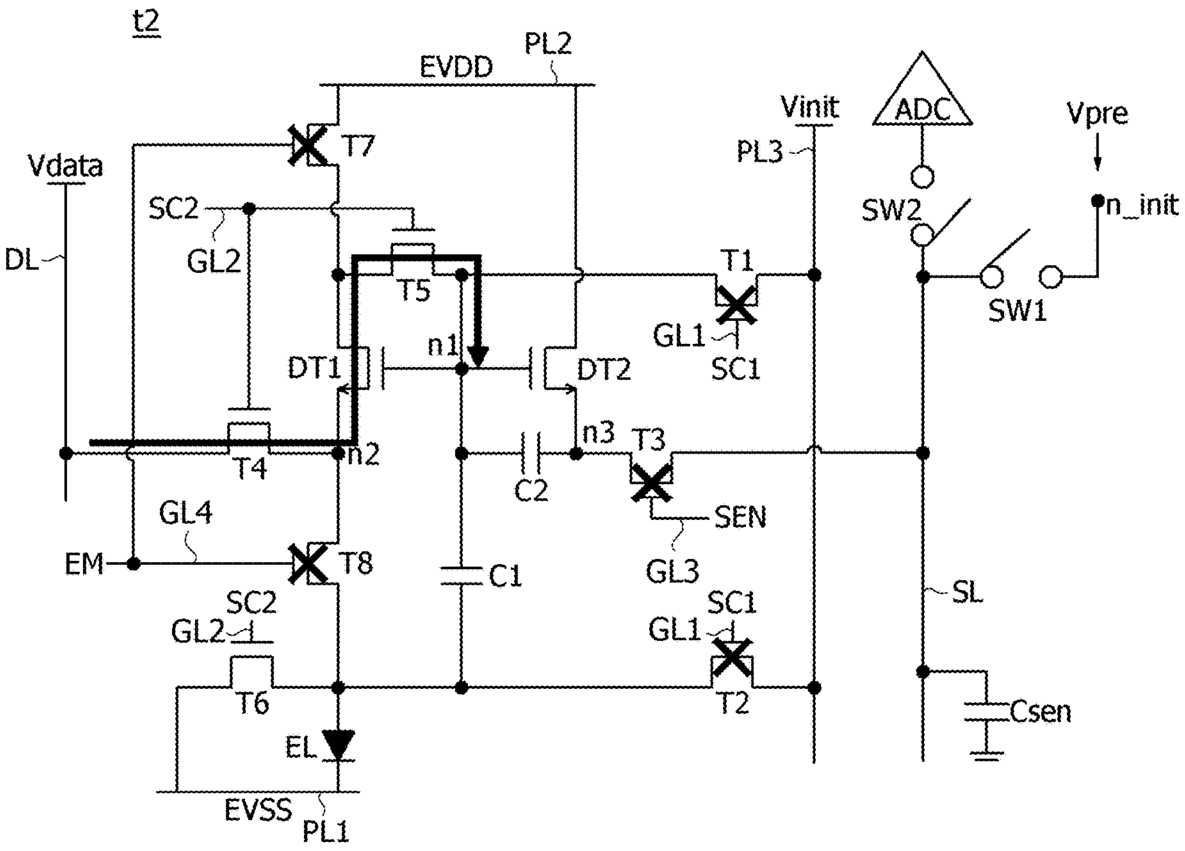
FIG. 5 is a diagram illustrating an operation during a sampling period of a display driving period of a pixel circuit according to the first embodiment of the present disclosure.
Figure 6:
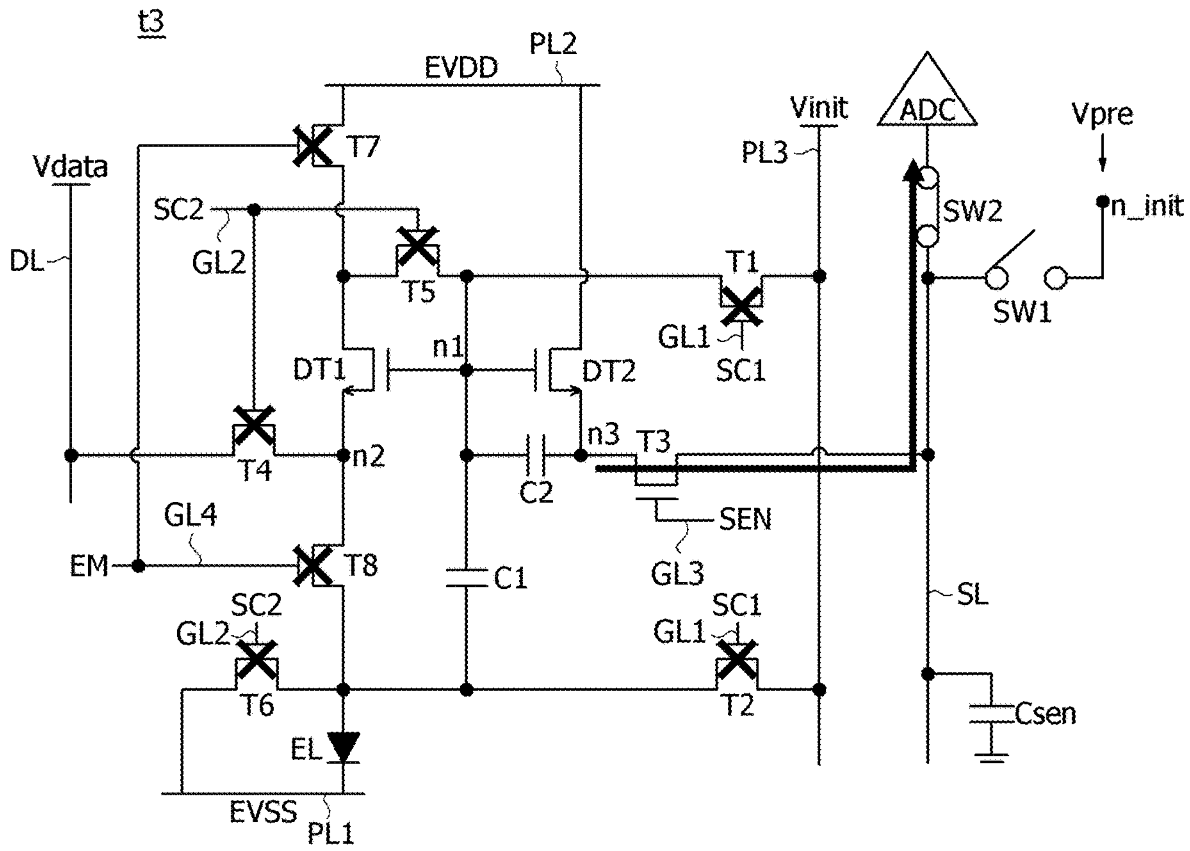
FIG. 6 is a diagram illustrating an operation during a pixel sensing period of a display driving period of a pixel circuit according to the first embodiment of the present disclosure.
Figure 7:
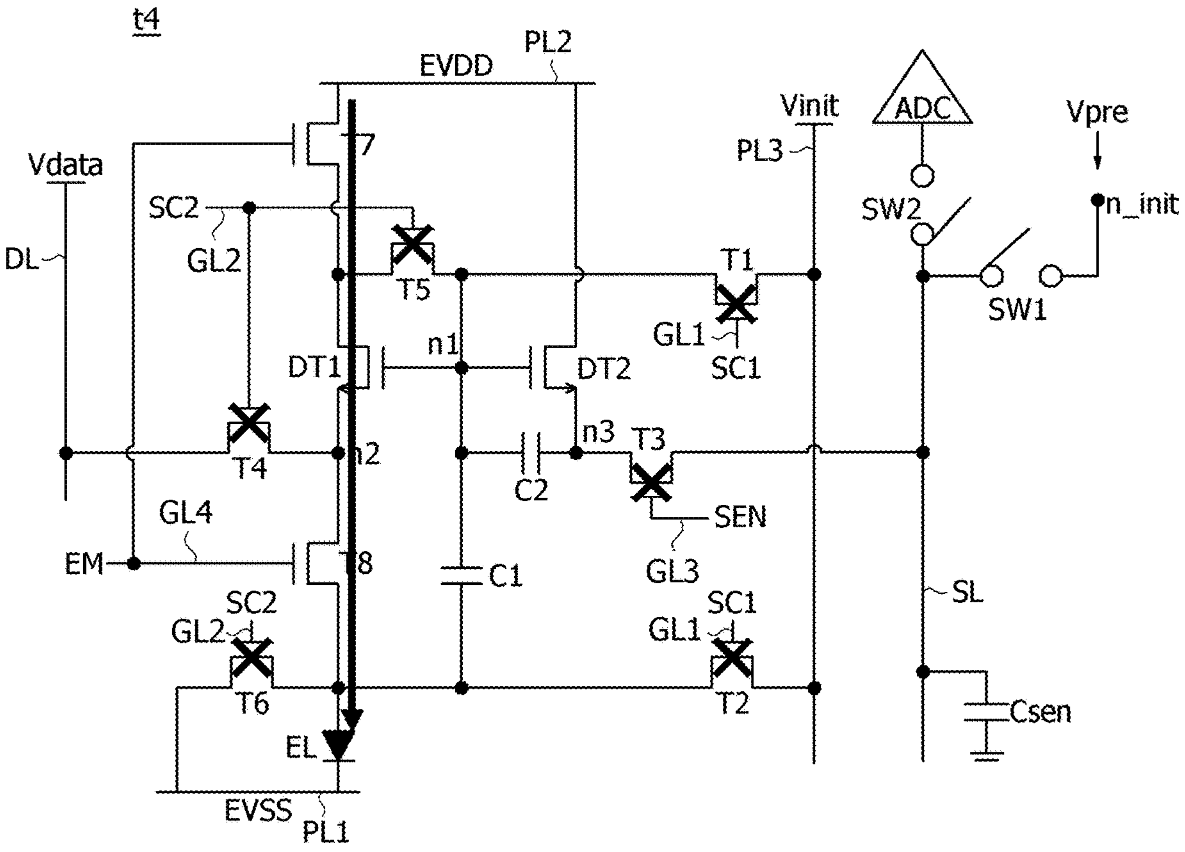
FIG. 7 is a diagram illustrating an operation during an emission period of a display driving period of a pixel circuit according to the first embodiment of the present disclosure.

FIG. 4 is a diagram illustrating an operation during an initialization period of a display driving period of a pixel circuit according to a first embodiment of the present disclosure. FIG. 5 is a diagram illustrating an operation during a sampling period of a display driving period of a pixel circuit according to the first embodiment of the present disclosure. FIG. 6 is a diagram illustrating an operation during an external sensing period of a display driving period of a pixel circuit according to the first embodiment of the present disclosure. FIG. 7 is a diagram illustrating an operation during an emission period of a display driving period of a pixel circuit according to the first embodiment of the present disclosure.

Referring to FIG. 4, during the initialization period T1, main nodes of the pixel circuit 200 are initialized. During the initialization period t1, the voltage of the first gate signal SC1 and the gate signal SEN for sensing is the gate-on voltage VGH, as shown in FIG. 3. During the initialization period t1, the voltage of the second gate signal SC2 and the gate signal EM for emission is the gate-off voltage VGL.

Therefore, during the initialization period t1, the first switch element T1 and the second switch element T2 are turned on in response to the gate-on voltage VGH of the first gate signal SC1, and the third switch element T3 is turned on in response to the gate signal SEN for sensing.

The initialization switch element SW1 is also turned on in the initialization period t1.

On the other hand, the fourth switch element T4, the fifth switch element T5, and the sixth switch element T6 are turned off according to the gate-off voltage VGL of the second gate signal SC2. And the seventh switch element T7 and the eighth switch element T8 are turned off according to the gate-off voltage VGL of the gate signal EM for emission.

As a result, in the initialization period t1, the voltage of the first node n1 is initialized to the initialization voltage Vinit, and the voltage of the third node n3 is initialized to the sensing reference voltage Vpre. Then, as the potential of the first node n1 rises due to the initialization voltage Vinit, the first driving element DT1 and the second driving element DT2 are turned on.

Although not shown in FIG. 4, in the initialization period t1, the anode electrodes of the light-emitting element EL may also be initialized to an initialization voltage Vinit. The sensing line SL and the capacitor Csen for sensing may also be initialized to the sensing reference voltage Vpre.

Referring to FIG. 5, during the sampling period t2, the data voltage Vdata is written, and the threshold voltage Vth1 of the first driving element DT1 is sampled by the first capacitor C1. The threshold voltage Vth2 of the second driving element DT2 is also sampled by the second capacitor C2.

The voltage of the second gate signal SC2 is the gate-on voltage VGH during the sampling period t2, as shown in FIG. 3. The voltage of the first gate signal SC1, the gate signal SEN for sensing, and the gate signal EM for emission is the gate-off voltage VGL during the sampling period t2.

Therefore, during the sampling period t2, the fourth switch element T4, which is the switch element for writing the first data, and the fifth switch element T5, which is the switch element for writing the second data, are turned on in response to the gate-on voltage VGH of the second gate signal SC2.

The sixth switch element T6 is also turned on in response to the gate-on voltage VGH of the second gate signal SC2.

On the other hand, the first switch element T1 and the second switch element T2 are turned off according to the gate-off voltage VGL of the first gate signal SC1.

The third switch element T3 is turned off by the gate-off voltage VGL of the gate signal SEN for sensing.

The seventh switch element T7 and the eighth switch element T8 are turned off according to the gate-off voltage VGL of the gate signal EM for emission.

In the sampling period t2, the initialization switch element SW1 and the sampling switch element SW2 are also turned off.

As a result, the data voltage Vdata is applied to the second node n2 in the sampling period t2.

When the data voltage Vdata is applied to the second node n2, the data voltage may be applied to the first node n1 via the second-first electrode (e.g., the source electrode) and the first-first electrode (e.g., the drain electrode) of the first driving element DT1.

In other words, the first driving element DT1 may be in a diode connection state, and thus the data voltage Vdata applied to the second node n2 may be delivered to the first node n1. The diode connection here refer to that the first-first electrode and the gate electrode of the first driving element DT1 are electrically connected.

As a result, the voltage of the first node n1 may be a voltage of (Vdata+Vth1), which is the sum of the data voltage Vdata and the threshold voltage Vth1 of the first driving element DT1.

And the voltage of the third node n3 may be the sensing voltage including the threshold voltage Vth2 of the second driving element DT2. Here, the sensing voltage may further include the data voltage Vdata and the threshold voltage Vth1 of the first driving element DT1.

Specifically, the sensing voltage may be a voltage of (Vdata+Vth1−Vth2), which is the sum of the data voltage Vdata and the threshold voltage Vth1 of the first drive element DT1 minus the threshold voltage Vth2 of the second drive element DT2.

In the sampling period t2, the gate-source voltage Vgs1 of the first driving element DT1, which is charged in the first capacitor C1, becomes a voltage of (Vdata+Vth1−Vdata), which is the voltage (Vdata+Vth1) of the first node n1 minus the voltage Vdata of the second node n2. In other words, in the sampling period t2, the threshold voltage Vth1 of the first driving element DT1 is charged in the first capacitor C1.

In the sampling period t2, the gate-source voltage Vgs2 of the second driving element DT2, which is charged in the second capacitor C2, becomes a voltage of (Vdata+Vth1−Vdata−Vth1+Vth2), which is the voltage (Vdata+Vth1) of the first node n1 minus the voltage (Vdata+Vth1−Vth2) of the third node n3. In other words, in the sampling period t2, the threshold voltage Vth2 of the second driving element DT2 is charged in the second capacitor C2.

Although not shown in FIG. 5, the cathode voltage EVSS may be applied to the anode electrode of the light-emitting element EL during the sampling period t2.

Referring to FIG. 6, the sensing voltage (Vdata+Vth1−Vth2) formed at the third node n3 is applied to the sensing line SL during the pixel sensing period t3.

In other words, after the data voltage Vdata is applied to the second node n2, the gate-on voltage VGH of the gate signal SEN for sensing is input to the third switch element T3, which is a switch element for sensing, so that the sensing voltage (Vdata+Vth−Vth2) formed at the third node n3 may be applied to the sensing line SL.

The voltage of the gate signal SEN for sensing is the gate-on voltage VGH during the pixel sensing period t3, as shown in FIG. 3. During the pixel sensing period t3, the voltage of the first gate signal SC1, the second gate signal SC2, and the gate signal EM for emission is the gate-off voltage VGL.

Therefore, during the pixel sensing period t3, the third switch element T3, which is a switch element for sensing, is turned on responsive to the gate-on voltage VGH of the gate signal SEN for sensing.

In the pixel sensing period t3, the sampling switch element SW2 is also turned on.

On the other hand, the first switch element T1 and the second switch element T2 are turned off according to the gate-off voltage VGL of the first gate signal SC1, and the fourth switch element T4, the fifth switch element T5, and the sixth switch element T6 are turned off according to the gate-off voltage VGL of the second gate signal SC2.

And the seventh switch element T7 and the eighth switch element T8 are turned off according to the gate-off voltage VGL of the gate signal EM for emission. In the pixel sensing period t3, the initialization switch element SW1 is also turned off.

As a result, the sensing voltage (Vdata+Vth1−Vth2) formed at the third node n3 in the pixel sensing period t3 is applied to the sensing line SL. Thus, the third switch element T3 applies the sensing voltage at the third node to the external compensation circuit via the sensing line SL. As further described below, the sensing voltage is indicative of a characteristic (e.g., threshold voltage) of at least the second driving element DT2. Here, the sensing voltage includes the threshold voltage of the first driving element DT1 and the threshold voltage of the second driving element DT2.

The capacitor Csen for sensing on the sensing line SL may be charged with the sensing voltage (Vdata+Vth1−Vth2), and the sensing voltage (Vdata+Vth1−Vth2) charged in the capacitor Csen for sensing may be transferred to the analog-to-digital converter ADC.

The analog-to-digital converter ADC may convert an analog value, the sensing voltage, to a digital value, the sensing data. The converted sensing data may be sent to the timing controller 130.

Here, since the sensing voltage (Vdata+Vth1−Vth2) includes the threshold voltage Vth1 of the first driving element DT1 (e.g., characteristic of the first driving element DT1) and the threshold voltage Vth2 of the second driving element DT2 (e.g., characteristic of the second driving element DT2), the timing controller 130 may determine the degree of deterioration of the pixel circuit 200 by using at least one of the threshold voltage Vth1 of the first driving element DT1 and the threshold voltage Vth2 of the second driving element DT2.

The timing controller 130 may then change the pixel data of the input image to a compensation value corresponding to the degree of deterioration of the pixel circuit 200. That is, the timing controller 130 may change the pixel data such that the data voltage that is applied to the first gate electrode of the first driving element DT1 and the second gate electrode of the second driving element DT2 is compensated based on the sensing voltage that includes at least the threshold voltage of the second driving element. Thus, the deterioration of the second driving element DT2 is used as a proxy for the deterioration of the first driving element DT1.

Referring to FIG. 7, the voltage of the gate signal EM for emission during the emission period t4 is the gate-on voltage VGH, as shown in FIG. 3. The voltage of the first gate signal SC1, the second gate signal SC2, and the gate signal SEN for sensing is the gate-off voltage VGL during the emission period t4.

Therefore, during the light emission period t4, the seventh switch element T7 and the eighth switch element T8 are turned on in response to the gate-on voltage VGH of the gate signal EM for emission.

On the other hand, the first switch element T1 and the second switch element T2 are turned off according to the gate-off voltage VGL of the first gate signal SC1, and the third switch element T3 is turned off according to the gate-off voltage VGL of the gate signal SEN for sensing. In addition, the fourth switch element T4, the fifth switch element T5, and the sixth switch element T6 are turned off according to the gate-off voltage VGL of the second gate signal SC2. In the emission period t4, the initialization switch element SW1 and the sampling switch element SW2 are also turned off.

In response to the turn-on or turn-off of the switch elements as described above, a current path between the cathode power line PL1 and the driving power line PL2 is formed in the emission period t4, and the light-emitting element EL may be emitted by the driving current flowing through the first driving element DT1. Here, the light-emitting element EL may emit at a brightness corresponding to the grayscale value of the pixel data.

Meanwhile, in the emission period t4, the voltage of the first node n1 becomes Vdata+Vth1, and the voltage of the second node n2 becomes the cathode voltage EVSS.

Therefore, the gate-source voltage Vgs1 of the first driving element DT1 becomes a voltage of (Vdata+Vth1−EVSS) in the emission period t4.

A current (Ioled) flowing through the light-emitting element EL during the emission period t4 is determined by the following equation:

[Equation 1]

$$Ioled = K(Vgs1 - Vth1)2 = K[(Vdata + Vth1 - EVSS - Vth1]2 = K(Vdata - EVSS)2.$$

Where Vgs1 denotes the gate-source voltage of the first driving element DT1, and K denotes a constant value determined by the mobility and parasitic capacity of the first driving element DT1. Further, Vdata denotes the data voltage, Vth1 denotes the threshold voltage of the first driving element DT1, and EVSS denotes the cathode voltage.

As indicated in Equation 1, the threshold voltage Vth1, which is the electrical characteristic of the first driving element DT1, is not reflected to the driving current (Ioled) flowing through the light-emitting element EL, but only the data voltage Vdata is reflected to the driving current (Ioled). In other words, the current (Ioled) flowing through the light-emitting element EL is the current compensated for the threshold voltage Vth1 of the first driving element DT1.

As described above, in the first embodiment of the present disclosure, both sensing of the pixel circuit 200 for external compensation and internal compensation thereof may be performed when driving the display of the pixel circuit 200. Here, the internal compensation of the pixel circuit 200 may be performed in a diode connection manner.

FIG. 8 is a circuit diagram exemplarily illustrating a pixel circuit according to a second embodiment of the present disclosure.

Referring to FIG. 8, the pixel circuit 800 according to the second embodiment may include a light-emitting element EL, a first driving element DT1 that drives the light-emitting element EL, a second driving element DT2 that may be electrically connected to a sensing line SL of an external compensation circuit, a first capacitor C1, a second capacitor C2, a third capacitor C3, and a plurality of switch elements T1 to T5. Here, the first driving element DT1, the second driving element DT2, and the plurality of switch elements T1 to T5 may be N-channel transistors. And the N-channel transistors may be implemented as oxide TFTs.

The first driving element DT1 and the second driving element DT2 may be formed of the same material and the same structure. Thus, the first driving element DT1 and the second driving element DT2 are identical to each other.

For example, the first driving element DT1 and the second driving element DT2 may be formed of an oxide semiconductor material. In addition, the first driving element DT1 and the second driving element DT2 may be formed to have the same gate length and width, channel depth, and the like.

The pixel circuit 800 according to the second embodiment is connected to a data line DL to which a data voltage Vdata is applied, and to gate lines GL1 to GLA to which gate signals SC1, SC2, INI, and SEN are applied. The pixel circuit 800 is connected to the sensing line SL to which a sensing reference voltage Vpre is applied when the display is driven.

Here, an initialization switch element SW1 and a sampling switch element SW2 may be connected to the sensing line SL. The initialization switch element SW1 may selectively connect the initialization voltage node n_init and the sensing line SL, and the sampling switch element SW2 may selectively connect the analog-to-digital converter ADC and the sensing line SL. The initialization switch element SW1 and the sampling switch element SW2 may be included in the data driving circuit 110 along with the analog-to-digital converter ADC.

When driving the display of the pixel circuit 800, a sensing voltage including the electrical characteristics of the pixel circuit 800 may be applied to the sensing line SL.

In other words, a sensing voltage including a threshold voltage of the second driving element DT2 included in the pixel circuit 800 may be applied to the sensing line SL.

Meanwhile, the pixel circuit 800 may include a cathode power line PL1 for supplying a cathode voltage EVSS, a drive power line PL2 for supplying a pixel driving voltage EVDD, an initialization power line PL3 for supplying an initialization voltage Vinit, and a reference power line PLA for supplying a reference voltage Vref. On the display panel 100, the power lines PL1, PL2, PL3, and PL4 may be connected in common to all of the pixels.

In the second embodiment, the pixel driving voltage EVDD is set to a voltage which is higher than a maximum voltage (White) of the data voltage Vdata and which allows the first and second driving elements DT1 and DT2 to operate in a saturation region. The initialization voltage Vinit may be set to a voltage higher than the gate-off voltage VGL and lower than the cathode voltage EVSS.

The gate-on voltage VGH may be set to a voltage higher than the pixel driving voltage EVDD, and the gate-off voltages VGL may be set to a voltage lower than the initialization voltage Vinit.

In addition, the reference voltage Vref may be set to a voltage higher than the cathode voltage EVSS and lower than the maximum voltage of the data voltage Vdata.

For example, when the maximum voltage (White) of the data voltage Vdata is 5 V and the minimum voltage (Black) is 1 V, the pixel driving voltage EVDD may be set to 16 V. The initialization voltage Vinit may be set to 0 V and the cathode voltage EVSS may be set to 3 V.

The gate-on voltage VGH may be set to 18 V, and the gate-off voltage VGL may be set to −6 V. In addition, the reference voltage Vref may be set to 4 V.

In other words, the magnitudes of the voltages applied to the pixel circuit 800 according to the second embodiment may be: the gate-on voltage VGH>the pixel driving voltage EVDD>the maximum voltage (White)>the reference voltage Vref>the cathode voltage EVSS>the minimum voltage (Black)>the initialization voltage Vinit>the gate-off voltage VGL.

The gate signals SC1, SC2, INI, and SEN include pulses that swing between the gate-on voltage VGH and the gate-off voltage VGL. The gate signals SC1, SC2, INI, and SEN include a first gate signal SC1, a second gate signal SC2, an initialization gate signal INI, and a gate signal SEN for sensing. Here, the first gate signal SC1 may also be referred to as a gate signal for writing data.

Figure 9:
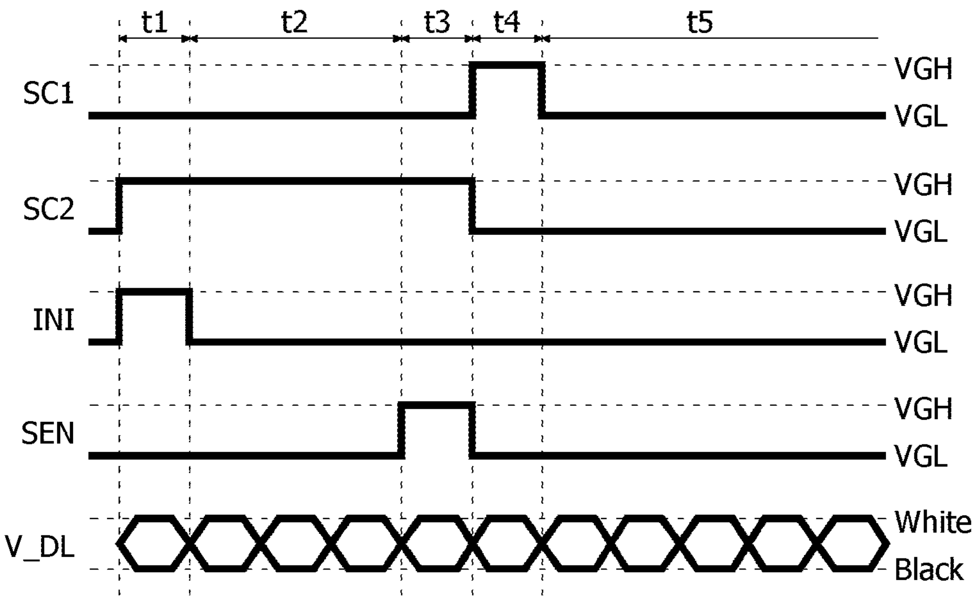
FIG. 9 is a waveform diagram illustrating the waveform of signals applied in driving a display of a pixel circuit according to the second embodiment of the present disclosure.

The pixel circuit 800 is driven in the following order: an initialization period t1, a sampling period t2, a pixel sensing period t3, a data writing period t4, and an emission period t5. The initialization period t1, the sampling period t2, the pixel sensing period t3, the data writing period T4, and the emission period t5 may be determined by waveforms of the gate signals SC1, SC2, INI, and SEN as shown in FIG. 9.

Specifically, in the initialization period t1, the voltage of the second gate signal SC2 and the initialization gate signal INI is the gate-on voltage. In the initialization period t1, the voltage of the first gate signal SC1 and the gate signal SEN for sensing is the gate-off voltage VGL.

In the sampling period t2, the voltage of the second gate signal SC2 is the gate-on voltage VGH. In the sampling period t2, the voltage of the first gate signal SC1, the gate signal SEN for sensing, and the initialization gate signal INI is the gate-off voltage VGL.

In the pixel sensing period t3, the voltage of the second gate signal SC2 and the gate signal SEN for sensing is the gate-on voltage VGH. In the pixel sensing period t3, the voltage of the first gate signal SC1 and the initialization gate signal INI is the gate-off voltage VGL.

In the data writing period t4, the voltage of the first gate signal SC1 is the gate-on voltage VGH. In the data writing period t4, the voltage of the second gate signal SC2, the gate signal SEN for sensing, and the initialization gate signal INI is the gate-off voltage VGL.

In the emission period t5, the first gate signal SC1, the second gate signal SC2, the gate signal SEN for sensing, and the initialization gate signal INI is the gate-off voltage VGL.

Meanwhile, the first driving element DT1 of the pixel circuit 800 generates a driving current according to a gate-source voltage Vgs for driving the light-emitting element EL. This first driving element DT1 includes a first-first electrode to which the pixel driving voltage EVDD is applied, a first gate electrode connected to a first node n1 to which the reference voltage Vref or data voltage Vdata is selectively applied depending on whether the fifth switch element T5 or the third switch element T3 is turned on, and a second-first electrode connected to a second node n2.

The second drive element DT2 of the pixel circuit 800 includes a first-second electrode to which the pixel drive voltage EVDD is applied, a second gate electrode connected to the first node n1, and a second-second electrode connected to a third node n3.

The second driving element DT2 may receive the same level of stress as the stress received by the first driving element DT1 when driving the display of the pixel circuit 800. In other words, the first driving element DT1 and the second driving element DT2 may be deteriorated to the same degree when driving the display of the pixel circuit 800.

Here, the stress may be positive bias temperature stress (PBTS), negative bias temperature stress (NBTS), or the like.

The light-emitting element EL may be implemented as an OLED. The light-emitting element EL includes an anode electrode and a cathode electrode to emit light by a driving current from the first driving element DT1.

An anode electrode of the light-emitting element EL is connected to the second node n2, and a cathode electrode thereof is connected to the cathode power line PL1 to which the cathode voltage EVSS is applied.

The first capacitor C1 is connected to the first node n1 and the second node n2 and stores a threshold voltage Vth1 of the first driving element DT1 sampled during the sampling period t2 and to maintain a gate-source voltage Vgs1 of the first driving element DT1 during the emission period t4. That is, the first capacitor C1 is connected to the first gate electrode and the second gate electrode at the first node n1 and the second-first electrode the second node n2.

The second capacitor C2 is connected to the first node n1 and the third node n3 and stores a threshold voltage Vth2 of the second driving element DT2 sampled during the sampling period t2. That is, the second capacitor C2 is connected to the first capacitor C1, the first gate electrode, and the second gate electrode at the first node n1 and the second-second electrode and the fourth switch element T4 at the third node n3.

Meanwhile, the switch elements T1 to T5 of the pixel circuit 800 include a first switch element T1 and a second switch element T2 that are turned on in response to the gate-on voltage VGH of the initialization gate signal INI, a third switch element T3 that is turned on in response to the gate-on voltage VGH of the second gate signal SC2, a fourth switch element T4 that is turned on in response to the gate-on voltage VGH of the gate signal SEN for sensing, and a fifth switch element T5 that is turned on in response to the gate-on voltage VGH of the first gate signal SC1.

The first switch element T1 is connected to an initialization power line PL3 and the third node n3.

Specifically, a first electrode of the first switch element T1 is connected to the initialization power line PL3, and a second electrode thereof is connected to the third node n3. And a gate electrode thereof is connected to a fourth gate line GL4 so that the initialization gate signal INI is applied to the gate electrode.

The first switch element T1 is turned on in response to the gate-on voltage VGH of the initialization gate signal INI. When the first switch element T1 is turned on, the initialization power line PL3 and the third node n3 are electrically connected so that the initialization voltage Vinit is applied to the third node n3, i.e., to the second-to-second electrode of the second driving element DT2.

The second switch element T2 is connected to the initialization power line PL3 and the second node n2.

Specifically, a first electrode of the second switch element T2 is connected to the initialization power line PL3, and a second electrode thereof is connected to the second node n2. And a gate electrode thereof is connected to the fourth gate line GLA so that the initialization gate signal INI is applied to the gate electrode.

This second switch element T2 is turned on in response to the gate-on voltage VGH of the initialization gate signal INI. When the second switch element T2 is turned on, the initialization power line PL3 and the second node n2 are electrically connected so that the initialization voltage Vinit is applied to the second node n2, i.e., to the first-second electrode of the first driving element DT1.

Here, the first switch element T1 and the second switch element T2 are turned on only during the initialization period t1 because the voltage of the initialization gate signal INI is the gate-on voltage VGH in the initialization period t1. Therefore, the initialization voltage Vinit is applied to the third node n3 and the second node n2 in the initialization period t1.

The third switch element T3 is connected to the data line PLA, which supplies the reference voltage Vref, and the first node n1.

Specifically, a first electrode of the third switch element T3 is connected to the reference power line PL4, and a second electrode thereof is connected to the first node n1. And a gate electrode thereof is connected to the second gate line GL2 so that the second gate signal SC2 is applied to the gate electrode.

The third switch element T3 is turned on in response to the gate-on voltage VGH of the second gate signal SC2.

Here, the third switch element T3 is turned on during the initialization period t1, the sampling period t2, and the pixel sensing period t3 because the voltage of the second gate signal SC2 is the gate-on voltage VGH during the initialization period t1, the sampling period t2, and the pixel sensing period t3.

In other words, during the initialization period t1, the sampling period t2, and the pixel sensing period t3, the third switch element T3 electrically connects the reference power line PLA and the first node n1.

The fourth switch element T4 is connected to the sensing line SL and the third node n3.

Specifically, a first electrode of the fourth switch element T4 is connected to the sensing line SL, and a second electrode thereof is connected to the third node n3. And a gate applied to the gate electrode.

This fourth switch element T4 is turned on in response to the gate-on voltage VGH of the gate signal SEN for sensing.

Here, the fourth switch element T4 is turned on only during the pixel sensing period t3 because the voltage of the gate signal SEN for sensing is the gate-on voltage VGH in the pixel sensing period t3.

In the pixel sensing period t3, the sampling switch element SW2 may be turned on along with the fourth switch element T4.

When the fourth switch element T4 is turned on, the sensing voltage formed at the third node n3 is transferred to the sensing line SL, so that a capacitor Csen for sensing connected to the sensing line SL may be charged with the sensing voltage. And when the sampling switch element SW2 is turned on, the sensing voltage charged in the capacitor Csen for sensing may be passed to the analog-to-digital converter ADC. Here, the sensing voltage may include a threshold voltage Vth2 of the second driving element DT2.

The fourth switch element T4 described above is an element for transferring the sensing voltage of the second driving element DT2, i.e., the sensing voltage of the pixel circuit 800, to the sensing line SL during the pixel sensing period t3, and thus the fourth switch element T4 may be referred to as a switch element for sensing.

The fifth switch element T5 is connected between the data line DL and the first node n1.

Specifically, a first electrode of the fifth switch element T5 is connected to the data line DL, and a second electrode thereof is connected to the second node n1. And a gate electrode thereof is connected to the first gate line GL1 so that the first gate signal SC1 is applied to the gate electrode.

The fifth switch element T5 is turned on in response to the gate-on voltage VGH of the first gate signal SC1.

Here, the fifth switch element T5 is turned on only during the data writing period t4 because the voltage of the first gate signal SC1 is the gate-on voltage VGH in the data writing period t4.

In other words, during the data writing period t4, the fifth switch element T5 electrically connects the data line DL and the first node n1.

Since the fifth switch element T5 as described above is a switch element for writing the data voltage Vdata to the pixel circuit 800 in the data writing period t4, the fifth switch element T5 may be referred to as a switch element for writing data.

Hereinafter, the operation of the pixel circuit 800 according to the second embodiment will be described in stages corresponding to the display driving period of the pixel circuit 800.

Figure 10:
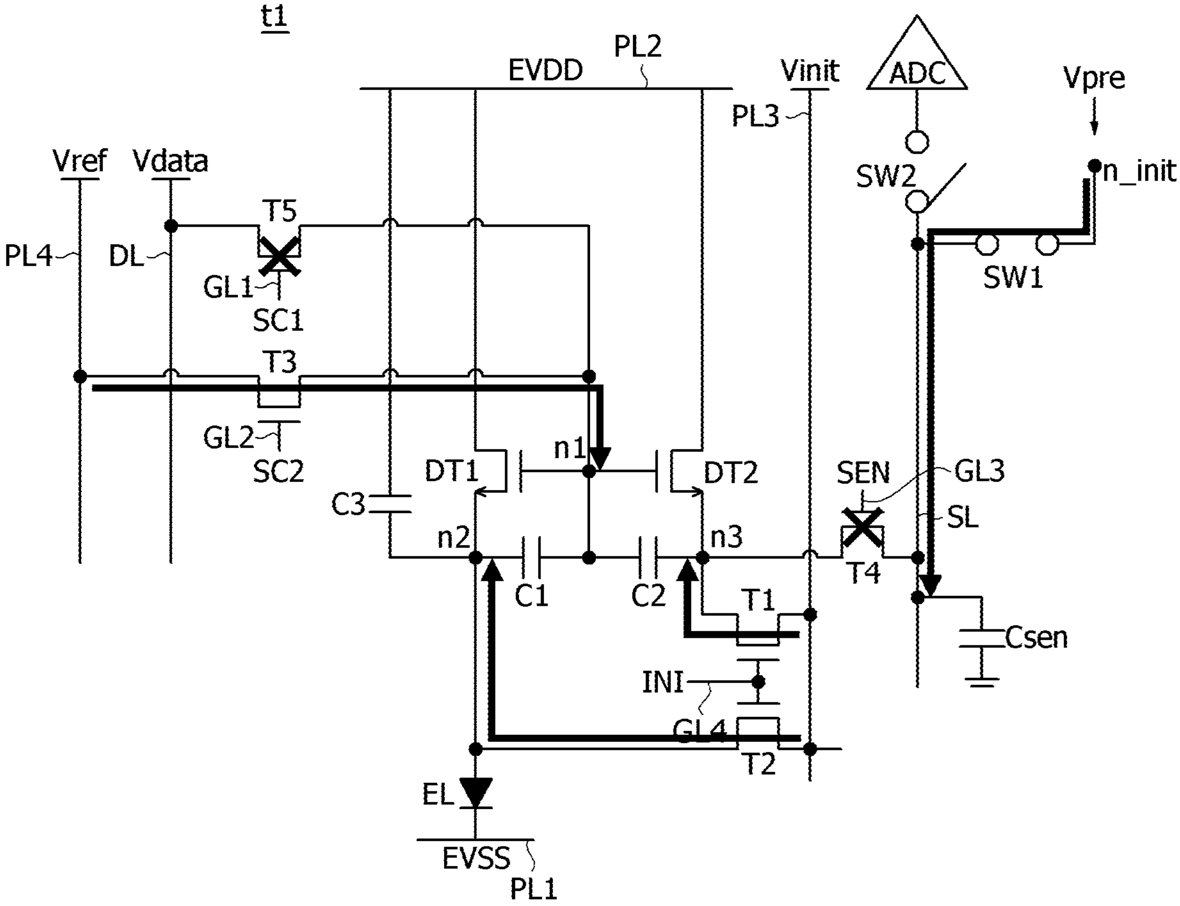
FIG. 10 is a diagram illustrating an operation during an initialization period of a display driving period of a pixel circuit according to the second embodiment of the present disclosure.
Figure 11:
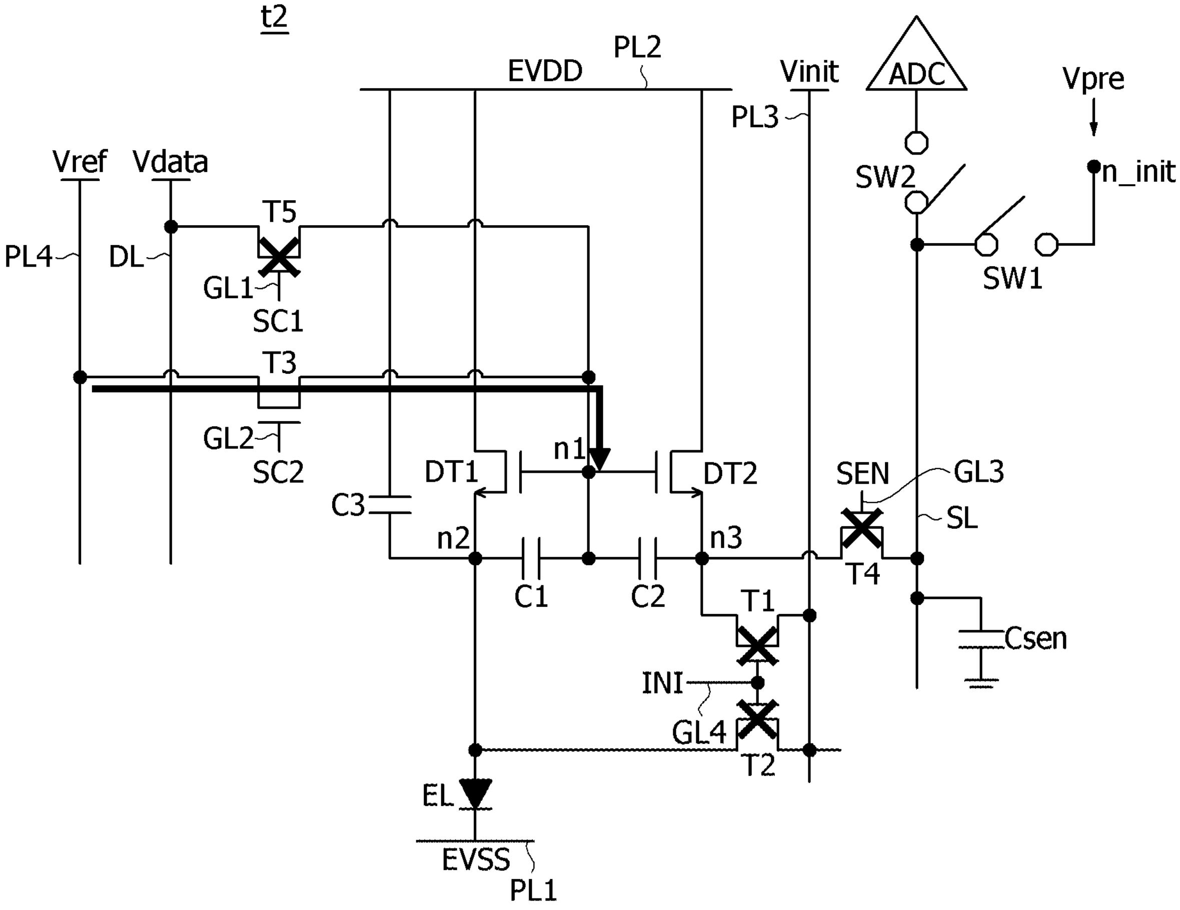
FIG. 11 is a diagram illustrating an operation during a sampling period of a display driving period of a pixel circuit according to the second embodiment of the present disclosure.
Figure 12:
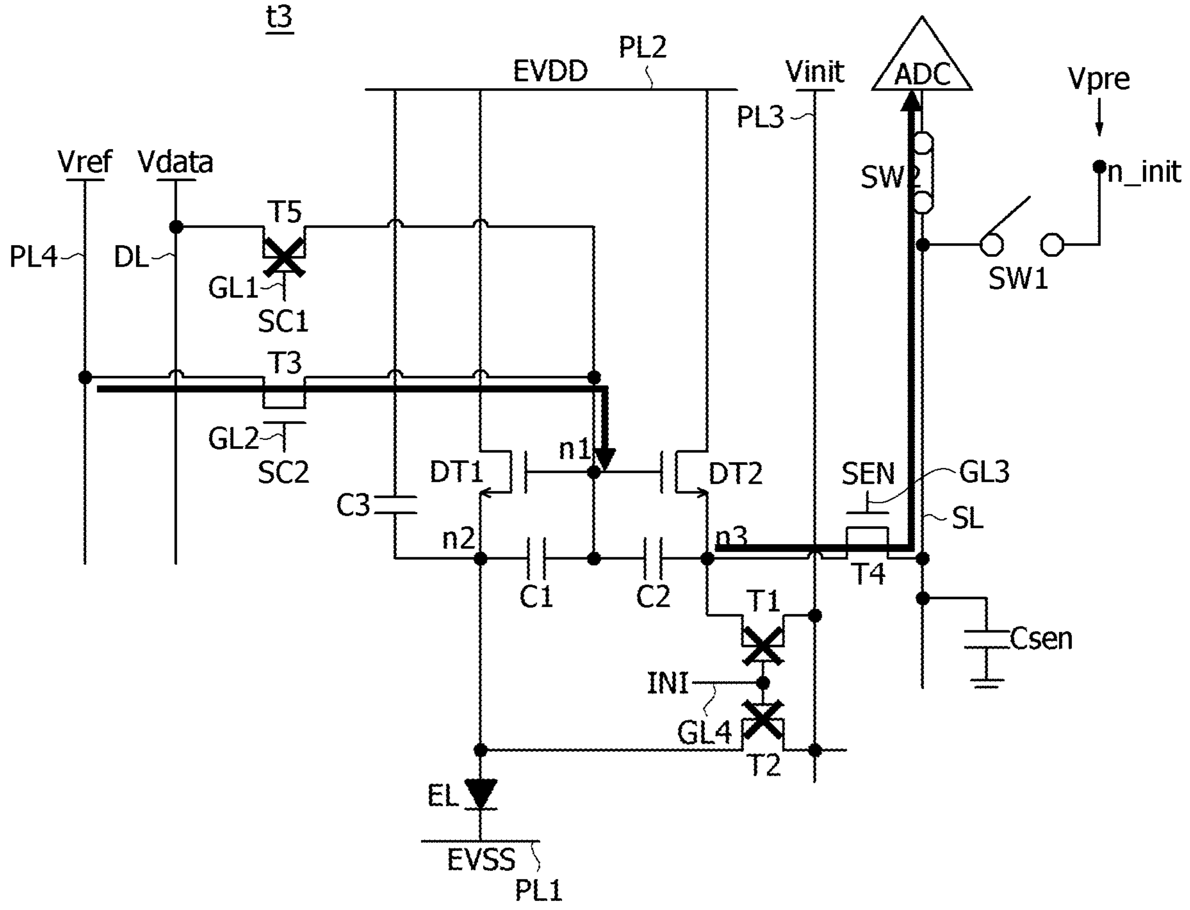
FIG. 12 is a diagram illustrating an operation during a pixel sensing period of a display driving period of a pixel circuit according to the second embodiment of the present disclosure.
Figure 13:
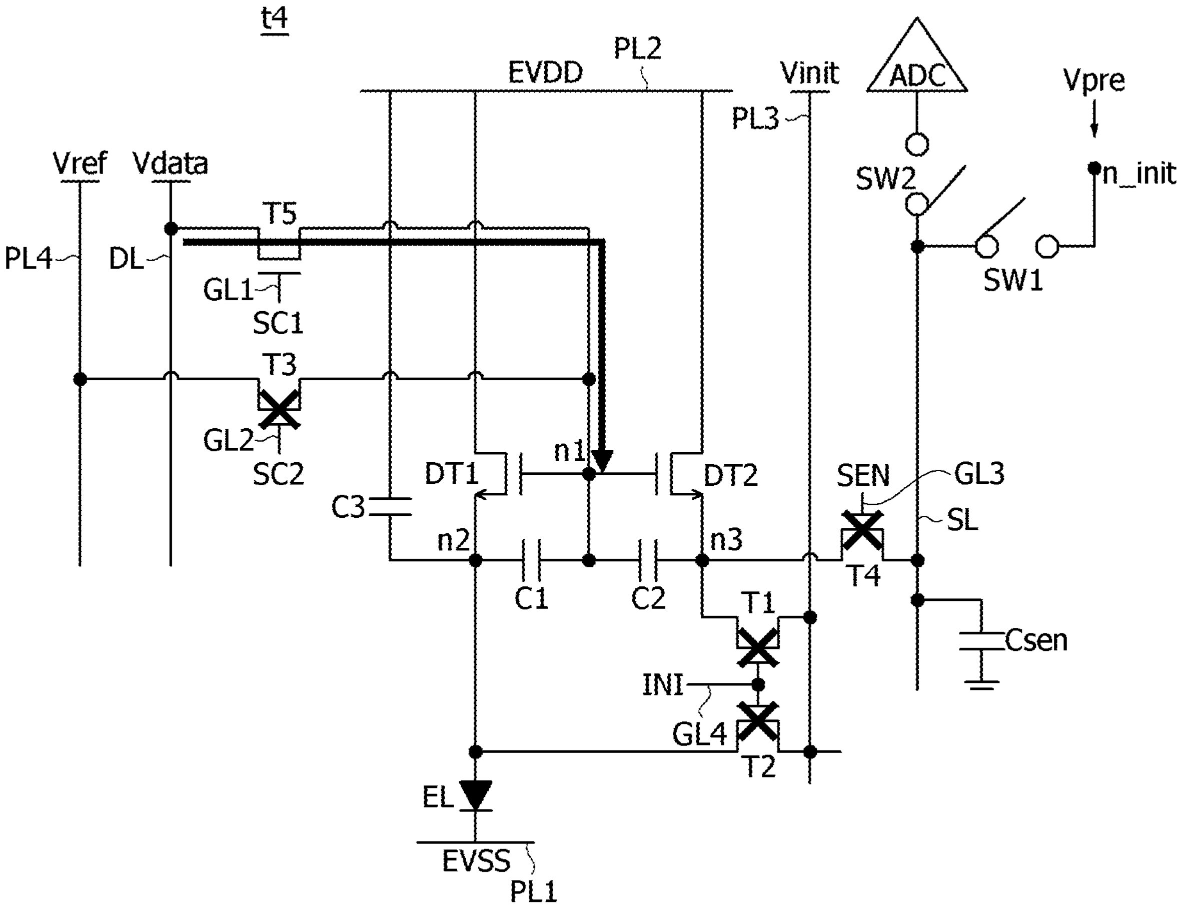
FIG. 13 is a diagram illustrating an operation during a data writing period of a display driving period of a pixel circuit according to the second embodiment of the present disclosure.
Figure 14:
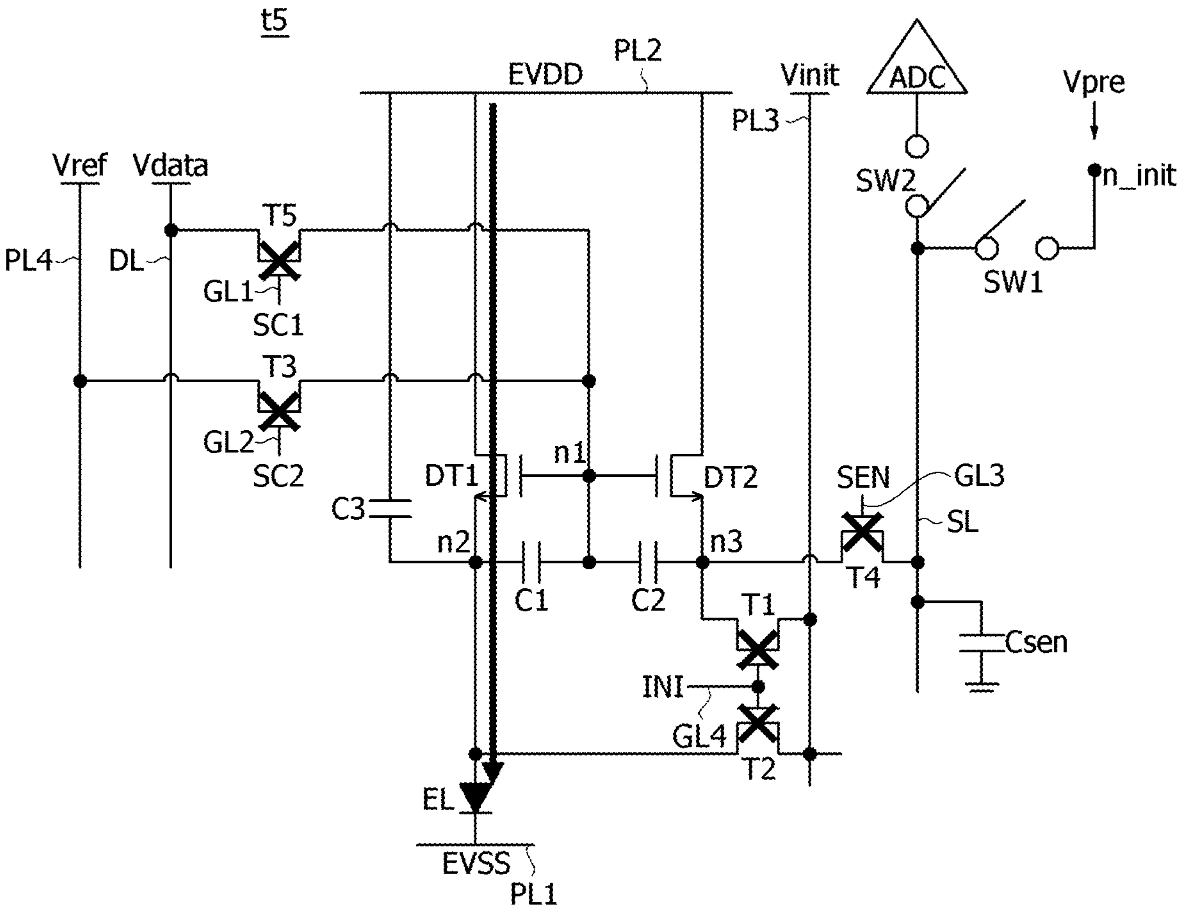
FIG. 14 is a diagram illustrating an operation during an emission period of a display driving period of a pixel circuit according to the second embodiment of the present disclosure.

FIG. 10 is a diagram illustrating an operation during an initialization period of a display driving period of a pixel circuit according the second embodiment of the present disclosure. FIG. 11 is a diagram illustrating an operation during a sampling period of a display driving period of a pixel circuit according to the second embodiment of the present disclosure. FIG. 12 is a diagram illustrating an operation during a pixel sensing period of a display driving period of a pixel circuit according to the second embodiment of the present disclosure. FIG. 13 is a diagram illustrating an operation during a data writing period of a display driving period of a pixel circuit according to the second embodiment of the present disclosure. FIG. 14 is a diagram illustrating an operation during an emission period of a display driving period of a pixel circuit according to the second embodiment of the present disclosure.

Referring to FIG. 10, during the initialization period T1, main nodes of the pixel circuit 800 are initialized. During the initialization period t1, the voltage of the second gate signal SC2 and the initialization gate signal INI is the gate-on voltage VGH, as shown in FIG. 9. During the initialization period t1, the voltage of the first gate signal SC1 and the gate signal SEN for sensing is the gate-off voltage VGL.

Therefore, during the initialization period t1, the first switch element T1 and the second switch element T2 are turned on in response to the gate-on voltage VGH of the initialization gate signal INI, and the third switch element T3 is turned on in response to the second gate signal SC2.

The initialization switch element SW1 is also turned on in the initialization period t1.

On the other hand, the fourth switch element T4 is turned off according to the gate-off voltage VGL of the gate signal SEN for sensing, and the fifth switch element T5 is turned off according to the gate-off voltage VGL of the first gate signal SC1.

As a result, in the initialization period t1, the voltage of the first node n1 is initialized to the reference voltage Vref, and the voltages of the second node n2 and the third node n3 are initialized to the initialization voltage Vinit. Then, as the potential of the first node n1 rises due to the reference voltage Vref, the first driving element DT1 and the second driving element DT2 are turned on.

In the initialization period t1, the sensing line SL and the capacitor Csen for sensing may also be initialized to the sensing reference voltage Vpre.

Referring to FIG. 11, during the sampling period t2, the threshold voltage Vth1 of the first driving element DT1 is sampled by the first capacitor C1. The threshold voltage Vth2 of the second driving element DT2 is also sampled by the second capacitor C2.

The voltage of the second gate signal SC2 is the gate-on voltage VGH during the sampling period t2, as shown in FIG. 9. The voltage of the first gate signal SC1, the gate signal SEN for sensing, and the initialization gate signal INI is the gate-off voltage VGL during the sampling period t2.

Thus, during the sampling period t2, the third switch element T3 is turned on in response to the gate-on voltage VGH of the second gate signal SC2.

The first switch element T1 and the second switch element T2 are turned off according to the gate-off voltage VGL of the initialization gate signal INI.

The fourth switch element T4 is turned off according to the gate-off voltage VGL of the gate signal SEN for sensing.

The fifth switch element T5 is turned off according to the gate-off voltage VGL of the first gate signal SC1.

In the sampling period t2, the initialization switch element SW1 and the sampling switch element SW2 are also turned off.

As a result, in the sampling period t2, the voltage of the first node n1 maintains the reference voltage Vref, while the second node n2 and the third node n3 are saturated with a certain voltage due to the voltage rise caused by the pixel driving voltage EVDD. Here, the saturated voltage at the second node n2 may be a voltage of (Vref−Vth1), which is the reference voltage Vref minus the threshold voltage Vth1 of the first driving element DT1.

And the saturated voltage at the third node n3 may be a voltage of (Vref−Vth2), which is a reference voltage Vref minus a threshold voltage Vth2 of the second driving element DT2.

In the sampling period t2, the voltage (Vref−Vth2) of the third node n3 may be a sensing voltage including the threshold voltage Vth2 of the second driving element DT2.

In other words, when the reference voltage Vref is applied to the first node n1 in the sampling period t2, the voltage of the third node n3 may become the sensing voltage including the threshold voltage Vth2 of the second driving element. Here, the sense voltage may further include the reference voltage Vref.

In the sampling period t2, the gate-source voltage Vgs1 of the first driving element DT1, which is charged in the first capacitor C1, becomes a voltage of (Vref−Vref+Vth1), which is the voltage Vref of the first node n1 minus the voltage (Vref−Vth1) of the second node n2. In other words, in the sampling period t2, the threshold voltage Vth1 of the first driving element DT1 is charged in the first capacitor C1.

In the sampling period t2, the gate-source voltage Vgs2 of the second driving element DT2, which is charged in the second capacitor C2, becomes a voltage of (Vref−Vref+

Vth2), which is the voltage Vref of the first node n1 minus the voltage (Vref−Vth2) of the third node n3. In other words, in the sampling period t2, the threshold voltage Vth2 of the second driving element DT2 is charged in the second capacitor C2.

Referring to FIG. 12, the sensing voltage (Vref−Vth2) formed at the third node n3 during the pixel sensing period t3 is applied to the sensing line SL.

In other words, after the reference voltage Vref is applied to the first node n1, the gate-on voltage VGH of the gate signal SEN for sensing is input to the fourth switch element T4, which is a switch element for sensing, so that the sensing voltage (Vref−Vth2) formed at the third node n3 may be applied to the sensing line SL.

During the pixel sensing period t3, the voltage of the second gate signal SC2 and the gate signal SEN for sensing is the gate-on voltage VGH, as shown in FIG. 9. During the pixel sensing period t3, the voltage of the first gate signal SC1 and the initialization gate signal INI is the gate-off voltage VGL.

Therefore, during the pixel sensing period t3, the fourth switch element T4, which is a switch element for sensing, is turned on in response to the gate-on voltage VGH of the gate signal SEN for sensing, and the third switch element T3 remains in the turned-on state.

In the pixel sensing period t3, the sampling switch element SW2 is also turned on.

On the other hand, the first switch element T1 and the second switch element T2 are turned off according to the gate-off voltage VGL of the initialization gate signal INI, and the fifth switch element T5 is turned off according to the gate-off voltage VGL of the first gate signal SC1.

As a result, the sensing voltage (Vref−Vth2) formed at the third node n3 is applied to the sensing line SL in the pixel sensing period t3. Here, the sensing voltage includes the threshold voltage of the second driving element DT2 but not the threshold voltage of the first driving element DT1.

The capacitor Csen for sensing on the sensing line SL may be charged with the sensing voltage (Vref−Vth2), and the sensing voltage (Vref−Vth2) charged in the capacitor Csen for sensing may be transferred to the analog-to-digital converter ADC.

The analog-to-digital converter ADC may convert an analog value, the sensing voltage, to a digital value, the sensing data. The converted sensing data may be sent to the timing controller 130.

Here, since the sensing voltage (Vref−Vth2) includes the threshold voltage Vth2 of the second driving element DT2, which is subjected to the same level of stress as the first driving element DT1, the timing controller 130 may determine the degree of deterioration of the pixel circuit 800 by using the threshold voltage Vth2 of the second driving element DT2. That is, the sensing voltage that includes the threshold voltage Vth2 of the second driving element DT2 is indicative of the stress of the first driving element DT1 that drives the light emitting element EL.

The timing controller 130 may then change the pixel data of the input image to a compensation value corresponding to the degree of deterioration of the pixel circuit 800. That is, the timing controller 130 may change the pixel data such that the data voltage that is applied to the first gate electrode of the first driving element DT1 and the second gate electrode of the second driving element DT2 is compensated based on the sensing voltage that includes the threshold voltage of the second driving element but not the threshold voltage of the first driving element DT1. Thus, the deterioration of the second driving element DT2 is used as a proxy for the deterioration of the first driving element DT1.

Referring to FIG. 13, during the data writing period t4, the data voltage Vdata of the pixel data is applied to the first node n1.

The voltage of the first gate signal SC1 is the gate-on voltage VGH during the data writing period t4, as shown in FIG. 9. The voltage of the second gate signal SC2, the gate signal SEN for sensing, and the initialization gate signal INI is the gate-off voltage VGL during the data writing period t4.

Thus, during the data writing period t4, the fifth switch element T5 is turned on in response to the gate-on voltage VGH of the first gate signal SC1.

On the other hand, the first switch element T1 and the second switch element T2 are turned off according to the gate-off voltage VGL of the initialization gate signal INI, and the third switch element T3 is turned off according to the gate-off voltage VGL of the second gate signal SC2. In addition, the fourth switch element T4 is turned off according to the gate-off voltage VGL of the gate signal SEN for sensing.

In the data writing period t4, the initialization switch element SW1 and the sampling switch element SW2 are also turned off.

As a result, the voltage of node n1 becomes the data voltage Vdata in the data writing period t4. In this case, due to the capacitance coupling according to the capacitance distribution ratio (α=C1/C1+C3) of the first capacitor C1 and the third capacitor C3, the voltage of the second node n2 becomes a voltage of (αVdata+Vref−Vth1).

In the data writing period t4, the voltage of the third node n3 becomes a voltage of (Vdata+Vref−Vth2).

Referring to FIG. 14, the voltages of the first gate signal SC1, the second gate signal SC2, the gate signal SEN for sensing, and the initialization gate signal INI are the gate-off voltage VGL during the emission period t5, as shown in FIG. 9.

Accordingly, during the emission period t5, the first switch element T1 to the fifth switch element T5 is turned off.

As described above, the light-emitting element EL may be emitted by the driving current flowing through the first driving element DT1 while the switch elements are turned off. Here, the light-emitting element EL may emit at a brightness corresponding to the grayscale value of the pixel data.

Meanwhile, in the emission period t5, the voltage of the first node n1 becomes the data voltage Vdata, and the voltage of the second node n2 becomes the voltage of (αVdata+Vref−Vth1).

A current (Ioled) flowing through the light-emitting element EL during the emission period t5 is determined by the following equation:

[Equation 2]

$$Ioled = K(Vgs1 - Vth1)2 =$$

$$K[(Vdata - \alpha(Vdata) - Vref + Vth1 - Vth1)]2 = K[Vdata(1 - \alpha) - Vref]2.$$

Where Vgs1 denotes the gate-source voltage of the first driving element DT1, and K denotes a constant value determined by the mobility and parasitic capacity of the first driving element DT1. Further, Vdata denotes the data voltage, Vth1 denotes the threshold voltage of the first driving element DT1, and Vref denotes the reference voltage.

As indicated in Equation 2, the threshold voltage Vth1, which is the electrical characteristic of the first driving element DT1, is not reflected to the driving current (Ioled) flowing through the light-emitting element EL, but only the data voltage Vdata is reflected to the driving current (Ioled). In other words, the current (Ioled) flowing through the light-emitting element EL is the current compensated for the threshold voltage Vth1 of the first driving element DT1.

As described above, in the second embodiment of the present disclosure, both the sensing of the pixel circuit 800 for external compensation and the internal compensation thereof may be performed when driving the display of the pixel circuit 800. Here, the internal compensation of the pixel circuit 800 may be performed in a source follower manner.

FIG. 15 is a circuit diagram exemplarily illustrating a pixel circuit according to a third embodiment of the present disclosure.

Referring to FIG. 15, the pixel circuit 1500 according to the third embodiment may include a light-emitting element EL, a first driving element DT1 that drives the light-emitting element EL, a second driving element DT2 that may be electrically connected to a sensing line SL of an external compensation circuit, a first capacitor C1, a second capacitor C2, and a plurality of switch elements T1 to T5. Here, the first driving element DT1, the second driving element DT2, and the plurality of switch elements T1 to T5 may be N-channel transistors. And the N-channel transistors may be implemented as oxide TFTs.

The first driving element DT1 and the second driving element DT2 may be formed of the same material and the same structure. Thus, the first driving element DT1 and the second driving element DT2 are identical to each other.

For example, the first driving element DT1 and the second driving element DT2 may be formed of an oxide semiconductor material. In addition, the first driving element DT1 and the second driving element DT2 may be formed to have the same gate length and width, channel depth, and the like.

The pixel circuit 1500 according to the third embodiment is connected to a data line DL to which a data voltage Vdata is applied, and to gate lines GL1 to GLA to which gate signals SC1, SC2, INI, and SEN are applied. The pixel circuit 1500 is connected to the sensing line SL to which a sensing reference voltage Vpre is applied when the display is driven.

Here, an initialization switch element SW1 and a sampling switch element SW2 may be connected to the sensing line SL. The initialization switch element SW1 may selectively connect the initialization voltage node n_init and the sensing line SL, and the sampling switch element SW2 may selectively connect the analog-to-digital converter ADC and the sensing line SL. The initialization switch element SW1 and the sampling switch element SW2 may be included in the data driving circuit 110 along with the analog-to-digital converter ADC.

When driving the display of the pixel circuit 1500, a sensing voltage including the electrical characteristics of the pixel circuit 1500 may be applied to the sensing line SL.

In other words, a sensing voltage including a threshold voltage of the second driving element DT2 included in the pixel circuit 1500 may be applied to the sensing line SL.

Meanwhile, the pixel circuit 1500 may include a cathode power line PL1 for supplying a cathode voltage EVSS, a drive power line PL2 for supplying a pixel driving voltage EVDD, an initialization power line PL3 for supplying an initialization voltage Vinit, and a reference power line PLA for supplying a reference voltage Vref. On the display panel 100, the power lines PL1, PL2, PL3, and PL4 may be connected in common to all of the pixels.

In the third embodiment, the pixel driving voltage EVDD is set to a voltage which is higher than a maximum voltage (White) of the data voltage Vdata and which allows the first and second driving elements DT1 and DT2 to operate in a saturation region. The initialization voltage Vinit may be set to a voltage higher than the gate-off voltage VGL and lower than the cathode voltage EVSS.

The gate-on voltage VGH may be set to a voltage higher than the pixel driving voltage EVDD, and the gate-off voltages VGL may be set to a voltage lower than the initialization voltage Vinit.

In addition, the reference voltage Vref may be set to a voltage higher than the cathode voltage EVSS and lower than the maximum voltage of the data voltage Vdata.

For example, when the maximum voltage (White) of the data voltage Vdata is 5 V and the minimum voltage (Black) is 1 V, the pixel driving voltage EVDD may be set to 16 V. The initialization voltage Vinit may be set to 0 V and the cathode voltage EVSS may be set to 3 V.

The gate-on voltage VGH may be set to 18 V, and the gate-off voltage VGL may be set to −6 V. In addition, the reference voltage Vref may be set to 4 V.

In other words, the magnitudes of the voltages applied to the pixel circuit 1500 according to the third embodiment may be: the gate-on voltage VGH>the pixel driving voltage EVDD>the maximum voltage (White)>the reference voltage Vref>the cathode voltage EVSS>the minimum voltage (Black)>the initialization voltage Vinit>the gate-off voltage VGL.

The gate signals SC1, SC2, INI, and SEN include pulses that swing between the gate-on voltage VGH and the gate-off voltage VGL. The gate signals SC1, SC2, INI, and SEN include a first gate signal SC1, a second gate signal SC2, an initialization gate signal INI, and a gate signal SEN for sensing. Here, the first gate signal SC1 may also be referred to as a gate signal for writing data.

Figure 16:
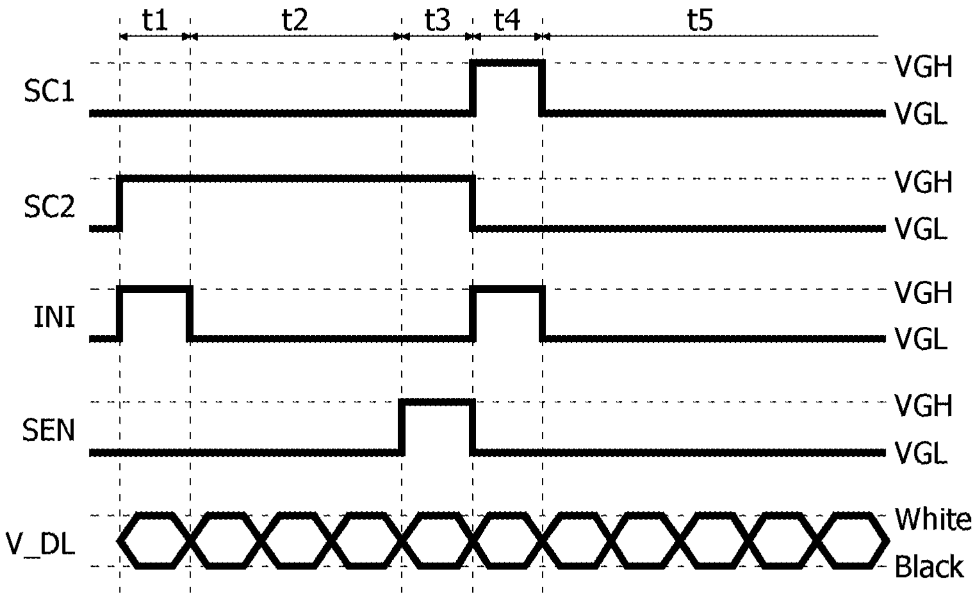
FIG. 16 is a waveform diagram illustrating the waveform of signals applied in driving a display of a pixel circuit according to the third embodiment of the present disclosure.

The pixel circuit 1500 is driven in the following order: an initialization period t1, a sampling period t2, a pixel sensing period t3, a data writing period t4, and an emission period t5. The initialization period t1, the sampling period t2, the pixel sensing period t3, the data writing period t4, and the emission period t5 may be determined by waveforms of the gate signals SC1, SC2, INI, and SEN as shown in FIG. 16.

Specifically, in the initialization period t1, the voltage of the second gate signal SC2 and the initialization gate signal INI is the gate-on voltage. And the voltage of the first gate signal SC1 and the gate signal SEN for sensing is the gate-off voltage VGL.

In the sampling period t2, the voltage of the second gate signal SC2 is the gate-on voltage VGH. And the voltage of the first gate signal SC1, the gate signal SEN for sensing, and the initialization gate signal INI is the gate-off voltage VGL.

In the pixel sensing period t3, the voltage of the second gate signal SC2 and the gate signal SEN for sensing is the gate-on voltage VGH. In addition, the voltage of the first gate signal SC1 and the initialization gate signal INI is the gate-off voltage VGL.

In the data writing period t4, the voltage of the first gate signal SC1 and the initialization gate signal INI is the gate-on voltage VGH. And the voltage of the second gate signal SC2 and the gate signal SEN for sensing is the gate-off voltage VGL.

In the emission period t5, the first gate signal SC1, the second gate signal SC2, the gate signal SEN for sensing, and the initialization gate signal INI is the gate-off voltage VGL.

Meanwhile, the first driving element DT1 of the pixel circuit 1500 generates a driving current according to a gate-source voltage Vgs1 to drive the light-emitting element EL. This first driving element DT1 includes a first-first electrode to which the pixel driving voltage EVDD is applied, a first gate electrode connected to a first node n1 to which the reference voltage Vref or data voltage Vdata is applied, and a second-first electrode connected to a second node n2.

The second drive element DT2 of the pixel circuit 1500 includes a first-second electrode to which the pixel drive voltage EVDD is applied, a second gate electrode connected to the first node n1, and a second-second electrode connected to a third node n3.

The second driving element DT2 may receive the same level of stress as the stress received by the first driving element DT1 when driving the display of the pixel circuit 1500. In other words, the first driving element DT1 and the second driving element DT2 may be deteriorated to the same degree when driving the display of the pixel circuit 1500. Thus, the sensed stress of the second driving element DT2 may be a proxy for the stress of the first driving element DT.

Here, the stress may be positive bias temperature stress (PBTS), negative bias temperature stress (NBTS), or the like.

The light-emitting element EL may be implemented as an OLED. The light-emitting element EL includes an anode electrode and a cathode electrode to emit light by a driving current from the first driving element DT1.

An anode electrode of the light-emitting element EL is connected to the second node n2, and a cathode electrode thereof is connected to the cathode power line PL1 to which the cathode voltage EVSS is applied.

The first capacitor C1 is connected to the first node n1 and the second node n2 to store a threshold voltage Vth1 of the first driving element DT1 sampled during the sampling period t2 and to maintain a gate-source voltage Vgs1 of the first driving element DT1 during the emission period t5.

The second capacitor C2 is connected to the first node n1 and the third node n3 to store a threshold voltage Vth2 of the second driving element DT2 sampled during the sampling period t2.

Meanwhile, the switch elements T1 to T5 of the pixel circuit 1500 include a first switch element T1 and a second switch element T2 that are turned on in response to the gate-on voltage VGH of the initialization gate signal INI, a third switch element T3 that is turned on in response to the gate-on voltage VGH of the second gate signal SC2, a fourth switch element T4 that is turned on in response to the gate-on voltage VGH of the gate signal SEN for sensing, and a fifth switch element T5 that is turned on in response to the gate-on voltage VGH of the first gate signal SC1.

The first switch element T1 is connected to an initialization power line PL3 and the third node n3.

Specifically, a first electrode of the first switch element T1 is connected to the initialization power line PL3, and a second electrode thereof is connected to the third node n3. And a gate electrode thereof is connected to a fourth gate line GLA so that the initialization gate signal INI is applied to the gate electrode.

This first switch element T1 is turned on in response to the gate-on voltage VGH of the initialization gate signal INI. When the first switch element T1 is turned on, the initialization power line PL3 and the third node n3 are electrically connected so that the initialization voltage Vinit is applied to the third node n3, i.e., to the second-to-second electrode of the second driving element DT2.

The second switch element T2 is connected to the initialization power line PL3 and the second node n2.

Specifically, a first electrode of the second switch element T2 is connected to the initialization power line PL3, and a second electrode thereof is connected to the second node n2. And a gate electrode thereof is connected to the fourth gate line GLA so that the initialization gate signal INI is applied to the gate electrode.

This second switch element T2 is turned on in response to the gate-on voltage VGH of the initialization gate signal INI. When the second switch element T2 is turned on, the initialization power line PL3 and the second node n2 are electrically connected so that the initialization voltage Vinit is applied to the second node n2, i.e., to the first-second electrode of the first driving element DT1.

Here, the first switch element T1 and the second switch element T2 are turned on during the initialization period t1 because the voltage of the initialization gate signal INI is the gate-on voltage VGH in the initialization period t1 and the data writing period t4. And they are turned off in the sampling period t2 and the pixel sensing period t3, and then turned on again in the data writing period t4.

Therefore, the initialization voltage Vinit is applied to the third node n3 and the second node n2 in the initialization period t1 and the data writing period t4.

The third switch element T3 is connected between the data line PL4, which supplies the reference voltage Vref, and the first node n1.

Specifically, a first electrode of the third switch element T3 is connected to the reference power line PL4, and a second electrode thereof is connected to the first node n1. And a gate electrode thereof is connected to the second gate line GL2 so that the second gate signal SC2 is applied to the gate electrode.

The third switch element T3 is turned on in response to the gate-on voltage VGH of the second gate signal SC2.

Here, the third switch element T3 is turned on during the initialization period t1, the sampling period t2, and the pixel sensing period t3 because the voltage of the second gate signal SC2 is the gate-on voltage VGH during the initialization period t1, the sampling period t2, and the pixel sensing period t3.

In other words, during the initialization period t1, the sampling period t2, and the pixel sensing period t3, the third switch element T3 electrically connects the reference power line PLA and the first node n1.

The fourth switch element T4 is connected between the sensing line SL and the third node n3.

Specifically, a first electrode of the fourth switch element T4 is connected to the sensing line SL, and a second electrode thereof is connected to the third node n3. And a gate electrode thereof is connected to the third gate line GL3 so that the gate signal SEN for sensing is applied to the gate electrode.

This fourth switch element T4 is turned on in response to the gate-on voltage VGH of the gate signal SEN for sensing.

Here, the fourth switch element T4 is turned on only during the pixel sensing period t3 because the voltage of the gate signal SEN for sensing is the gate-on voltage VGH in the pixel sensing period t3.

In the pixel sensing period t3, the sampling switch element SW2 may be turned on along with the fourth switch element T4.

When the fourth switch element T4 is turned on, the sensing voltage formed at the third node n3 is transferred to the sensing line SL, so that a capacitor Csen for sensing connected to the sensing line SL may be charged with the sensing voltage. And when the sampling switch element SW2 is turned on, the sensing voltage charged in the capacitor Csen for sensing may be passed to the analog-to-digital converter ADC. Here, the sensing voltage may include a threshold voltage Vth2 of the second driving element DT2.

The fourth switch element T4 described above is an element for transferring the sensing voltage of the second driving element DT2, i.e., the sensing voltage of the pixel circuit 1500, to the sensing line SL during the pixel sensing period t3, and thus the fourth switch element T4 may be referred to as a switch element for sensing.

The fifth switch element T5 is connected between the data line DL and the first node n1.

Specifically, a first electrode of the fifth switch element T5 is connected to the data line DL, and a second electrode thereof is connected to the first node n1. And a gate electrode thereof is connected to the first gate line GL1 so that the first gate signal SC1 is applied to the gate electrode.

The fifth switch element T5 is turned on in response to the gate-on voltage VGH of the first gate signal SC1.

Here, the fifth switch element T5 is turned on only during the data writing period t4 because the voltage of the first gate signal SC1 is the gate-on voltage VGH in the data writing period t4.

In other words, during the data writing period t4, the fifth switch element T5 electrically connects the data line DL and the first node n1.

Since the fifth switch element T5 as described above is a switch element for writing the data voltage Vdata to the pixel circuit 1500 in the data writing period t4, the fifth switch element T5 may be referred to as a switch element for writing data.

Hereinafter, the operation of the pixel circuit 1500 according to the third embodiment will be described in stages corresponding to the display driving period of the pixel circuit 1500.

Figure 17:
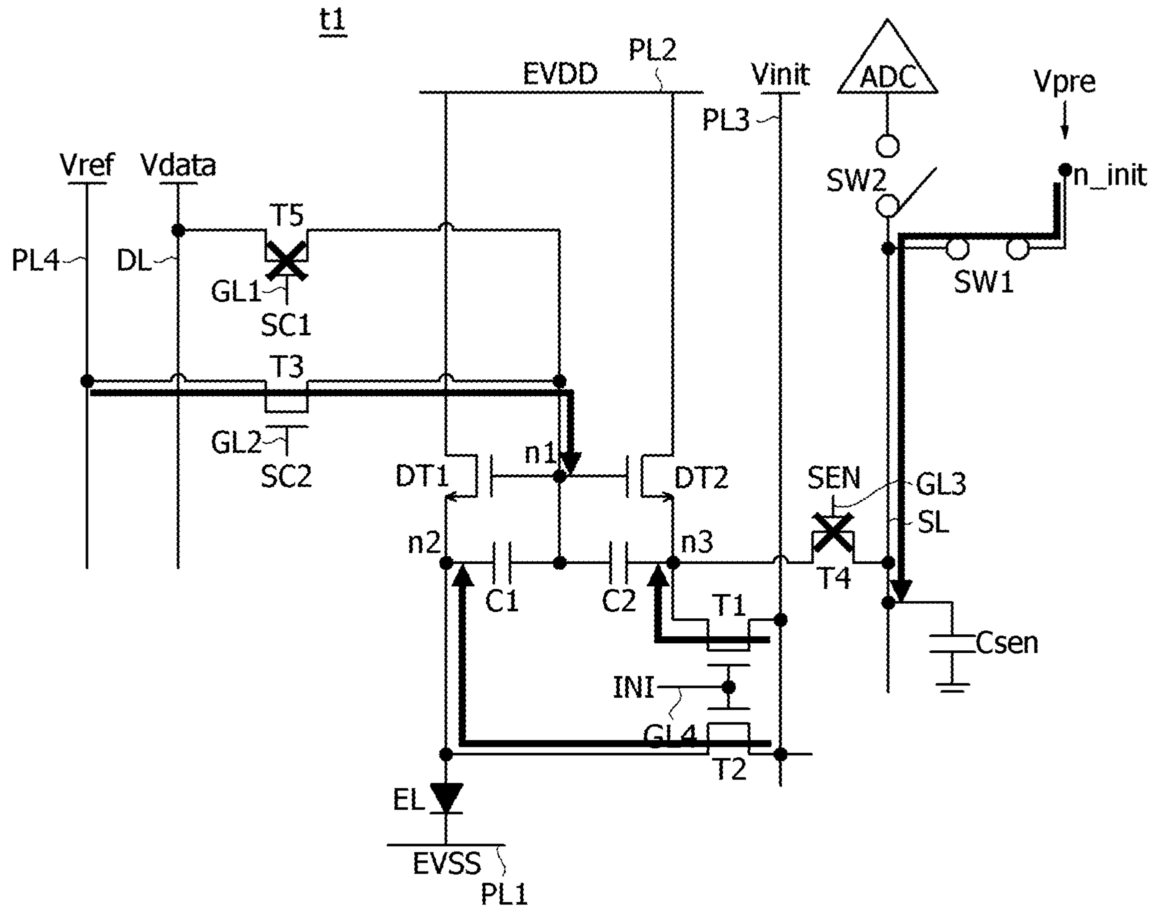
FIG. 17 is a diagram illustrating an operation during an initialization period of a display driving period of a pixel circuit according to the third embodiment of the present disclosure.
Figure 18:
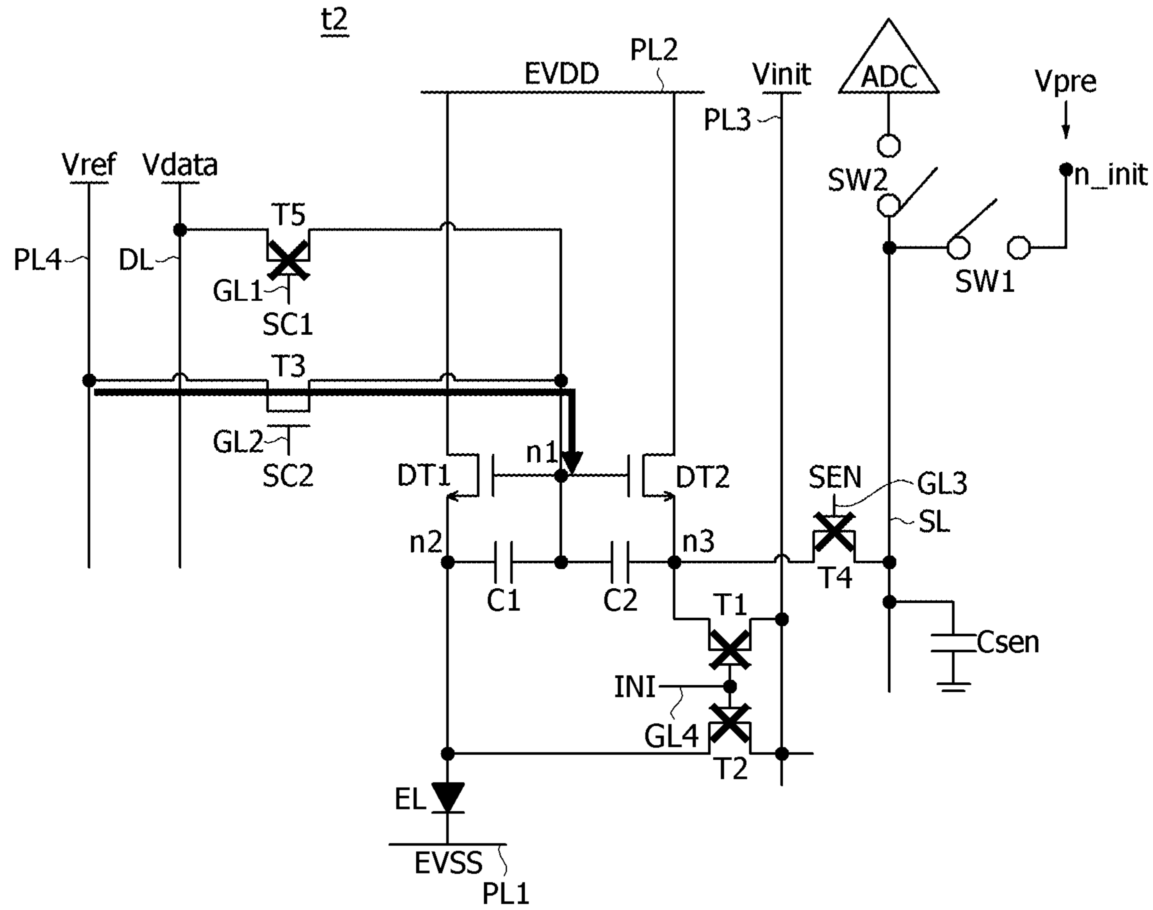
FIG. 18 is a diagram illustrating an operation during a sampling period of a display driving period of a pixel circuit according to the third embodiment of the present disclosure.
Figure 19:
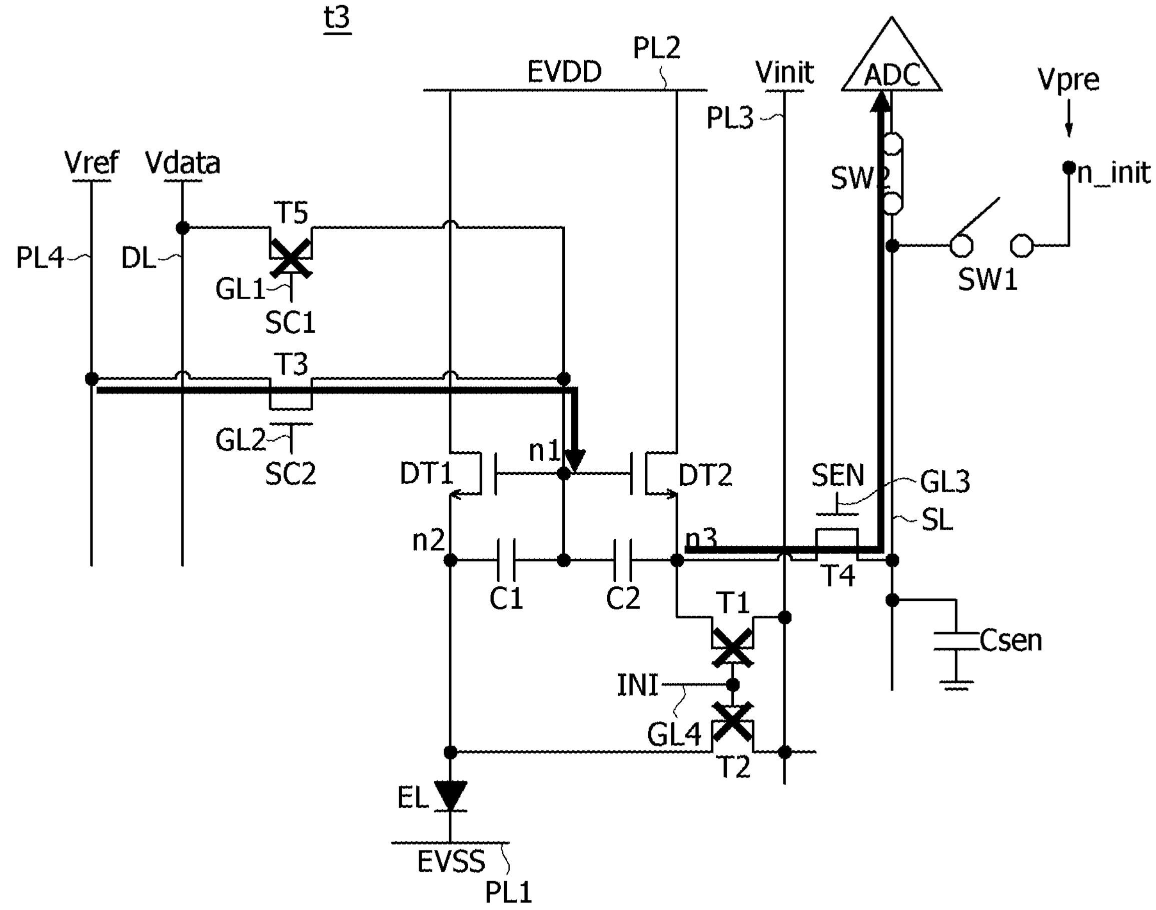
FIG. 19 is a diagram illustrating an operation during a pixel sensing period of a display driving period of a pixel circuit according to the third embodiment of the present disclosure.
Figure 20:
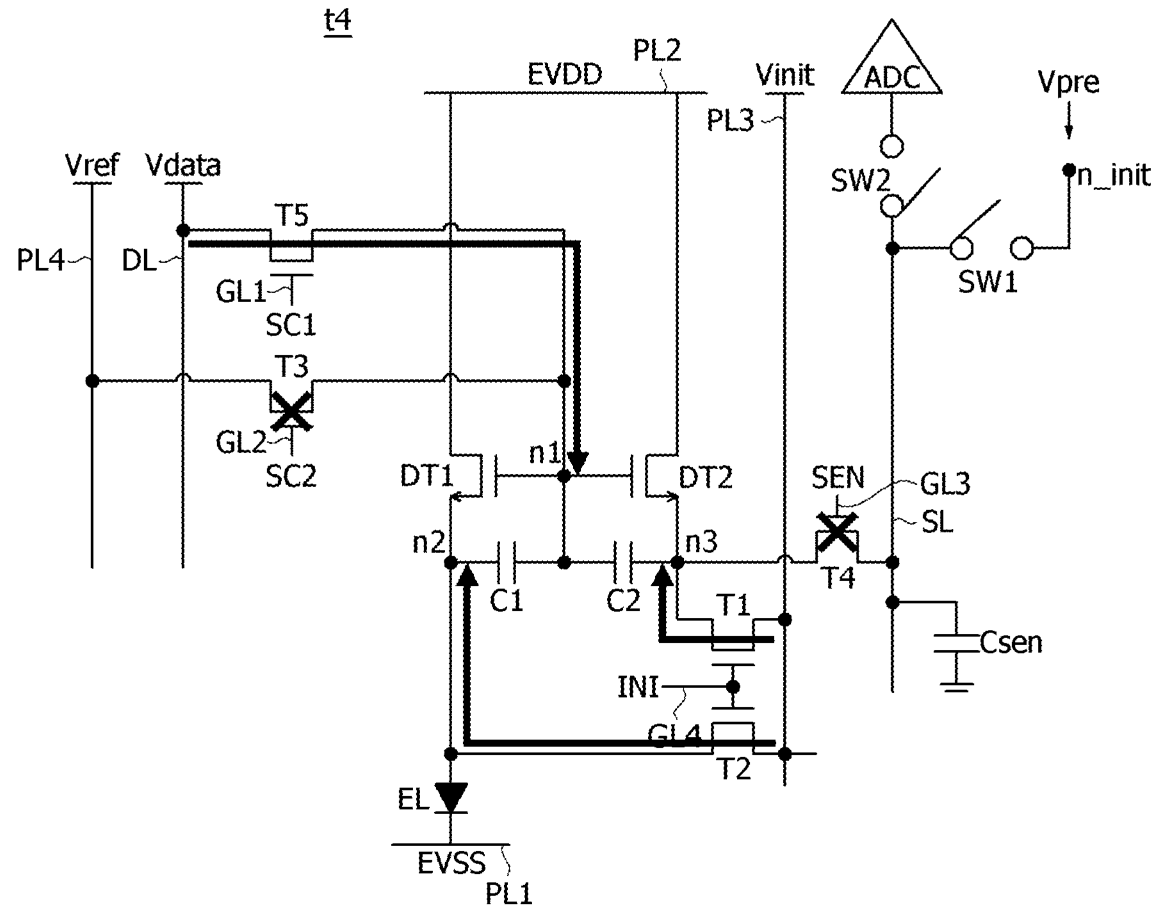
FIG. 20 is a diagram illustrating an operation during a data writing period of a display driving period of a pixel circuit according to the third embodiment of the present disclosure.
Figure 21:
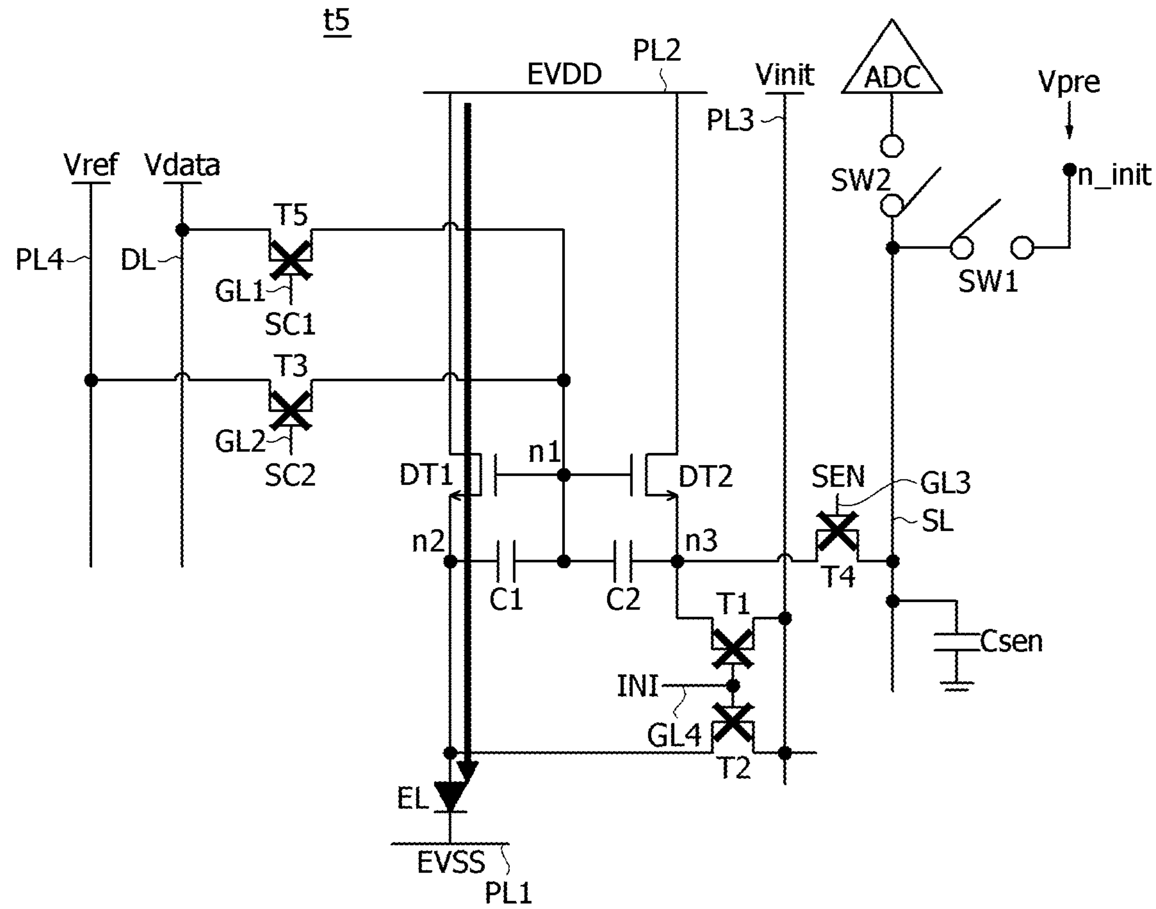
FIG. 21 is a diagram illustrating an operation during an emission period of a display driving period of a pixel circuit according to the third embodiment of the present disclosure.

FIG. 17 is a diagram illustrating an operation during an initialization period of a display driving period of a pixel circuit according to the third embodiment of the present disclosure. FIG. 18 is a diagram illustrating an operation during a sampling period of a display driving period of a pixel circuit according to the third embodiment of the present disclosure. FIG. 19 is a diagram illustrating an operation during a pixel sensing period of a display driving period of a pixel circuit according to the third embodiment of the present disclosure. FIG. 20 is a diagram illustrating an operation during a data writing period of a display driving period of a pixel circuit according to the third embodiment of the present disclosure. FIG. 21 is a diagram illustrating an operation during an emission period of a display driving period of a pixel circuit according to the third embodiment of the present disclosure.

Referring to FIG. 17, during the initialization period t1, main nodes of the pixel circuit 1500 are initialized. During the initialization period t1, the voltage of the second gate signal SC2 and the initialization gate signal INI is the gate-on voltage VGH, as shown in FIG. 16. During the initialization period t1, the voltage of the first gate signal SC1 and the gate signal SEN for sensing is the gate-off voltage VGL.

Therefore, during the initialization period t1, the first switch element T1 and the second switch element T2 are turned on in response to the gate-on voltage VGH of the initialization gate signal INI, and the third switch element T3 is turned on in response to the second gate signal SC2.

The initialization switch element SW1 is also turned on in the initialization period t1.

On the other hand, the fourth switch element T4 is turned off according to the gate-off voltage VGL of the gate signal SEN for sensing, and the fifth switch element T5 is turned off according to the gate-off voltage VGL of the first gate signal SC1.

As a result, in the initialization period t1, the voltage of the first node n1 is initialized to the reference voltage Vref, and the voltages of the second node n2 and the third node n3 are initialized to the initialization voltage Vinit. Then, as the potential of the first node n1 rises due to the reference voltage Vref, the first driving element DT1 and the second driving element DT2 are turned on.

In the initialization period t1, the sensing line SL and the capacitor Csen for sensing may also be initialized to the sensing reference voltage Vpre.

Referring to FIG. 18, during the sampling period t2, the threshold voltage Vth1 of the first driving element DT1 is sampled by the first capacitor C1. The threshold voltage Vth2 of the second driving element DT2 is also sampled by the second capacitor C2.

The voltage of the second gate signal SC2 is the gate-on voltage VGH during the sampling period t2, as shown in FIG. 16. The voltage of the first gate signal SC1, the gate signal SEN for sensing, and the initialization gate signal INI is the gate-off voltage VGL during the sampling period t2.

Thus, during the sampling period t2, the third switch element T3 is turned on in response to the gate-on voltage VGH of the second gate signal SC2.

The first switch element T1 and the second switch element T2 are turned off according to the gate-off voltage VGL of the initialization gate signal INI.

The fourth switch element T4 is turned off according to the gate-off voltage VGL of the gate signal SEN for sensing.

The fifth switch element T5 is turned off according to the gate-off voltage VGL of the first gate signal SC1.

In the sampling period t2, the initialization switch element SW1 and the sampling switch element SW2 are also turned off.

As a result, in the sampling period t2, the voltage of the first node n1 maintains the reference voltage Vref, while the second node n2 and the third node n3 are saturated with a certain voltage due to the voltage rise caused by the pixel driving voltage EVDD. Here, the saturated voltage at the second node n2 may be a voltage of (Vref−Vth1), which is the reference voltage Vref minus the threshold voltage Vth1 of the first driving element DT1.

And the saturated voltage at the third node n3 may be a voltage of (Vref−Vth2), which is a reference voltage Vref minus a threshold voltage Vth2 of the second driving element DT2.

In the sampling period t2, the voltage (Vref−Vth2) of the third node n3 may be a sensing voltage including the threshold voltage Vth2 of the second driving element DT2.

In other words, when the reference voltage Vref is applied to the first node n1 in the sampling period t2, the voltage of the third node n3 may become the sensing voltage including the threshold voltage Vth2 of the second driving element. Here, the sense voltage may further include the reference voltage Vref.

In the sampling period t2, the gate-source voltage Vgs1 of the first driving element DT1, which is charged in the first capacitor C1, becomes a voltage of (Vref−Vref+Vth1), which is the voltage Vref of the first node n1 minus the voltage (Vref−Vth1) of the second node n2. In other words, in the sampling period t2, the threshold voltage Vth1 of the first driving element DT1 is charged in the first capacitor C1.

In the sampling period t2, the gate-source voltage Vgs2 of the second driving element DT2, which is charged in the second capacitor C2, becomes a voltage of (Vref−Vref+Vth2), which is the voltage Vref of the first node n1 minus the voltage (Vref−Vth2) of the third node n3. In other words, in the sampling period t2, the threshold voltage Vth2 of the second driving element DT2 is charged in the second capacitor C2.

Referring to FIG. 19, the sensing voltage (Vref−Vth2) formed at the third node n3 during the pixel sensing period t3 is applied to the sensing line SL.

In other words, after the reference voltage Vref is applied to the first node n1, the gate-on voltage VGH of the gate signal SEN for sensing is input to the fourth switch element T4, which is a switch element for sensing, so that the sensing voltage (Vref−Vth2) formed at the third node n3 may be applied to the sensing line SL.

During the pixel sensing period t3, the voltage of the second gate signal SC2 and the gate signal SEN for sensing is the gate-on voltage VGH, as shown in FIG. 16. During the pixel sensing period t3, the voltage of the first gate signal SC1 and the initialization gate signal INI is the gate-off voltage VGL.

Therefore, during the pixel sensing period t3, the fourth switch element T4, which is a switch element for sensing, is turned on in response to the gate-on voltage VGH of the gate signal SEN for sensing, and the third switch element T3 remains in the turned-on state.

In the pixel sensing period t3, the sampling switch element SW2 is also turned on.

On the other hand, the first switch element T1 and the second switch element T2 are turned off according to the gate-off voltage VGL of the initialization gate signal INI, and the fifth switch element T5 is turned off according to the gate-off voltage VGL of the first gate signal SC1.

As a result, the sensing voltage (Vref−Vth2) formed at the third node n3 is applied to the sensing line SL in the pixel sensing period t3. Here, the sensing voltage includes the threshold voltage of the second driving element DT2 but not the threshold voltage of the first driving element DT1.

The capacitor Csen for sensing on the sensing line SL may be charged with the sensing voltage (Vref−Vth2), and the sensing voltage (Vref−Vth2) charged in the capacitor Csen for sensing may be transferred to the analog-to-digital converter ADC.

The analog-to-digital converter ADC may convert an analog value, the sensing voltage, to a digital value, the sensing data. The converted sensing data may be sent to the timing controller 130.

Here, since the sensing voltage (Vref−Vth2) includes the threshold voltage Vth2 of the second driving element DT2, which is subjected to the same level of stress as the first driving element DT1, the timing controller 130 may determine the degree of deterioration of the pixel circuit 1500 by using the threshold voltage Vth2 of the second driving element DT2. That is, the sensing voltage that includes the threshold voltage Vth2 of the second driving element DT2 is indicative of the stress of the first driving element DT1 that drives the light emitting element EL.

The timing controller 130 may then change the pixel data of the input image to a compensation value corresponding to the degree of deterioration of the pixel circuit 1500. That is, the timing controller 130 may change the pixel data such that the data voltage that is applied to the first gate electrode of the first driving element DT1 and the second gate electrode of the second driving element DT2 is compensated based on the sensing voltage that includes the threshold voltage of the second driving element but not the threshold voltage of the first driving element DT1. Thus, the deterioration of the second driving element DT2 is used as a proxy for the deterioration of the first driving element DT1.

Referring to FIG. 20, during the data writing period t4, the data voltage Vdata of the pixel data is applied to the first node n1.

During the data writing period t4, the voltage of the first gate signal SC1 and the initialization gate signal INI is the gate-on voltage VGH, as shown in FIG. 16. In the data writing period t4, the voltage of the second gate signal SC2 and the gate signal SEN for sensing is the gate-off voltage VGL.

Thus, during the data writing period t4, the fifth switch element T5 is turned on in response to the gate-on voltage VGH of the first gate signal SC1. In addition, the first switch element T1 and the second switch element T2 are turned on in response to the gate-on voltage VGH of the initialization gate signal INI.

On the other hand, the third switch element T3 is turned off according to the gate-off voltage VGL of the second gate signal SC2, and the fourth switch element T4 is turned off according to the gate-off voltage VGL of the gate signal SEN for sensing.

In the data writing period t4, the initialization switch element SW1 and the sampling switch element SW2 are also turned off.

As a result, the voltage of node n1 becomes the data voltage Vdata in the data writing period t4. In addition, the voltage of the second node n2 and the third node n3 becomes the initialization voltage Vinit.

Referring to FIG. 21, the voltage of the first gate signal SC1, the second gate signal SC2, the gate signal SEN for sensing, and the initialization gate signal INI is the gate-off voltage VGL during the emission period t5, as shown in FIG. 16.

Accordingly, during the emission period t5, the first switch element T1 to the fifth switch element T5 is turned off.

As described above, the light-emitting element EL may be emitted by the driving current flowing through the first driving element DT1 while the switch elements are turned off. Here, the light-emitting element EL may emit at a brightness corresponding to the grayscale value of the pixel data.

Meanwhile, in the emission period t5, the voltage of the first node n1 becomes the data voltage Vdata, and the voltage of the second node n2 becomes the initialization voltage Vinit.

The threshold voltage Vth1 of the first driving element DT1 is not reflected to the driving current even in the third embodiment because the gate-source voltage Vgs1 of the first driving element DT1 becomes the voltage (Vdata-Vinit) in the emission period t5.

As described above, in the third embodiment of the present disclosure, the sensing of the pixel circuit 1500 for external compensation may be performed when driving the display of the pixel circuit 1500 to compensate for the pixel data in the input image.

FIG. 22 is a circuit diagram exemplarily illustrating a pixel circuit according to a fourth embodiment of the present disclosure.

Referring to FIG. 22, the pixel circuit 2200 according to the fourth embodiment may include a light-emitting element EL, a first driving element DT1 that drives the light-emitting element EL, a second driving element DT2 that may be electrically connected to a sensing line SL of an external compensation circuit, a first capacitor C1, a second capacitor C2, and a plurality of switch elements T1 to T4. Here, the first driving element DT1, the second driving element DT2, and the plurality of switch elements T1 to T4 may be N-channel transistors. And the N-channel transistors may be implemented as oxide TFTs.

The first driving element DT1 and the second driving element DT2 may be formed of the same material and the same structure. That is, the first driving element DT1 and the second driving element DT2 are substantially identical to each other.

For example, the first driving element DT1 and the second driving element DT2 may be formed of an oxide semiconductor material. In addition, the first driving element DT1 and the second driving element DT2 may be formed to have the same gate length and width, channel depth, and the like.

The pixel circuit 2200 according to the fourth embodiment is connected to a data line DL to which a data voltage Vdata is applied, and to gate lines GL1 to GL4 to which gate signals SC1, ini1, ini2, and SEN are applied. The pixel circuit 2200 is connected to the sensing line SL to which a sensing reference voltage Vpre is applied when the display is driven.

Here, an initialization switch element SW1 and a sampling switch element SW2 may be connected to the sensing line SL. The initialization switch element SW1 may selectively connect the initialization voltage node n_init and the sensing line SL, and the sampling switch element SW2 may selectively connect the analog-to-digital converter ADC and the sensing line SL. The initialization switch element SW1 and the sampling switch element SW2 may be included in the data driving circuit 110 along with the analog-to-digital converter ADC.

In addition, the data driving circuit 110 may further include a reference voltage connection switch SW3 for selectively applying a reference voltage Vref to the data line DL, and a data voltage connection switch SW4 for selectively applying a data voltage Vdata to the data line DL.

When driving the display of the pixel circuit 2200, a sensing voltage including the electrical characteristics of the pixel circuit 2200 may be applied to the sensing line SL.

In other words, a sensing voltage including a threshold voltage of the second driving element DT2 included in the pixel circuit 2200 may be applied to the sensing line SL.

Meanwhile, the pixel circuit 2200 may include a cathode power line PL1 for supplying a cathode voltage EVSS, a driving power line PL2 for supplying a pixel driving voltage EVDD, and an initialization power line PL3 for supplying an initialization voltage Vinit. On the display panel 100, the power lines PL1, PL2, and PL3 may be connected in common to all of the pixels.

In the fourth embodiment, the pixel driving voltage EVDD is set to a voltage which is higher than the reference voltage Vref and which allows the first and second driving elements DT1 and DT2 to operate in a saturation region. The initialization voltage Vinit may be set to a voltage higher than the gate-off voltage VGL and lower than the cathode voltage EVSS.

The gate-on voltage VGH may be set to a voltage higher than the pixel driving voltage EVDD, and the gate-off voltages VGL may be set to a voltage lower than the initialization voltage Vinit.

And the reference voltage Vref may be set to a voltage higher than the cathode voltage EVSS and lower than the pixel driving voltage EVDD.

For example, the pixel driving voltage EVDD may be set to 16 V, the initialization voltage Vinit may be set to 0 V, and the cathode voltage EVSS may be set to 3 [V].

The gate-on voltage VGH may be set to 18 V, and the gate-off voltage VGL may be set to −6 V. In addition, the reference voltage Vref may be set to 4 V.

The gate signals SC1, SC2, INI, and SEN include pulses that swing between the gate-on voltage VGH and the gate-off voltage VGL. The gate signals SC1, ini1, ini2, and SEN include a first gate signal SC1, a first initialization gate signal ini1, a second initialization gate signal ini2, and a gate signal SEN for sensing. Here, the first gate signal SC1 may also be referred to as a gate signal for writing data.

Figure 23:
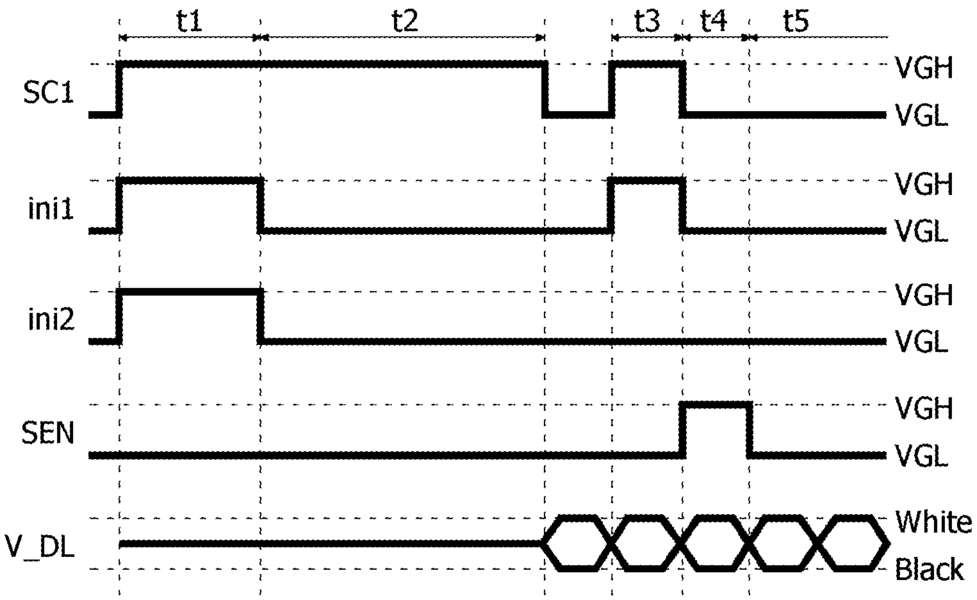
FIG. 23 is a waveform diagram illustrating the waveform of signals applied in driving a display of a pixel circuit according to the fourth embodiment of the present disclosure.

The pixel circuit 2200 is driven in the following order: an initialization period t1, a sampling period t2, a data writing period t3, a pixel sensing period t4, and an emission period t5. The initialization period t1, the sampling period t2, the data writing period t3, the pixel sensing period t4, and the emission period t5 may be determined by waveforms of the gate signals SC1, ini1, ini2, and SEN as shown in FIG. 23.

Specifically, in the initialization period t1, the voltage of the first gate signal SC1, the first initialization gate signal ini1, and the second initialization gate signal ini2 is the gate-on voltage. And the voltage of the gate signal SEN for sensing is the gate-off voltage VGL.

In the sampling period t2, the voltage of the first gate signal SC1 is the gate-on voltage VGH. And the voltage of the first initialization gate signal ini1, the second initialization gate signal ini2, and the gate signal SEN for sensing is the gate-off voltage VGL.

In the data writing period t3, the voltage of the first gate signal SC1 and the first initialization gate signal ini1 is the gate-on voltage VGH. And the voltage of the second initialization gate signal ini2 and the gate signal SEN for sensing is the gate-off voltage VGL.

In the pixel sensing period t4, the voltage of the gate signal SEN for sensing is the gate-on voltage VGH. And the voltage of the first gate signal SC1, the first initialization gate signal ini1, and the second initialization gate signal ini2 is the gate-off voltage VGL.

In the emission period t5, the first gate signal SC1, the first initialization gate signal ini1, the second initialization gate signal ini2, and the gate signal SEN for sensing is the gate-off voltage VGL.

Meanwhile, the first driving element DT1 of the pixel circuit 2200 generates a driving current according to a gate-source voltage Vgs1 to drive the light-emitting element EL. This first driving element DT1 includes a first-first electrode to which the pixel driving voltage EVDD is applied, a first gate electrode connected to a first node n1 to which the reference voltage Vref or data voltage Vdata is applied, and a second-first electrode connected to a second node n2.

The second drive element DT2 of the pixel circuit 2200 includes a first-second electrode to which the pixel drive voltage EVDD is applied, a second gate electrode connected to the first node n1, and a second-second electrode connected to a third node n3.

The second driving element DT2 may receive the same level of stress as the stress received by the first driving element DT1 when driving the display of the pixel circuit 2200. In other words, the first driving element DT1 and the second driving element DT2 may be deteriorated to the same degree when driving the display of the pixel circuit 2200.

Thus, the stress of the second driving element DT2 may be used as a proxy for the stress of the first driving element DT1.

Here, the stress may be positive bias temperature stress (PBTS), negative bias temperature stress (NBTS), or the like.

The light-emitting element EL may be implemented as an OLED. The light-emitting element EL includes an anode electrode and a cathode electrode to emit light by a driving current from the first driving element DT1.

An anode electrode of the light-emitting element EL is connected to the second node n2, and a cathode electrode thereof is connected to the cathode power line PL1 to which the cathode voltage EVSS is applied.

The first capacitor C1 is connected to the first node n1 and the second node n2 to store a threshold voltage Vth1 of the first driving element DT1 sampled during the sampling period t2 and to maintain a gate-source voltage Vgs1 of the first driving element DT1 during the emission period t4.

The second capacitor C2 is connected to the first node n1 and the third node n3 to store a threshold voltage Vth2 of the second driving element DT2 sampled during the sampling period t2.

Meanwhile, the switch elements T1 to T4 of the pixel circuit 2200 include a first switch element T1 that is turned on in response to the gate-on voltage VGH of the first initialization gate signal ini1, a second switch element T2 that is turned on in response to the gate-on voltage VGH of the second initialization gate signal ini2, a third switch element T3 turned on in response to the gate-on voltage VGH of the first gate signal SC1, and a fourth switch element T4 that is turned on in response to the gate-on voltage VGH of the gate signal SEN for sensing.

The first switch element T1 is connected to an initialization power line PL3 and the second node n2.

Specifically, a first electrode of the first switch element T1 is connected to the initialization power line PL3, and a second electrode thereof is connected to the second node n2. And a gate electrode thereof is connected to a fourth gate line GL4 so that the first initialization gate signal ini1 is applied to the gate electrode.

This first switch element T1 is turned on in response to the gate-on voltage VGH of the first initialization gate signal ini1. When the first switch element T1 is turned on, the initialization power line PL3 and the second node n2 are electrically connected, so that the initialization voltage Vinit is applied to the second node n2, i.e., to the second-first electrode of the first driving element DT1.

Here, the first switch element T1 is turned on during the initialization period t1 because the voltage of the first initialization gate signal ini1 is the gate-on voltage VGH in the initialization period t1 and the data writing period t3. And the first switch element T1 is turned off in the sampling period t2, and then turned on again in the data writing period t3.

Therefore, the initialization voltage Vinit is applied to the second node n2 during the initialization period t1 and the data writing period t3.

The second switch element T2 is connected between the initialization power line PL3 and the third node n3.

Specifically, a first electrode of the second switch element T2 is connected to the initialization power line PL3, and a second electrode thereof is connected to the third node n3. And a gate electrode thereof is connected to the second gate line GL2 so that the second initialization gate signal ini2 is applied to the gate electrode.

This second switch element T2 is turned on in response to the gate-on voltage VGH of the second initialization gate signal ini2. When the second switch element T2 is turned on, the initialization power line PL3 and the third node n3 are electrically connected, so that the initialization voltage Vinit is applied to the third node n3, i.e., to the second-second electrode of the second driving element DT2.

Here, the second switch element T2 is turned on only during the initialization period t1 because the voltage of the second gate signal ini2 is the gate-on voltage VGH in the initialization period t1. Therefore, the initialization voltage Vinit is applied to the third node n3 in the initialization period t1.

The third switch element T3 is connected between the data line DL, which supplies the reference voltage Vref or the data voltage Vdata, and the first node n1.

Specifically, a first electrode of the third switch element T3 is connected to the data line DL, and a second electrode thereof is connected to the first node n1. And a gate electrode thereof is connected to the first gate line GL1 so that the first gate signal SC1 is applied to the gate electrode.

The third switch element T3 is turned on in response to the gate-on voltage VGH of the first gate signal SC1.

Here, the third switch element T3 is turned on during the initialization period t1, the sampling period t2, and the data writing period t3 because the voltage of the first gate signal SC1 is the gate-on voltage VGH during the initialization period t1, the sampling period t2, and the data writing period t3.

In other words, during the initialization period t1, the sampling period t2, and the data writing period t3, the third switch element T3 electrically connects the data line DL and the first node n1.

Since the third switch element T3 as described above is a switch element for writing the data voltage Vdata to the pixel circuit 2200 in the data writing period t3, the third switch element T3 may be referred to as a switch element for writing data.

The fourth switch element T4 is connected between the sensing line SL and the third node n3.

Specifically, a first electrode of the fourth switch element T4 is connected to the sensing line SL, and a second electrode thereof is connected to the third node n3. And a gate applied to the gate electrode.

This fourth switch element T4 is turned on in response to the gate-on voltage VGH of the gate signal SEN for sensing.

Here, the fourth switch element T4 is turned on only during the pixel sensing period t4 because the voltage of the gate signal SEN for sensing is the gate-on voltage VGH in the pixel sensing period t4.

In the pixel sensing period t4, the sampling switch element SW2 may be turned on along with the fourth switch element T4.

When the fourth switch element T4 is turned on, the sensing voltage formed at the third node n3 is transferred to the sensing line SL, so that a capacitor Csen for sensing connected to the sensing line SL may be charged with the sensing voltage. And when the sampling switch element SW2 is turned on, the sensing voltage charged in the capacitor Csen for sensing may be passed to the analog-to-digital converter ADC. Here, the sensing voltage may include a threshold voltage Vth2 of the second driving element DT2.

The fourth switch element T4 described above is an element for transferring the sensing voltage of the second driving element DT2, i.e., the sensing voltage of the pixel circuit 2200, to the sensing line SL during the pixel sensing period t4, and thus the fourth switch element T4 may be referred to as a switch element for sensing.

Hereinafter, the operation of the pixel circuit 2200 according to the fourth embodiment will be described in stages corresponding to the display driving period of the pixel circuit 2200.

Figure 24:
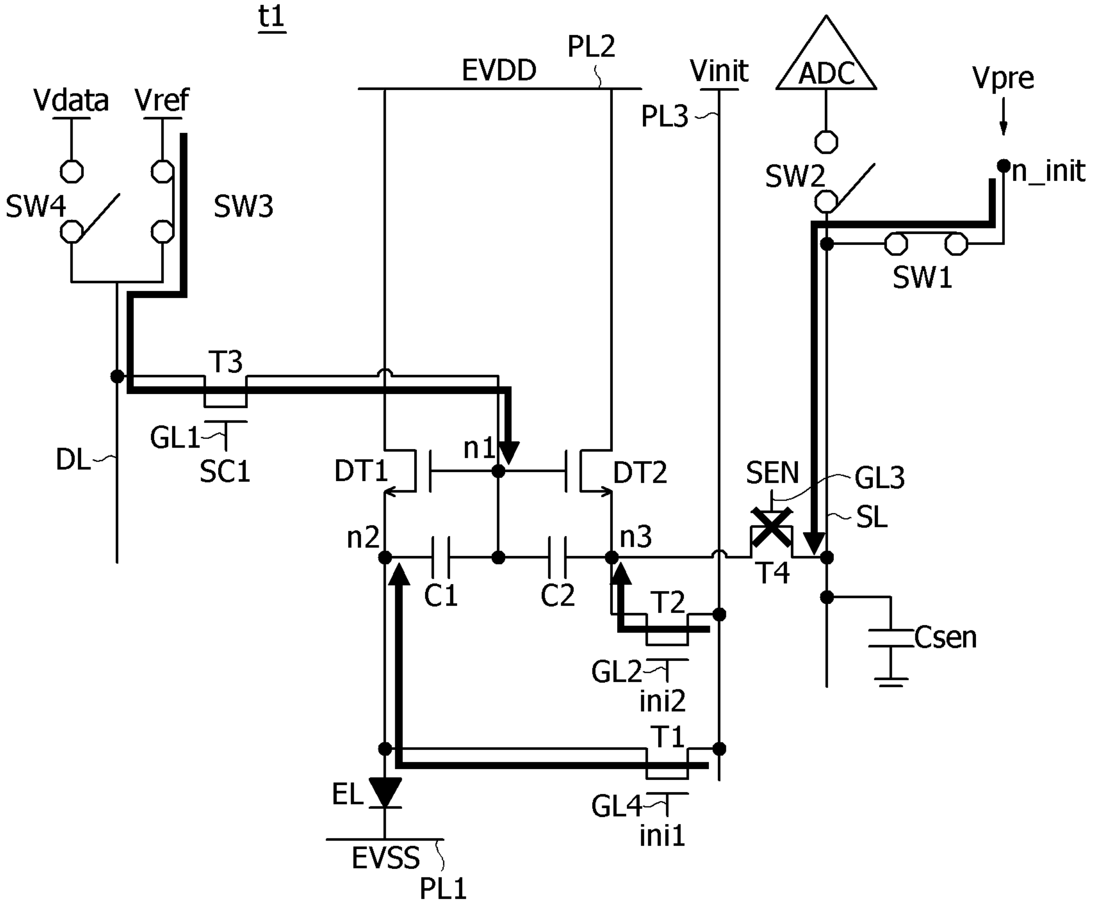
FIG. 24 is a diagram illustrating an operation during an initialization period of a display driving period of a pixel circuit according to the fourth embodiment of the present disclosure.
Figure 25:
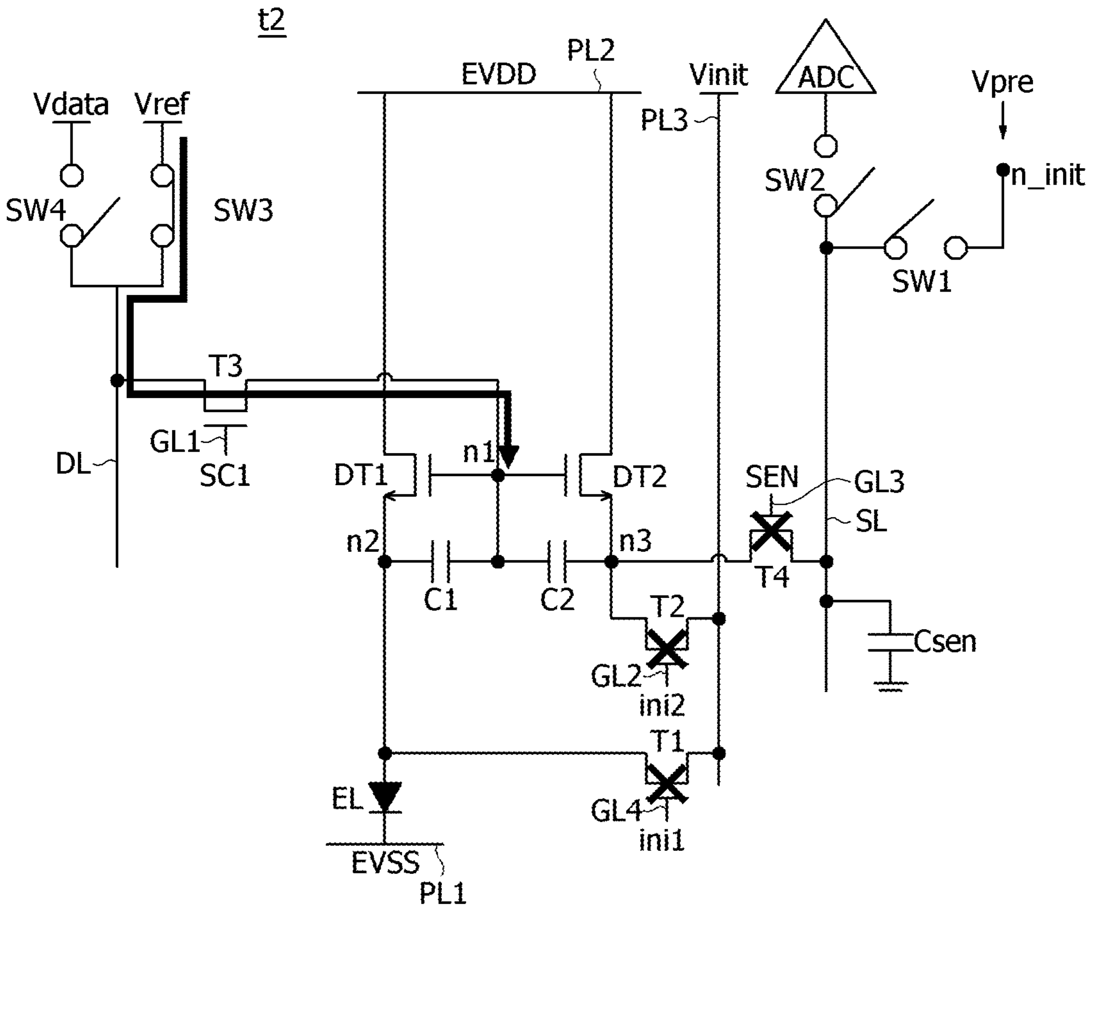
FIG. 25 is a diagram illustrating an operation during a sampling period of a display driving period of a pixel circuit according to the fourth embodiment of the present disclosure.
Figure 26:
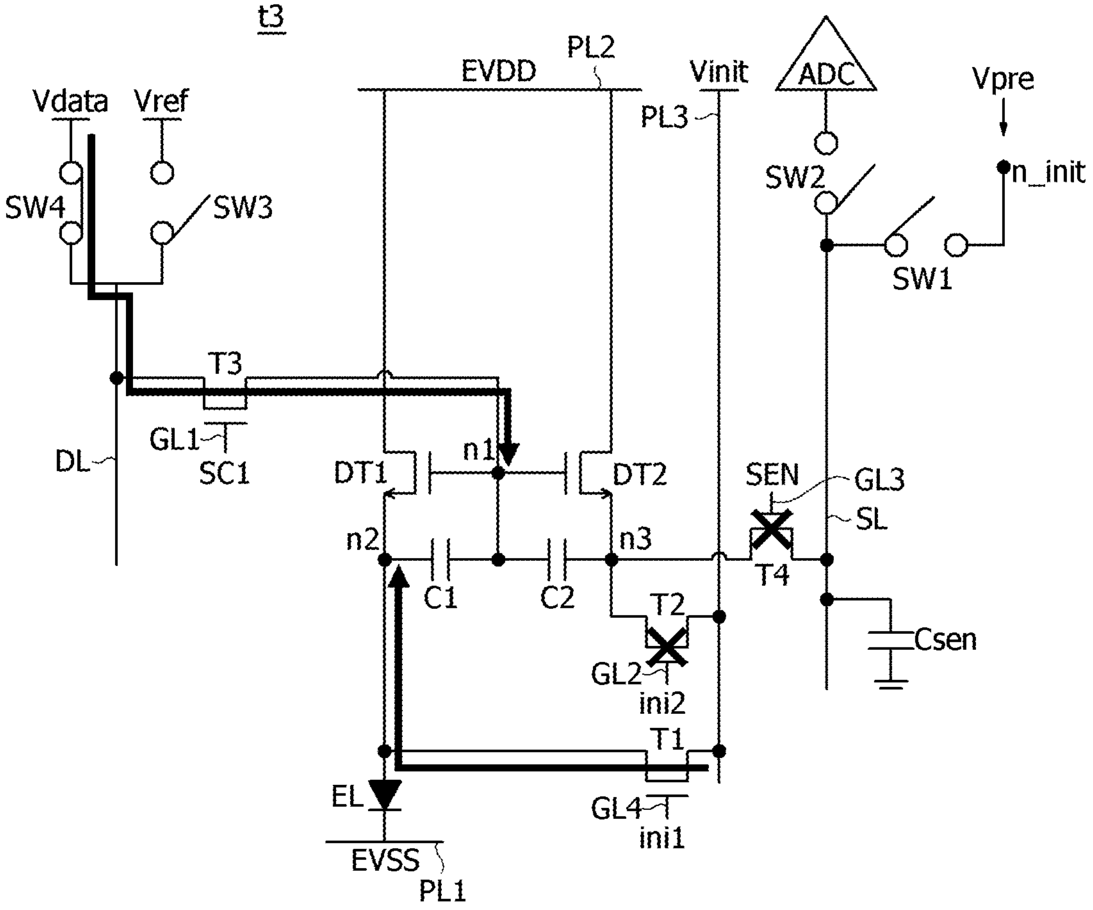
FIG. 26 is a diagram illustrating an operation during a data writing period of a display driving period of a pixel circuit according to the fourth embodiment of the present disclosure.
Figure 27:
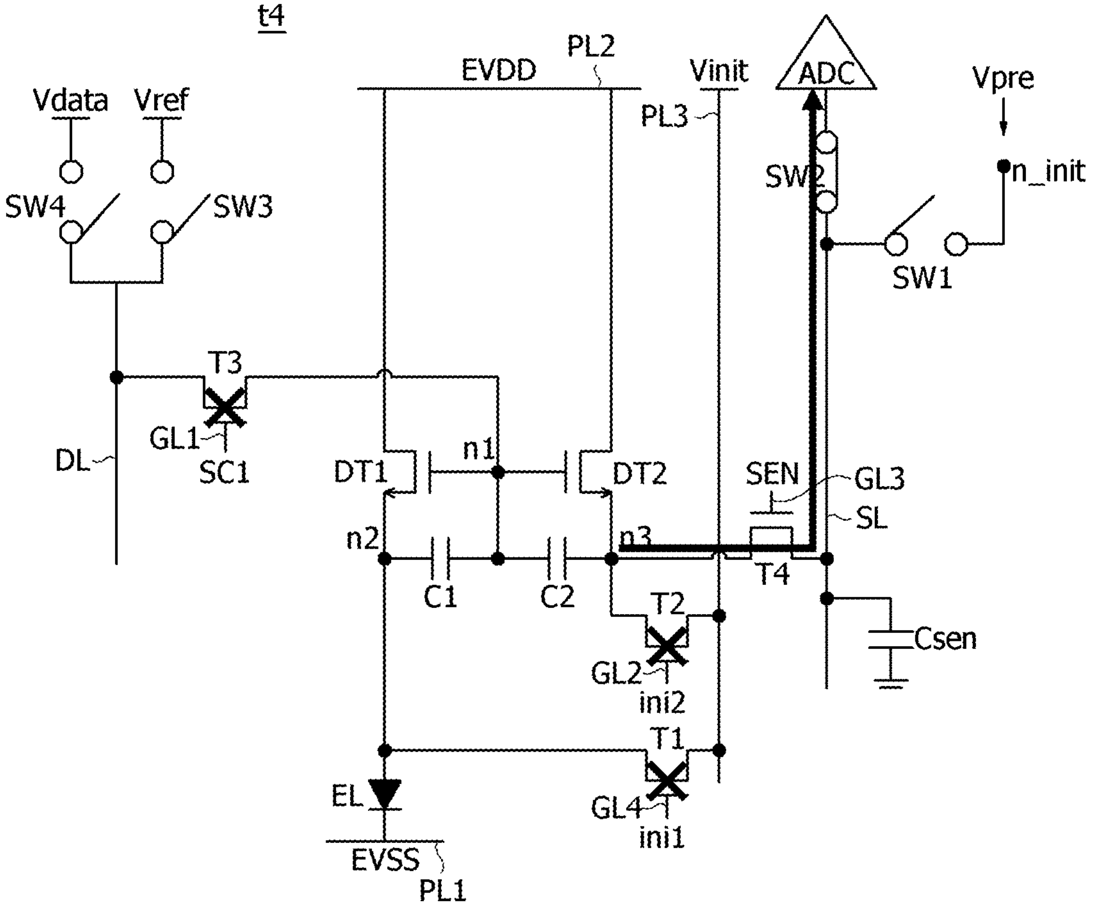
FIG. 27 is a diagram illustrating an operation during a pixel sensing period of a display driving period of a pixel circuit according to the fourth embodiment of the present disclosure.
Figure 28:
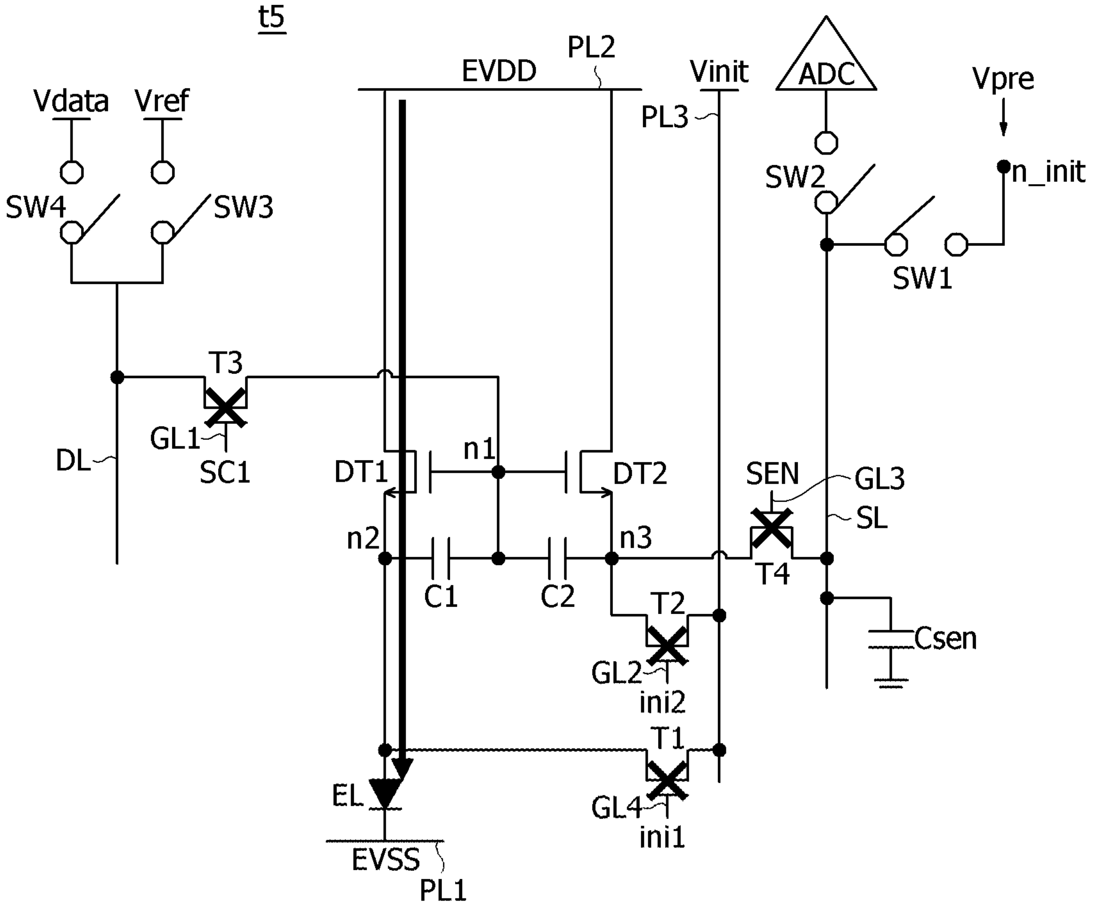
FIG. 28 is a diagram illustrating an operation during an emission period of a display driving period of a pixel circuit according to the fourth embodiment of the present disclosure.

FIG. 24 is a diagram illustrating an operation during an initialization period of a display driving period of a pixel circuit according to the fourth embodiment of the present disclosure. FIG. 25 is a diagram illustrating an operation during a sampling period of a display driving period of a pixel circuit according to the fourth embodiment of the present disclosure. FIG. 26 is a diagram illustrating an operation during a data writing period of a display driving period of a pixel circuit according to the fourth embodiment of the present disclosure. FIG. 27 is a diagram illustrating an operation during a pixel sensing period of a display driving period of a pixel circuit according to the fourth embodiment of the present disclosure. FIG. 28 is a diagram illustrating an operation during an emission period of a display driving period of a pixel circuit according to the fourth embodiment of the present disclosure.

Referring to FIG. 24, during the initialization period T1, main nodes of the pixel circuit 2200 are initialized. During the initialization period t1, a voltage of the first gate signal SC1, the first initialization signal ini1, and the second initialization gate signal ini2 is the gate-on voltage VGH, as shown in FIG. 23. During the initialization period t1, a voltage of the gate signal SEN for sensing is the gate-off voltage VGL.

Therefore, during the initialization period t1, the first switch element T1 is turned on in response to the gate-on voltage VGH of the first initialization gate signal ini1, and the second switch element T2 is turned on in response to the gate-on voltage VGH of the second initialization gate signal ini2. The third switch element T3 is turned on in response to the first gate signal SC1.

In addition, in the initialization period t1, the initialization switch element SW1 is also turned on, and the reference voltage connection switch SW3 is also turned on.

On the other hand, the fourth switch element T4 is turned off according to the gate-off voltage VGL of the gate signal SEN for sensing. And the data voltage connection switch SW4 is also turned off.

As a result, in the initialization period t1, the voltage of the first node n1 is initialized to the reference voltage Vref, and the voltages of the second node n2 and the third node n3 are initialized to the initialization voltage Vinit. Then, as the potential of the first node n1 rises due to the reference voltage Vref, the first driving element DT1 and the second driving element DT2 are turned on.

In the initialization period t1, the sensing line SL and the capacitor Csen for sensing may also be initialized to the sensing reference voltage Vpre.

Referring to FIG. 25, the threshold voltage Vth1 of the first driving element DT1 is sampled by the first capacitor C1 during the sampling period t2. The threshold voltage Vth2 of the second driving element DT2 is also sampled by the second capacitor C2.

The voltage of the first gate signal SC1 is the gate-on voltage VGH during the sampling period t2, as shown in FIG. 23. During the sampling period t2, the first initialization gate signal ini1, the second initialization gate signal ini2, and the gate signal SEN for sensing is the gate-off voltage VGL.

Therefore, during the sampling period t2, the third switch element T3 is turned on in response to the gate-on voltage VGH of the first gate signal SC1.

The first switch element T1 is turned off according to the gate-off voltage VGL of the first initialization gate signal ini1, and the second switch element T2 is turned off according to the gate-off voltage VGL of the second initialization gate signal ini2.

The fourth switch element T4 is turned off according to the gate-off voltage VGL of the gate signal SEN for sensing.

In the sampling period t2, the initialization switch element SW1 and the sampling switch element SW2 are also turned off.

On the other hand, in the sampling period t2, the reference voltage connection switch SW3 is turned on, and the data voltage connection switch SW4 is turned off.

As a result, in the sampling period t2, the voltage of the first node n1 maintains the reference voltage Vref, while the second node n2 and the third node n3 are saturated with a certain voltage due to the voltage rise caused by the pixel driving voltage EVDD. Here, the saturated voltage at the second node n2 may be a voltage of (Vref−Vth1), which is the reference voltage Vref minus the threshold voltage Vth1 of the first driving element DT1.

And the saturated voltage at the third node n3 may be a voltage of (Vref−Vth2), which is a reference voltage Vref minus a threshold voltage Vth2 of the second driving element DT2.

In the sampling period t2, the voltage (Vref−Vth2) of the third node n3 may be a sensing voltage including the threshold voltage Vth2 of the second driving element DT2.

In other words, when the reference voltage Vref is applied to the first node n1 in the sampling period t2, the voltage of the third node n3 may become the sensing voltage including the threshold voltage Vth2 of the second driving element. Here, the sense voltage may further include the reference voltage Vref.

In the sampling period t2, the gate-source voltage Vgs1 of the first driving element DT1, which is charged in the first capacitor C1, becomes a voltage of (Vref−Vref+Vth1), which is the voltage Vref of the first node n1 minus the voltage (Vref−Vth1) of the second node n2. In other words, in the sampling period t2, the threshold voltage Vth1 of the first driving element DT1 is charged in the first capacitor C1.

In the sampling period t2, the gate-source voltage Vgs2 of the second driving element DT2, which is charged in the second capacitor C2, becomes a voltage of (Vref−Vref+Vth2), which is the voltage Vref of the first node n1 minus the voltage (Vref−Vth2) of the third node n3. In other words, in the sampling period t2, the threshold voltage Vth2 of the second driving element DT2 is charged in the second capacitor C2.

Referring to FIG. 26, during the data writing period t3, the data voltage Vdata of the pixel data is applied to the first node n1.

During the data writing period t3, the voltage of the first gate signal SC1 and the first initialization gate signal ini1 is the gate-on voltage VGH, as shown in FIG. 23. During the data writing period t3, the voltage of the second initialization gate signal ini2 and the gate signal SEN for sensing is the gate-off voltage VGL.

Therefore, during the data writing period t3, the third switch element T3 is turned on in response to the gate-on voltage VGH of the first gate signal SC1. In addition, the first switch element T1 is turned on in response to the gate-on voltage VGH of the first initialization gate signal ini1.

During the data writing period t3, the data voltage connection switch SW4 is also turned on.

On the other hand, the second switch element T2 is turned off according to the gate-off voltage VGL of the second initialization gate signal ini2, and the fourth switch element T4 is turned off according to the gate-off voltage VGL of the gate signal SEN for sensing.

In the data writing period t3, the initialization switch element SW1, the sampling switch element SW2, and the reference voltage connection switch SW3 are also turned off.

As a result, the voltage of node n1 becomes the data voltage Vdata in the data writing period t3. In addition, the voltage of the second node n2 becomes the initialization voltage Vinit.

The voltage of the third node n3 becomes a voltage of (Vdata+Vref−Vth2), which is the sum (Vdata+Vref) of the data voltage Vdata and the reference voltage Vref minus the threshold voltage Vth2 of the second driving element DT2.

In the data writing period t3, the voltage formed at the third node n3 becomes the sensing voltage including the threshold voltage Vth2 of the second driving element DT2.

In other words, when the data voltage Vdata is applied to the first node n1 in the data writing period t3, the voltage of the third node n3 becomes the sensing voltage including the threshold voltage Vth2 of the second driving element DT2. Here, the sensing voltage may further include the reference voltage Vref and the data voltage Vdata.

Referring to FIG. 27, during the pixel sensing period t4, the sensing voltage (Vdata+Vref−Vth2) formed at the third node n3 is applied to the sensing line SL.

In other words, after the data voltage Vdata is applied, the gate-on voltage VGH of the gate signal SEN for sensing may be input to the fourth switch element T4, which is a switch element for sensing, so that the sensing voltage (Vdata+Vref−Vth2) formed at the third node n3 may be applied to the sensing line SL.

The voltage of the gate signal SEN for sensing is the gate-on voltage VGH during the pixel sensing period t4, as shown in FIG. 23. During the pixel sensing period t4, the voltage of the first gate signal SC1, the first initialization gate signal ini1, and the second initialization gate signal ini2 is the gate-off voltage VGL.

Therefore, during the pixel sensing period t4, the third switch element T4, which is a switch element for sensing, is turned on in response to the gate-on voltage VGH of the gate signal SEN for sensing.

In the pixel sensing period t4, the sampling switch element SW2 is also turned on.

On the other hand, the first switch element T1 is turned off according to the gate-off voltage VGL of the first initialization gate signal ini1, and the second switch element T2 is turned off according to the gate-off voltage VGL of the second initialization gate signal ini2.

The third switch element T3 is turned off according to the gate-off voltage VGL of the first gate signal SC1.

In the pixel sensing period t4, the initialization switch element SW1, the reference voltage connection switch SW3, and the data voltage connection switch SW4 are also turned off.

As a result, in the pixel sensing period t4, the sensing voltage (Vdata+Vref−Vth2) formed at the third node n3 is applied to the sensing line SL. Here, the sensing voltage includes the threshold voltage of the second driving element DT2 but not the threshold voltage of the first driving element DT1.

The capacitor Csen for sensing on the sensing line SL may be charged with the sensing voltage (Vdata+Vref−Vth2), and the sensing voltage (Vdata+Vref−Vth2) charged in the capacitor Csen for sensing may be supplied to the analog-to-digital converter ADC.

The analog-to-digital converter ADC may convert an analog value, the sensing voltage, to a digital value, the sensing data. The converted sensing data may be sent to the timing controller 130.

Here, since the sensing voltage (Vdata+Vref−Vth2) includes the threshold voltage Vth2 of the second driving element DT2, which is subjected to the same level of stress as the first driving element DT1, the timing controller 130 may determine the degree of deterioration of the pixel circuit 2200 by using the threshold voltage Vth2 of the second driving element DT2. That is, the sensing voltage that includes the threshold voltage Vth2 of the second driving element DT2 is indicative of the stress of the first driving element DT1 that drives the light emitting element EL.

The timing controller 130 may then change the pixel data of the input image to a compensation value corresponding to the degree of deterioration of the pixel circuit 2200. That is, the timing controller 130 may change the pixel data such that the data voltage that is applied to the first gate electrode of the first driving element DT1 and the second gate electrode of the second driving element DT2 is compensated based on the sensing voltage that includes the threshold voltage of the second driving element but not the threshold voltage of the first driving element DT1. Thus, the deterioration of the second driving element DT2 is used as a proxy for the deterioration of the first driving element DT1.

Referring to FIG. 28, the voltage of the first gate signal SC1, the first initialization gate signal ini1, the second initialization gate signal ini2, and the gate signal SEN for sensing is the gate-off voltage VGL during the emission period t5, as shown in FIG. 23.

Accordingly, during the emission period t5, the first switch element T1 to the fourth switch element T4 is turned off.

As described above, the light-emitting element EL may be emitted by the driving current flowing through the first driving element DT1 while the switch elements are turned off. Here, the light-emitting element EL may emit at a brightness corresponding to the grayscale value of the pixel data.

Meanwhile, in the emission period t5, the voltage of the first node n1 becomes the data voltage Vdata, and the voltage of the second node n2 becomes the initialization voltage Vinit.

The threshold voltage Vth1 of the first driving element DT1 is not reflected to the driving current even in the fourth embodiment because the gate-source voltage Vgs1 of the first driving element DT1 becomes the voltage (Vdata-Vinit) in the emission period t5.

As described above, in the fourth embodiment of the present disclosure, the sensing of the pixel circuit 2200 for external compensation may be performed when driving the display of the pixel circuit 2200 to compensate for pixel data in the input image.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

| [Description of reference numerals] | |
|---|---|
| 100: Display panel | 200, 800, 1500, 2200: Pixel circuit |
| 102: Data Line | 103: Gate Line |
| 104: Sensing Line | 10: Data driving circuit |
| 120: Gate driving circuit | 130: Timing controller |
| 140: Power supply circuit | 150: Level shifter |

What is claimed is:

1. A pixel circuit comprising:

a first driving element including a first-first electrode that is configured to be selectively connected to a driving power line that supplies a pixel driving voltage, a first gate electrode connected to a first node, and a second-first electrode connected to a second node to which a data voltage is applied;

a light-emitting element including an anode electrode that is configured to be selectively connected to the second node and a cathode electrode connected to a cathode power line, the light-emitting element emitting light responsive to a driving current from the first driving element and not from a second driving element;

the second driving element including a first-second electrode connected to the driving power line, a second gate electrode connected to the first gate electrode of the first driving element at the first node, and a second-second electrode connected to a third node; and a switch element connected to a sensing line of an external compensation circuit and the second-second electrode at the third node, the switch element configured to electrically connect the third node and the sensing line such that a sensing voltage at the third node is applied to the external compensation circuit via the sensing line responsive to a gate-on voltage of a gate signal for sensing that is applied to the switch element, the sensing voltage indicative of at least a threshold voltage of the second driving element during a pixel sensing period.

2. The pixel circuit of claim 1, further comprising:

a capacitor connected to the first gate electrode and the second gate electrode at the first node and the second-second electrode and the switch element at the third node.

3. The pixel circuit of claim 2, further comprising:

a first switch element connected to a data line that supplies the data voltage and the second-first electrode of the first driving element at the second node, the first switch element configured to electrically connect the data line and the second-first electrode to apply the data voltage to the first driving element responsive to a gate-on voltage of a gate signal for writing data; and a second switch element connected to the first-first electrode and the first gate electrode and the second gate electrode at the first node, the second switch element configured to electrically connect the first-first electrode and the first gate electrode while turned on in response to the gate-on voltage of the gate signal for writing data.

4. The pixel circuit of claim 1, wherein the data voltage is applied to the first gate electrode and the second gate electrode at the first node via the second-first electrode and the first-first electrode of the first driving element and a voltage at the first node is a sum of the data voltage and a threshold voltage of the first driving element, and the sensing voltage at the third node includes a threshold voltage of the second driving element.

5. The pixel circuit of claim 4, wherein the gate-on voltage of the gate signal for sensing is input to the switch element such that the sensing voltage of the third node is applied to the sensing line after the data voltage is applied to the second node.

6. A display device comprising:

a display panel including a plurality of data lines, a plurality of gate lines, a plurality of sensing lines, a plurality of pixel circuits, a cathode power line that supplies a cathode voltage to the plurality of pixel circuits, a driving power line that supplies a pixel driving voltage to the plurality of pixel circuits, and an initialization power line that supplies an initialization voltage to the plurality of pixel circuits;

a data driving circuit configured to output a data voltage of pixel data to the plurality of data lines; and a gate driving circuit configured to sequentially output gate signals to the plurality of gate lines, wherein at least one of the plurality of pixel circuits includes the pixel circuit of claim 1.

7. The display device of claim 6, wherein the sensing voltage at the third node includes a threshold voltage of the second driving element responsive to the data voltage being applied to the first node, and the gate-on voltage of the gate signal for sensing is input to the switch element for sensing after the data voltage is applied to the first node.

8. The display device of claim 6, wherein the first driving element and the second driving element include a same material and a same structure.

9. A pixel circuit comprising:

a first driving element including a first-first electrode that is connected to a driving power line that applies a pixel driving voltage to the first-first electrode, a first gate electrode connected to a first node to which a reference voltage or a data voltage is selectively applied to the first gate electrode, and a second-first electrode connected to a second node;

a light-emitting element including an anode electrode connected to the second node and a cathode electrode connected to a cathode power line, the light-emitting element configured to emit light responsive to a driving current from the first driving element and not from a second driving element;

the second driving element including a first-second electrode connected to the driving power line that applies the pixel driving voltage to the first-second electrode, a second gate electrode connected to the first gate electrode of the first driving element at the first node, and a second-second electrode connected to a third node; and a switch element connected to a sensing line of an external compensation circuit and the second-second electrode at the third node, the switch element configured to electrically connect the third node and the sensing line such that a sensing voltage at the third node is applied to the external compensation circuit via the sensing line in response to a gate-on voltage of a gate signal for sensing that is applied to the switch element, the sensing voltage indicative of at least a threshold voltage of the second driving element during a pixel sensing period.

10. The pixel circuit of claim 9, further comprising:

a first capacitor connected to the first gate electrode and the second gate electrode at the first node and the second-first electrode at the second node; and a second capacitor connected to the first capacitor, the first gate electrode, and the second gate electrode at the first node and the second-second electrode and the switch element at the third node.

11. The pixel circuit of claim 10, wherein the sensing voltage of the third node includes a threshold voltage of the second driving element responsive to the reference voltage being applied to the first node, and the gate-on voltage of the gate signal for sensing is input to the switch element after the reference voltage is applied to the first node.

12. The pixel circuit of claim 11, wherein the data voltage is applied to the first gate electrode and the second gate electrode at the first node after the sensing voltage is applied to the sensing line.

13. The pixel circuit of claim 10, wherein the data voltage is applied to the first gate electrode and the second gate electrode at the first node after the reference voltage is applied to the first gate electrode and the second gate electrode at the first node, wherein responsive to the data voltage being applied to the first node, the sensing voltage of the third node includes a threshold voltage of the second driving element, and the gate-on voltage of the gate signal for sensing is input to the switch element after the data voltage is applied.

14. A display device comprising:

a display panel including a plurality of data lines, a plurality of gate lines, a plurality of sensing lines, a plurality of pixel circuits, a cathode power line that supplies a cathode voltage to the plurality of pixel circuits, a driving power line that supplies a pixel driving voltage to the plurality of pixel circuits, a reference power line that supplies a reference voltage to the plurality of pixel circuits, and an initialization power line that supplies an initialization voltage to the plurality of pixel circuits;

a data driving circuit configured to output a data voltage of pixel data to the plurality of data lines; and a gate driving circuit configured to sequentially output gate signals to the plurality of gate lines, wherein at least one of the plurality of pixel circuits includes the pixel circuit of claim 9.

15. The display device of claim 14, wherein the sensing voltage of the third node includes a threshold voltage of the second driving element responsive to the reference voltage being applied to the first node, and the gate-on voltage of the gate signal for sensing is input to the switch element after the reference voltage is applied to the first node.

16. The display device of claim 14, wherein:

the first node is initialized to the reference voltage and the data voltage is applied to the first node after the first node is initialized to the reference voltage, when the data voltage is applied to the first node, the sensing voltage includes a threshold voltage of the second driving element, and the gate-on voltage of the gate signal for sensing is input to the switch element for sensing after the data voltage is applied.

17. A pixel circuit comprising:

a first driving element including a first electrode that is electrically connected to a driving power line that applies a pixel driving voltage to the first electrode, a first gate electrode connected to a first node, and a second electrode connected to a second node;

a light-emitting element including an anode electrode that is electrically connected to the second node and a cathode electrode connected to a cathode power line, the light-emitting element configured to emit light responsive to a driving current from the first driving element and not from a second driving element;

the second driving element including a first electrode that is electrically connected to the driving power line, a second gate electrode that is connected to the first gate electrode of the first driving element at the first node, and a second electrode that is connected to a third node; and a switch element connected to the second electrode of the second driving element at the third node and a sensing line of an external compensation circuit, the switch element configured to electrically connect the third node and the sensing line such that a sensing voltage at the third node that includes at least a threshold voltage of the second driving element is applied to the external compensation circuit via the sensing line while the switch element is turned on during a pixel sensing period, wherein a data voltage that is applied to the first gate electrode of the first driving element and the second gate electrode of the second driving element is compensated based on the sensing voltage that includes at least the threshold voltage of the second driving element.

18. The pixel circuit of claim 17, wherein the first driving element and the second driving element include a same material and a same structure.

19. The pixel circuit of claim 17, wherein the sensing voltage includes the threshold voltage of the second driving element but not a threshold voltage of the first driving element.

20. The pixel circuit of claim 17, wherein the sensing voltage includes the threshold voltage of the second driving element and a threshold voltage of the first driving element.

* * * * *